United States Patent [19]
Tabata et al.

[11] Patent Number: 5,669,849
[45] Date of Patent: Sep. 23, 1997

[54] APPARATUS FOR CONTROLLING CONCURRENT RELEASING AND ENGAGING ACTIONS OF FRICTIONAL COUPLING DEVICES FOR SHIFTING VEHICLE AUTOMATIC TRANSMISSION

[75] Inventors: Atsushi Tabata, Okazaki; Nobuaki Takahashi; Tetsuo Hamajima, both of Toyota, all of Japan

[73] Assignee: Toyota Jidosha Kabushiki Kaisha, Toyota, Japan

[21] Appl. No.: 595,850

[22] Filed: Feb. 2, 1996

[30] Foreign Application Priority Data

| | | | |
|---|---|---|---|
| Feb. 3, 1995 | [JP] | Japan | 7-017060 |
| Mar. 6, 1995 | [JP] | Japan | 7-045444 |
| Jun. 27, 1995 | [JP] | Japan | 7-160210 |

[51] Int. Cl.⁶ ............ F16H 61/04; B60K 41/06
[52] U.S. Cl. ............ 477/102; 477/109; 477/154; 477/159
[58] Field of Search .......... 477/102, 109, 477/154, 159, 160, 161, 162

[56] References Cited

U.S. PATENT DOCUMENTS

| | | | |
|---|---|---|---|
| 5,213,013 | 5/1993 | Fujiwara et al. | 477/160 X |
| 5,295,415 | 3/1994 | Abe et al. | 477/109 X |
| 5,347,885 | 9/1994 | Taga et al. | |
| 5,393,275 | 2/1995 | Okada et al. | |
| 5,415,056 | 5/1995 | Tabata et al. | |
| 5,425,687 | 6/1995 | Taga et al. | |
| 5,445,576 | 8/1995 | Motamedi et al. | 477/109 X |
| 5,547,434 | 8/1996 | Graf et al. | 477/109 |

FOREIGN PATENT DOCUMENTS

| | | |
|---|---|---|
| 40 37 092 | 5/1992 | Germany. |
| 42 10 416 | 12/1992 | Germany. |
| 42 15 406 | 11/1993 | Germany. |
| 1-224548 | 9/1989 | Japan. |
| 1-247228 | 10/1989 | Japan. |
| 1-273738 | 11/1989 | Japan. |
| 5-296323 | 11/1993 | Japan. |
| 6-341535 | 12/1994 | Japan. |

*Primary Examiner*—Charles A. Marmor
*Assistant Examiner*—Nathan O. Jensen
*Attorney, Agent, or Firm*—Oblon, Spivak, McClelland, Maier & Neustadt, P.C.

[57] ABSTRACT

A motor vehicle shift control apparatus wherein two hydraulically operated frictional coupling devices are simultaneously released and engaged, respectively, to effect a clutch-to-clutch shift of an automatic transmission, including an overshoot control device for compensating the hydraulic pressure of at least one of the coupling devices during the clutch-to-clutch shift such that the amount of engine speed overshoot is held within a predetermined range, and an inhibiting device for inhibiting an operation of the overshoot control device if a preventing device for preventing an excessive rise of the engine speed above an upper limit is expected to be activated, or if the preventing device is in operation. The inhibiting device may be replaced by a device for reducing the output of the engine if the engine speed is higher than a threshold not higher than the upper limit.

18 Claims, 27 Drawing Sheets

FIG. 2

|     | C0 | C1 | C2 | B0 | B1 | B2 | B3 | B4 | F0 | F1 | F2 |
|-----|----|----|----|----|----|----|----|----|----|----|----|
| N   |    |    |    | ◌  |    |    |    |    |    |    |    |
| Rev |    |    | ○  | ○  |    |    |    | ○  |    |    |    |
| 1st | ○  | ○  |    |    |    |    |    | ●  | ○  |    | ○  |
| 2nd | ●  | ○  |    |    |    |    | ○  |    | ○  |    |    |
| 3rd | ○  | ○  |    |    | ●  | ○  |    |    | ○  | ○  |    |
| 4th | ○  | ○  | ○  |    |    | △  |    |    | ○  |    |    |
| 5th |    | ○  | ○  | ○  |    | △  |    |    |    |    |    |

FIG. 14
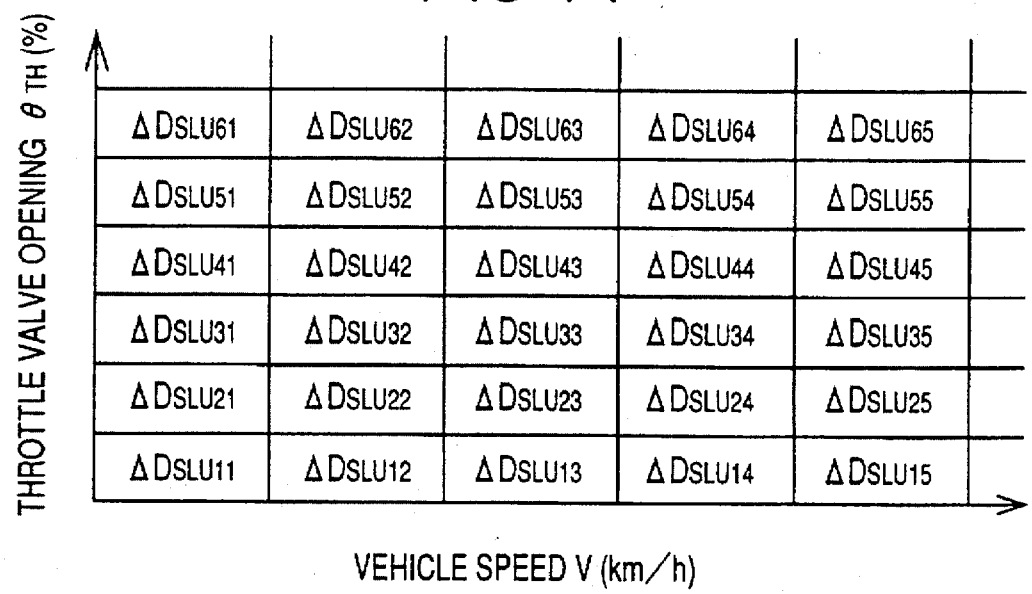
VEHICLE SPEED V (km/h)
FIG. 15
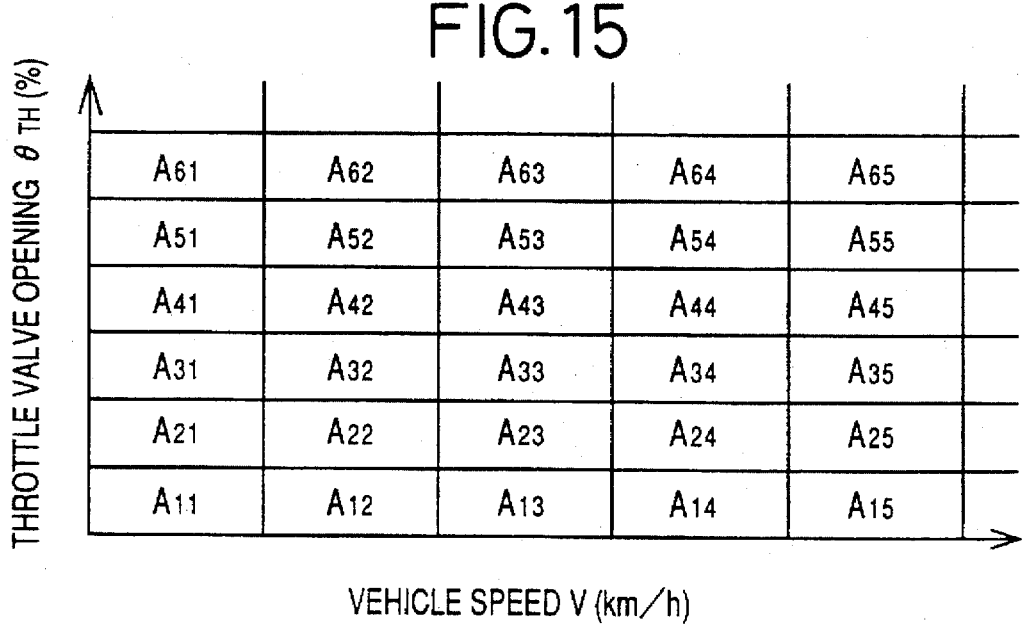
VEHICLE SPEED V (km/h)
FIG. 16
| THROTTLE VALVE OPENING $\theta$ TH (%) | 50-60 | 50-60 | 70-80 | >80 |
|---|---|---|---|---|
| COMPENSATION VALUE $\alpha$ | $\alpha_1$ | $1.1\alpha_1$ | $1.2\alpha_1$ | $1.3\alpha_1$ |

FIG. 30

| ΔNEOV \ TEOV | 20ms | 20~40ms | >40ms |
|---|---|---|---|
| 50rpm | ΔDSLU11 | ΔDSLU21 | ΔDSLU31 |
| 50~100rpm | ΔDSLU12 | ΔDSLU22 | ΔDSLU32 |
| 100~150rpm | ΔDSLU13 | ΔDSLU23 | ΔDSLU33 |
| EXCESSIVE SPEED | ΔDSLUS | | |

FIG. 31

| ΔNEOV \ TEOV | 20ms | 20~40ms | >40ms |
|---|---|---|---|
| 50rpm | ΔDSLUA1 | ΔDSLUB1 | ΔDSLUC1 |
| 50~100rpm | ΔDSLUA2 | ΔDSLUB2 | ΔDSLUC2 |
| 100~150rpm | ΔDSLUA3 | ΔDSLUB3 | ΔDSLUC3 |

APPARATUS FOR CONTROLLING CONCURRENT RELEASING AND ENGAGING ACTIONS OF FRICTIONAL COUPLING DEVICES FOR SHIFTING VEHICLE AUTOMATIC TRANSMISSION

BACKGROUND OF THE INVENTION

1. Field of the Invention

The present invention relates to a transmission shift control apparatus for controlling an automatic transmission of a motor vehicle.

2. Discussion of the Related Art

In the field of a motor vehicle, there is known an automatic transmission of a type adapted to effect a so-called "clutch-to-clutch shift", that is, adapted to be shifted from one of operating gear positions to another such that a frictional coupling device (such as a clutch or brake) is released while another frictional coupling device is concurrently engaged with an increase in hydraulic pressure. This type of automatic transmission can be made with reduced size and weight, in the absence of a one-way clutch for the above-indicating shifting. For the clutch-to-clutch shift of the automatic transmission, a shift control apparatus for controlling the transmission is adapted to regulate either the hydraulic pressure (referred to as "releasing pressure" or "drain pressure") of the frictional coupling device to be released, or the hydraulic pressure (referred to as "engaging pressure") of the frictional coupling device to be engaged, so that both of these two frictional coupling devices temporarily have engaging torques for a suitable period of time. If the timing of decreasing the engaging torque of one of the two frictional coupling devices and the timing of increasing the engaging torque of the other frictional coupling device are not suitably matched, the motor vehicle will suffer from some problems.

For example, the speed of an engine of the motor vehicle will have a temporary overshoot if the rate of decrease of the engaging torque of the frictional coupling device to be released is excessively high or if the rate of increase of the engaging torque of the other frictional coupling device to be engaged is excessively low. Alternatively, the automatic transmission will have a so-called "tie-up", namely, an abrupt temporary drop in its output torque if the rate of decrease of the engaging torque of the frictional coupling device to be released is excessively low or if the rate of increase of the engaging torque of the other frictional coupling device is excessively high.

The shift control apparatus for the automatic transmission of the type indicated above incorporates a hydraulic control circuit for assuring the adequate timings of decreasing and increasing the engaging torques of the two frictional coupling devices associated with the clutch-to-clutch shift of the transmission. For instance, the hydraulic control circuit includes a pressure regulating valve adapted to open and close a drain line connected to the frictional coupling device to be released, for thereby regulating the releasing or drain pressure of that frictional coupling device. This pressure regulating valve is opened to open the drain line according to the engaging pressure of the frictional coupling device to be engaged. Further, the pressure regulating valve receives a pilot pressure which acts in a direction opposite to a direction in which the engaging pressure of the frictional coupling device to be released acts. This pilot pressure is produced by a linear solenoid valve depending upon an input torque of the automatic transmission. Thus, the pressure regulating valve operates during a period of the clutch-to-clutch shift of the transmission, so that the releasing pressure of the frictional coupling device to be released is reduced as the engaging pressure of the frictional coupling device to be engaged is increased.

Even if the shift control apparatus is electrically operated with high accuracy, the engaging and releasing torques of the two frictional coupling devices may not be adequately controlled, leading to the temporary engine overshoot or transmission tie-up indicated above during the clutch-to-clutch shift of the transmission, because of chronological changes or changes with the temperature, of the friction coefficient of the frictional coupling devices and the operating characteristics of the valves and orifices in the hydraulic control circuit, in connection with the viscosity and other properties of the working fluid used for operating the frictional coupling devices.

In the light of the above drawbacks, there is proposed a transmission shift control apparatus as disclosed in JP-A-5-296323, which employs hydraulic pressure compensating means for adjusting the drain pressure of the frictional coupling device to be engaged, so as to maintain the overshoot amount of the engine speed within a predetermined range during the clutch-to-clutch shift, that is, so as to prevent an excessive mount of overshoot of the engine speed during the clutch-to-clutch shift of the automatic transmission. This hydraulic pressure compensating means is effective to eliminate the adverse influences of the changing friction coefficient of the frictional coupling devices and the changing characteristics of the valves and orifices of the hydraulic control circuit, whereby the clutch-to-clutch shift of the transmission can be achieved with high accuracy.

Another transmission shift control apparatus is disclosed in JP-A-6-341535, for example, which includes hydraulic pressure compensating means capable of adjusting the drain pressure of the frictional coupling device to be engaged, by learning from the history of the engine overshoot, so that the overshoot amount of the engine speed is held within the predetermined range during the clutch-to-clutch shift of the transmission. This hydraulic pressure compensating means of the engine overshoot learning type is also effective to eliminate the adverse influences of the changing friction coefficient of the frictional coupling devices and the changing characteristics of the hydraulic control circuit, and permits the automatic transmission to effect the clutch-to-clutch shift with high accuracy.

On some motor vehicles, there is provided excessive engine speed preventing means for preventing a rise of the engine speed above a predetermined upper limit. For example, this excessive engine speed preventing means is adapted to cut a fuel supply to the engine when the engine speed exceeds the upper limit. Usually, a shift pattern used to effect the clutch-to-clutch shift of the transmission is formulated such that when the engine throttle valve is in a position at or close to its maximum opening angle, the engine output is maximized so as to increase the acceleration of the motor vehicle, more specifically, so as to increase the vehicle speed to a target level slightly lower than a level corresponding to the upper limit of the engine speed, and so as to shift up the transmission when the vehicle speed reaches the target level. In this arrangement, the clutch-to-clutch shift of the transmission may be effected without a trouble during a normal running of the vehicle with the throttle valve opening angle being considerably smaller than the maximum value. During a high-load running of the vehicle with the throttle valve being in a position at or close to its maximum opening angle, the clutch-to-clutch shift may be effected with the engine operating at an extremely high speed.

In the transmission shift control apparatus according to the first proposal disclosed in JP-A-5-296323, the engine speed may exceed the predetermined upper limit or suffer from an excessive overshoot in the event of a failure of the hydraulic pressure compensating means to adequately regulate the drain pressure of the frictional coupling device to be engaged. If the rise of the engine speed is prevented at this time by the excessive engine speed preventing means by cutting the fuel supply to the engine, for example, the engine output is suddenly lowered, whereby the vehicle operator feels unexpected deceleration of the vehicle and reduction in the driving comfort.

In the transmission shift control apparatus according to the second proposal disclosed in JP-A-6-341535, the engine speed may exceed the predetermined upper limit or suffer from an excessive overshoot when the clutch-to-clutch shift of the transmission is effected at an extremely high speed of the engine. In this event, the amount of overshoot of the engine speed is influenced by a sudden drop of the engine speed by operation of the excessive engine speed preventing means. If the hydraulic pressure compensating means is operated on the basis of the thus influenced amount of engine speed overshot, the hydraulic pressure of the frictional coupling device may be inadequately controlled in the next or subsequent cycle of control during the clutch-to-clutch shift. In other words, the operation of the excessive engine speed preventing means may cause inadequate determination of an erroneous compensating value for the next or subsequent cycle of control, by learning from the engine speed overshoot amount which has been suddenly reduced. This leads to a shifting shock of the transmission and deteriorated driving comfort as felt by the vehicle driver.

SUMMARY OF THE INVENTION

It is therefore a first object of the present invention to provide a transmission shift control apparatus for a motor vehicle, which does not suffer from deterioration of driving comfort of the vehicle during a clutch-to-clutch shift of an automatic transmission, even when the clutch-to-clutch shift is effected during abrupt acceleration of the vehicle.

It is a second object of this invention to provide a transmission shift control apparatus for a motor vehicle, which is free from inadequate control of a clutch-to-clutch shift of the transmission on the basis of an erroneous compensation by learning from the overshoot amount of the vehicle engine speed, even when the clutch-to-clutch shift is effected during a high-load running of the vehicle.

The first object may be achieved according to a first aspect of this invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift of the transmission from one of the operating positions to another of the operating positions, the shift control apparatus comprising (a) excessive engine speed preventing means for preventing a rise of a speed of the engine above an upper limit, (b) hydraulic control means for regulating hydraulic pressures of the two frictional coupling devices such that an amount of overshoot of the speed of the engine is held within a predetermined range during a period of the clutch-to-clutch shift, (c) overshoot control means for compensating at least one of the hydraulic pressures as regulated by the hydraulic control means, when the amount of overshoot of the speed of the engine is outside the predetermined range; (d) engine state detecting means for detecting an operating state of the engine during the clutch-to-clutch shift of the transmission; and (e) inhibiting means for inhibiting an operation of the overshoot control means, if the operating state of the engine detected by the engine state detecting means is expected to cause activation of the excessive engine speed preventing means during the clutch-to-clutch shift of the transmission.

In the shift control apparatus of the present invention constructed as described above, the operation of the overshoot control means is inhibited by the inhibiting means during the clutch-to-clutch shift of the transmission, if the operating state of the engine as detected by the engine state detecting means during the clutch-to-clutch shift is expected to cause the excessive engine speed preventing means to be activated, namely, if the detected operating state of the engine indicates that there is a high possibility that the excessive engine speed preventing means is activated to prevent an excessive rise of the engine. Therefore, the present arrangement prevents insufficient or inadequate compensation by the overshoot control means of the hydraulic pressure or pressures of the frictional coupling device or devices, which would occur if the overshoot control means was operated in such operating state of the engine and which would cause an excessive amount of overshoot of the engine speed and an excessive rise of the engine speed during the clutch-to-clutch shift, leading to the activation of the excessive engine speed preventing means. In other words, the present arrangement is effective to prevent undesired activation of the excessive engine speed preventing means in such operating state of the engine, which results in a sudden drop of the engine output or speed due to a fuel cut of the engine, for example, during the clutch-to-clutch shift of the transmission. Thus, the present shift control apparatus prevents conventionally experienced deterioration of the driving comfort of the vehicle due to such sudden drop of the engine output.

The overshoot control means may include one or both of learning overshoot control means and real-time overshoot control means. The learning overshoot control means may be adapted to detect the amount of overshoot of the speed of the engine during the period of the clutch-to-clutch shift of the transmission, determine a learning compensation value for adjusting at least one of the hydraulic pressures of the two frictional coupling devices as regulated by the hydraulic control means, such that the detected amount of overshoot of the speed of the engine is held within the predetermined range, and apply the learning compensation value to the hydraulic control means. For instance, the overshoot control means may be adapted to determine a learning compensation value so as to reduce an amount of engine overshoot at the initiation of the inertia phase of the engine speed, and adjust the hydraulic pressure of at least one of the two frictional coupling devices according to the determined compensation value in the next clutch-to-clutch shift of the transmission. The real-time overshoot control means may be adapted to intermittently detect the amount of overshoot of the speed of the engine during the period of the clutch-to-clutch shift of the transmission, and intermittently adjust the at least one of the hydraulic pressures of the two frictional coupling devices as regulated by the hydraulic control means, during a period between moments of detection of a torque phase and an inertia phase of the speed of the engine during the period of the clutch-to-clutch shift, such that the detected amount of overshoot of the speed of the engine is held within the predetermined range.

The first object may also be achieved according to a second aspect of the present invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift of the transmission from one of the operating positions to another of the operating positions, the shift control apparatus comprising (a) excessive engine speed preventing means for preventing a rise of a speed of the engine above an upper limit, (b) hydraulic control means for regulating hydraulic pressures of the two frictional coupling devices such that an amount of overshoot of the speed of the engine is held within a predetermined range during a period of the clutch-to-clutch shift, (c) learning overshoot control means for effecting learning compensation of at least one of the hydraulic pressures as regulated by the hydraulic control means, when the amount of overshoot of the speed of the engine is outside the predetermined range; (d) engine state detecting means for detecting an operating state of the engine during the clutch-to-clutch shift of the transmission; and (e) inhibiting means for inhibiting an operation of the learning overshoot control means, if the operating state of the engine detected by the engine state detecting means is expected to cause activation of the excessive engine speed preventing means during the clutch-to-clutch shift of the transmission.

In the shift control apparatus constructed according to the second aspect of the invention, the operation of the learning overshoot control means to effect the learning compensation of the hydraulic pressure or pressures of the frictional coupling device or devices is inhibited by the inhibiting means during the clutch-to-clutch shift of the transmission, if the operating state of the engine as detected by the engine state detecting means during the clutch-to-clutch shift is expected to cause the excessive engine speed preventing means to be activated, namely, if the detected operating state of the engine indicates that there is a high possibility that the excessive engine speed preventing means is activated to prevent an excessive rise of the engine. Therefore, the present arrangement prevents undesired activation of the excessive engine speed preventing means which would result in a sudden drop of the engine output and deterioration of the driving comfort of the vehicle, as described above. Thus, the present shift control apparatus according to the second aspect of the invention has the same advantage as the apparatus according to the first aspect of the invention.

The shift control apparatus according to the first and second aspects of this invention may further comprise tie-up control means for controlling at least one of the hydraulic pressures of the two frictional coupling devices during the period of the clutch-to-clutch shift of the transmission such that the two frictional coupling devices have a tie-up tendency when the inhibiting means inhibits the operation of the learning overshoot control means. Since the tie-up control means is operated when the operation of the learning overshoot control means is inhibited during the clutch-to-clutch shift of the transmission, the frictional coupling devices are controlled so as to have a tendency of tie-up, which contributes to prevention of an excessive rise of the engine speed above the upper limit and prevention of the activation of the excessive engine speed preventing means, whereby the driving comfort of the vehicle is further improved by the provision of the tie-up control means.

The first object may also be achieved according to a third aspect of this invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift of the transmission from one of the operating positions to another of the operating positions, the shift control apparatus comprising (a) excessive engine speed preventing means for preventing a rise of a speed of the engine above an upper limit, (b) learning overshoot control means for effecting learning compensation of at least one of hydraulic pressures of the two frictional coupling devices such that an amount of overshoot of the speed of the engine is held within a predetermined range during a period of the clutch-to-clutch shift; (c) engine state detecting means for detecting an operating state of the engine during the clutch-to-clutch shift of the transmission; and (d) hydraulic controlling and inhibiting means for inhibiting an operation of the learning overshoot control means, if the operating state of the engine detected by the engine state detecting means is expected to cause activation of the excessive engine speed preventing means, the hydraulic controlling and inhibiting means regulating the at least one of the hydraulic pressures of the two frictional coupling devices on the basis of a learning compensation value obtained by the learning overshoot control means, when the amount of overshoot of the speed of the engine is outside the predetermined range, if the operating state of the engine detected by the engine state detecting means is not expected to cause the activation of the excessive engine speed preventing means.

In the shift control apparatus according to the third aspect of this invention, the operation of the learning overshoot control means to effect the learning compensation of the hydraulic pressure or pressures of the frictional coupling device or devices is inhibited during the clutch-to-clutch shift of the transmission, if the operating state of the engine as detected by the engine state detecting means is expected to cause activation of the excessive engine speed preventing means, that is, if the detected operating state indicates a high possibility of activation of the excessive engine speed preventing means. If there is no such possibility, the hydraulic pressure or pressures is/are regulated on the basis of a learning compensation value obtained by the learning overshoot control means when the amount of overshoot of the engine speed is outside the predetermined range. Therefore, the present arrangement prevents insufficient or inadequate compensation by the overshoot control means of the hydraulic pressure or pressures of the frictional coupling device or devices, which would an excessive amount of overshoot of the engine speed and an excessive rise of the engine speed during the clutch-to-clutch shift. Thus, the present shift control apparatus is also capable of preventing undesired activation of the excessive engine speed preventing means which would cause a sudden drop of the engine output and deterioration of the driving comfort of the vehicle due to such sudden drop of the engine output.

The first object may also be achieved according to a fourth aspect of the present invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift of the transmission from one of the operating positions to another of the operating positions, the shift control apparatus comprising (a) excessive engine speed preventing means for preventing a rise of a speed of the engine above an upper limit, (b) overshoot control means for compensating at least one of hydraulic pressure of the two frictional coupling devices such that an amount of overshoot of the speed of the engine is held within a predetermined range during a period of the clutch-to-clutch shift; (c) engine state detecting means for detecting an operating state of the engine during the clutch-to-clutch shift of the transmission; and (d) inhibiting means for inhibiting an operation of the excessive engine speed preventing means, if the operating state of the engine detected by the engine state detecting means is expected to cause activation of the excessive engine speed preventing means.

In the present shift control apparatus according to the fourth aspect of this invention, the operation of the excessive engine speed preventing means is inhibited or stopped during the clutch-to-clutch shift of the transmission, if the detected operating state of the engine is likely to cause activation of the excessive engine speed preventing means during the clutch-clutch shift. This apparatus has the same advantage as the apparatus according to the first, second or third aspect of the invention explained above.

The first object may also be achieved according to a fifth aspect of this invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift of the transmission from one of the operating positions to another of the operating positions, the shift control apparatus comprising (a) excessive engine speed preventing means for preventing a rise of a speed of the engine above an upper limit, (b) clutch-to-clutch shift control means for regulating hydraulic pressures of the two frictional coupling devices during a period of the clutch-to-clutch shift of the transmission, (c) learning compensation means for effecting learning compensation of at least one of the hydraulic pressures as regulated by the clutch-to-clutch shift control means so as to reduce an amount of overshoot of the speed of the engine during the period of the clutch-to-clutch shift; (d) engine speed detecting means for detecting the speed of the engine during the clutch-to-clutch shift of the transmission; and (e) engine output reducing means for reducing an output torque of the engine if the speed of the engine detected by the engine speed detecting means has exceeded a predetermined threshold which is not higher than the upper limit above which the excessive engine speed preventing means is activated.

In the present shift control apparatus constructed according to the fifth aspect of this invention, the output torque of the engine is reduced if the speed of the engine detected by the engine speed detecting means has exceeded the predetermined threshold which is equal to or lower than the upper limit above which the excessive engine speed preventing means is activated. The present arrangement is effective to prevent deterioration of the driving comfort of the vehicle which would occur due to a fuel cut of the engine, for example, by the excessive engine speed preventing means, during the clutch-to-clutch shift of the transmission while the vehicle is running with a comparatively high load.

The engine output reducing means is preferably adapted to reduce the output torque of the engine if a time lapse after initiation of the clutch-to-clutch shift of the transmission has exceeded a predetermined threshold time, even though the speed of the engine has not exceeded the predetermined threshold. This arrangement permits the reduction of the engine output torque as needed, even in the event of a failure of the engine speed detecting means.

The engine output reducing means may preferably comprise means for retarding an ignition timing of the engine to thereby reduce the output torque. In this respect, it is noted that the reduction of the engine output torque is relatively highly responsive to a change in the the ignition timing (i.e., to an operation to retard the ignition timing).

The engine may be provided with a throttle valve controlled by a throttle actuator. In this case, the engine output reducing means may preferably comprise means for controlling the throttle actuator to reduce an opening angle of the throttle valve for thereby reducing the output torque of the engine. Since the reduction of the engine output torque is usually less responsive to a change in the opening angle of the throttle valve than to a change in the ignition timing, the threshold of the time lapse used for reducing the engine output torque even when the engine speed is not higher than the predetermined threshold as indicated above is set to be relatively low.

Where the engine is provided a throttle valve controlled by a throttle actuator, the engine output reducing means may preferably comprise first output reducing means for retarding an ignition timing of the engine to thereby reduce the output torque, and second output reducing means for controlling the throttle actuator to reduce an opening angle of the throttle valve for thereby reducing the output torque. In this case, the shift control apparatus further comprises determining means for determining whether it is impossible to retard the ignition timing of the engine. The first output reducing means is activated if the determining means determines that it is not impossible to retard the ignition timing, and the second output reducing means is activated if the determining means determines that it is impossible to retard the ignition timing. The determination by the determining means as to whether it is impossible to retard the ignition timing may be made depending upon the temperature of a catalyst provided in an exhaust pipe of the engine.

The shift control apparatus comprising the engine output reducing means may further comprise inertia phase determining means for determining whether the speed of the engine has entered an inertia phase during the period of the clutch-to-clutch shift of the transmission. In this case, the engine output reducing means is turned off when or a predetermined time after the inertia phase determining means has determined that the speed of the engine has entered the inertia phase. The motor vehicle may be adapted such that the output torque of the engine is reduced for reducing a shifting shock of the transmission in general, irrespective of the specific shift such as the clutch-to-clutch shift. Usually, this engine output torque reduction for reducing the shifting shock is initiated when the engine speed has entered the inertia phase during each shifting action of the transmission. If this engine output torque reduction is effected during the clutch-to-clutch shift, this reduction for reducing the shifting shock immediately follows the engine output torque reduction by the engine output reducing means according to the present invention, and the output torque of the engine is continuously reduced, without an interruption during the clutch-to-clutch shift, since the reduction by the engine output reducing means according to the present invention is terminated when or shortly after the inertia phase is initiated. If the engine torque reduction for reducing the shifting shock was initiated a certain time after the engine torque reduction according to the present invention is terminated, the driving comfort of the vehicle would be deteriorated.

The shift control apparatus comprising the engine output reducing means may further comprise means for inhibiting an operation of the excessive engine speed preventing means as soon as the engine output reducing means has been activated. This arrangement prevents deterioration of the driving comfort of the vehicle due to an operation of the excessive engine speed preventing means. The arrangement is advantageous particularly when the threshold of the engine speed used by the engine output reducing means is almost equal to the upper limit used by the excessive engine speed preventing means.

The second object indicated above may be achieved according to a sixth aspect of this invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift of the transmission from one of the operating positions to another of the operating positions, the shift control apparatus comprising (a) excessive engine speed preventing means for preventing a rise of a speed of the engine above an upper limit, (b) hydraulic control means for regulating hydraulic pressures of the two frictional coupling devices such that an amount of overshoot of the speed of the engine is held within a predetermined range during a period of the clutch-to-clutch shift, and (c) learning overshoot control means for effecting learning compensation of at least one of the hydraulic pressures as regulated by the hydraulic control means, when the amount of overshoot of the speed of the engine is outside the predetermined range; (d) determining means for determining whether the excessive engine speed preventing means is in operation; and (e) inhibiting means for inhibiting an operation of the learning overshoot control means, if the determining means determines that the excessive engine speed preventing means is in operation.

In the shift control apparatus according to the sixth aspect of the invention, the operation of the learning overshoot control means to effect the learning compensation of the hydraulic pressure or pressures of the frictional coupling device or devices is inhibited during the clutch-to-clutch shift of the transmission, if the determining means determines that the excessive engine speed preventing means is in operation. Therefore, the learning compensation by the learning overshoot control means is inhibited while the engine speed is restricted by the excessive engine speed preventing means. Thus, the learning overshoot control means is prevented from effecting erroneous learning compensation due to an influence of the operation of the excessive engine speed preventing means. If the hydraulic pressure of the frictional coupling device was compensated during a subsequent clutch-to-clutch shift of the transmission according to an erroneous compensation value obtained by the learning overshoot control means during operation of the excessive engine speed preventing means, the transmission would suffer from a shifting shock, leading to deteriorated driving comfort of the vehicle.

The shift control apparatus according to the above sixth aspect of this invention may further comprise feedback control means for regulating the hydraulic pressure of the other frictional coupling device such that a rate of change of the speed of the engine during the period of the clutch-to-clutch shift of the transmission coincides with a predetermined target value. In this instance, the inhibiting means inhibits an operation of the feedback control means as well as the operation of the learning overshoot control means, if the determining means determines that the excessive engine speed preventing means is in operation.

In the above apparatus wherein the inhibiting means inhibits the operation of the feedback control means as well as the operation of the learning overshoot control means during operation of the excessive engine speed preventing means, the feedback control means will not adversely influence the hydraulic pressure or pressures of the frictional coupling device or devices during the clutch-to-clutch shift of the transmission while the excessive engine speed preventing means is in operation.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which:

FIG. 2 is a view indicating a relationship between operating positions of the automatic transmission of FIG. 1 and respective combinations of operating states of a plurality of frictional coupling devices incorporated in the automatic transmission;

FIG. 14 is a view indicating a stored data map used for determining a compensating value by learning in steps SB9 and SB16 in the routine of FIG. 13;

FIG. 15 is a view indicating a stored relationship used for determining an initial value A in steps SB8 and SB15 in the routine of FIG. 13;

FIG. 16 is a view indicating a stored relationship used for determining a compensating value α in the steps SB9 and SB16 in the routine of FIG. 13;

FIG. 30 is a view indicating a stored relationship used for determining a compensating value $\Delta D_{SLU}$ by learning from the engine overshoot in step SE6 in the routine of FIG. 29 when a clutch-to-clutch shift of the transmission is automatically initiated; and FIG. 31 is a view indicating a stored relationship used for determining the compensating value $\Delta D_{SLU}$ by learning from the engine overshoot in step SE14 in the routine of FIG. 29 when a clutch-to-clutch shift of the transmission is initiated in response to an operation of the shift lever.

DETAILED DESCRIPTION OF THE PREFERRED EMBODIMENTS

Figure 1:
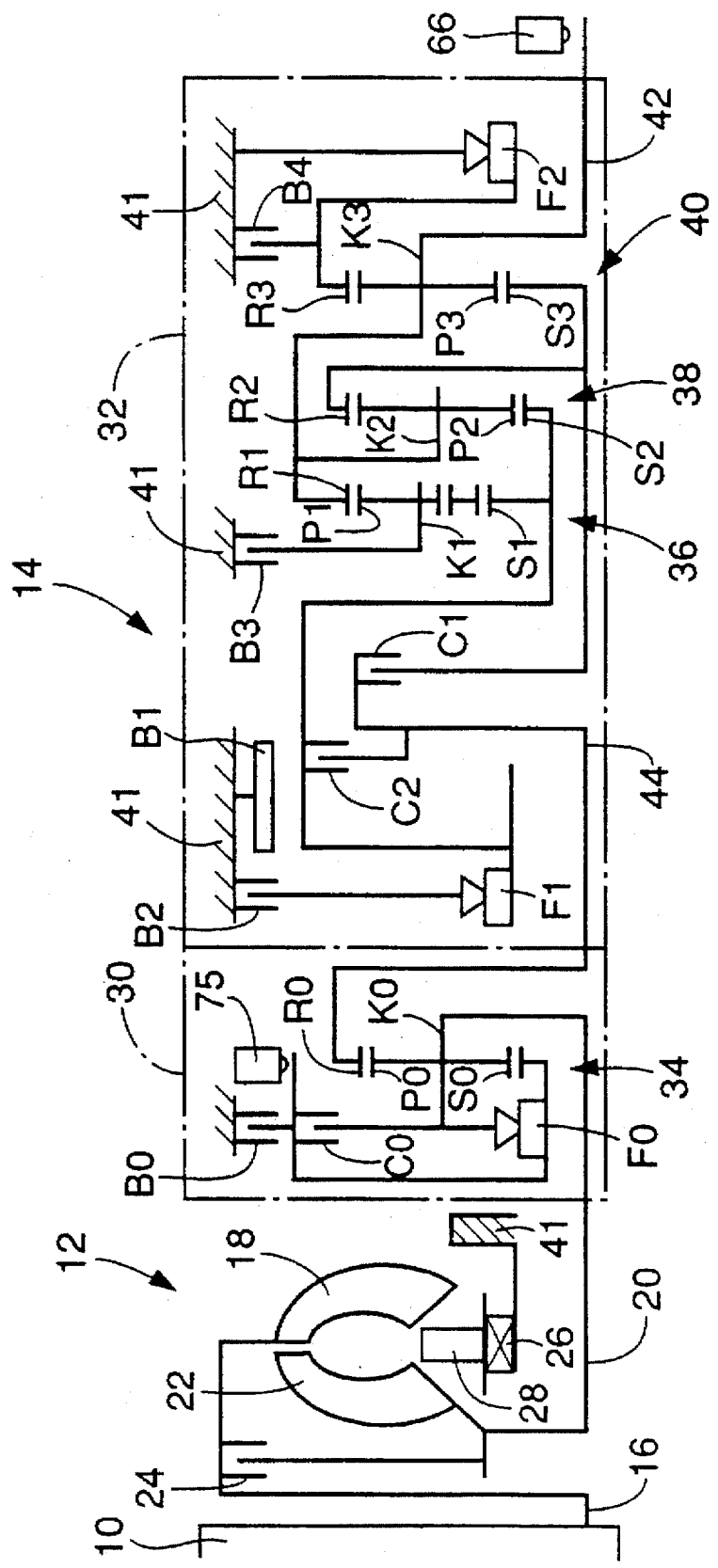
FIG. 1 is a schematic view showing a power transmitting system of a motor vehicle including an automatic transmission whose shifting actions are controlled by a shift control apparatus constructed according to one embodiment of this invention.

Referring first to the schematic view of FIG. 1, there is illustrated an example of a power transmitting system of a motor vehicle, which is shifted under control of a shift control apparatus according to one embodiment of the present invention. The vehicle has an engine 10 whose output is transmitted through a torque converter 12 to an automatic transmission 14. An output of the automatic transmission 14 is transmitted to drive wheels of the vehicle through a differential gear and an axle, as well known in the art.

The torque converter 12 is provided with a pump impeller 18 connected to a crankshaft 16 of the engine 10, a turbine runner 22 connected to an input shaft 20 of the automatic transmission 14, a lock-up clutch 24 for directly connecting the pump impeller 18 and the turbine runner 22, and a stator 28 which is prevented by a one-way clutch 26 from rotating in one direction.

The automatic transmission 14 includes a first transmission unit 30 having a high-speed position and a low-speed position that are selectively established, and a second transmission unit 32 having one rear drive position and four forward drive positions that are also selectively established. The first transmission unit 30 includes a HL planetary gear set 34 consisting of a sun gear S0, a ring gear R0, a carrier K0 and a planetary gear P0 which is rotatably supported by the carrier K0 and which meshes with the sun gear S0 and the ring gear R0. The first transmission unit 30 further includes a clutch C0 and a one-way clutch F0 which are disposed between the sun gear S0 and the carrier K0, and a brake B0 disposed between the sun gear S0 and a housing 41.

The second transmission unit 32 includes a first planetary gear set 36, a second planetary gear set 38 and a third planetary gear set 40. The first planetary gear set 36 consists of a sun gear S1, a ring gear R1, a carrier K1, and a planetary gear P1 which is rotatably supported by the carrier K1 and which meshes with the sun gear S1 and the ring gear R1. The second planetary gear set 38 consists of a sun gear S2, a ring gear R2, a carrier K2, and a planetary gear P2 which is rotatably supported by the carrier K2 and which meshes with the sun gear S2 and the ring gear R2. The third planetary gear set 40 consists of a sun gear S3, a ring gear R3, a carrier K3, and a planetary gear P3 which is rotatably supported by the carrier K3 and which meshes with the sun gear S3 and the ring gear R3.

The sun gears S1 and S2 are integrally connected to each other, while the ring gear R1, carrier K2 and carrier K3 are integrally connected to each other. The carrier K3 is connected to an output shaft 42 of the automatic transmission 14. The ring gear R2 and the sun gear S3 are integrally connected to each other. A clutch C1 is disposed between the integrally connected ring gear R2 and sun gear S3 and an intermediate shaft 44, while a clutch C2 is disposed between the integrally connected sun gears S1, S2 and the intermediate shaft 44. Further, a band brake B1 is provided on the housing 41 for inhibiting rotation of the sun gears S1, S2, and a one-way clutch F1 and a brake B2 are disposed in series connection with each other between the integrally connected sun gears S1, S2 and the housing 41. This one-way clutch F1 is engaged when a torque is applied to the sun gears S1, S2 so as to rotate these sun gears in a direction opposite to the direction of rotation of the input shaft 20.

A brake B3 is disposed between the carrier K1 and the housing 41, while a brake B4 and a one-way clutch F2 are disposed in parallel connection with each other between the ring gear R3 and the housing 41. This one-way clutch F2 is engaged when a torque is applied to the ring gear R3 so as to rotate the ring gear R3 in a direction opposite to the direction of rotation of the input shaft 20.

The automatic transmission 14 constructed as described above is shifted from one of six operating positions to another, by suitably selectively engaging and releasing the clutches C0–C2, brakes B0–B4 and one-way clutches F0–F2 as indicated in FIG. 2. The six operating positions of the transmission 14 consist of one rear drive position "Rev", and five forward drive positions "1st", "2nd", "3rd", "4th" and "5th" having different speed reduction ratios. In FIG. 2, white circles in the rectangular blocks indicate the engaged state of the appropriate clutch, brake or one-way clutch in normal running of the vehicle, and blanks in the blocks indicate the released state of the appropriate clutch, brake or one-way clutch. Further, black circles in the blocks indicate the engaged state of the clutch C0 and the brakes B1 and B4 during running of the vehicle in an engine-brake mode in which a torque is transmitted from the drive wheels to the engine 10 through the power transmitting system. It will be understood from FIG. 2 that the brake B3 is engaged for shifting up the automatic transmission 14 from the first-speed position (first gear) "1st" to the second-speed position (second gear) "2nd", and is released for shifting up the transmission 14 from the second-speed position "2nd" to the third-speed position (third gear) "3rd", while the brake B2 is engaged for shifting up the transmission 14 from the second-speed position "2nd" to the third-speed position "3rd". Therefore, when the transmission 14 is shifted up from the second-speed position "2nd" to the third-speed position "3rd", the brake B3 is released while at the same time the brake B2 is engaged. Thus, the shifting actions of the transmission 14 from the second-speed position "2nd" to the third-speed position "3rd" and vice versa are examples of the so-called "clutch-to-clutch shift" of the automatic transmission 14. The other shifting actions of the transmission 14 are accomplished by an engaging or releasing action of one clutch or brake. In the present embodiment, the principle of the invention is applied to only the clutch-to-clutch shift from the second-speed position to the third-speed position, since this shift conventionally suffers from the problems discussed below.

Figure 3:
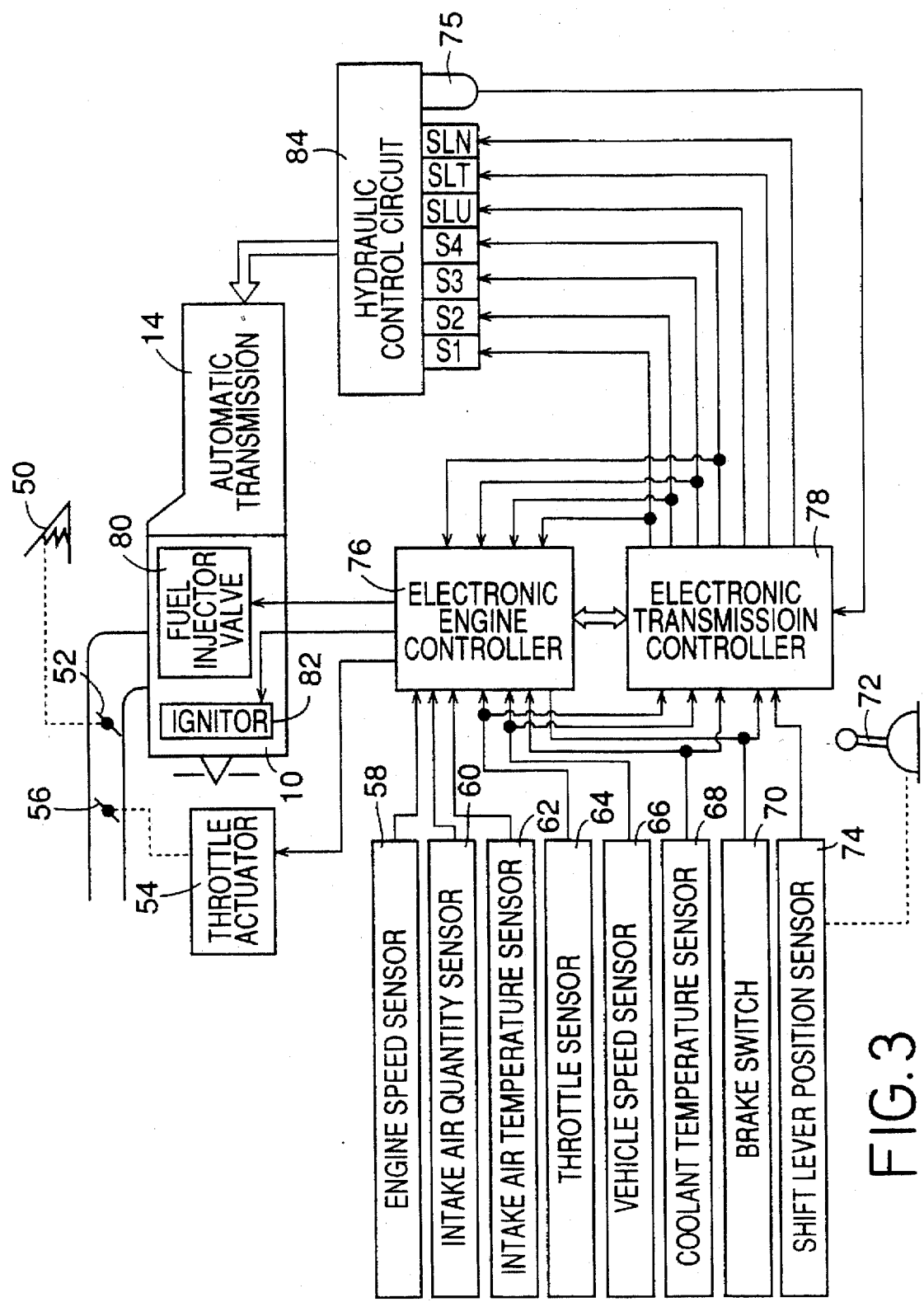
FIG. 3 is a block diagram showing a hydraulic and an electronic control system for controlling the power transmitting system and an engine of the vehicle as shown in FIG. 1.

As shown in FIG. 3, the engine 10 is provided with an intake pipe in which there are disposed a first throttle valve 52 manually operated by an accelerator pedal 50, and a second throttle valve 56 automatically operated by a throttle actuator 54. The engine 10 provided with the throttle actuator 54, a fuel injector valve 80 and an ignitor 82 is controlled by an electronic engine controller 76, while the automatic transmission 14 is controlled by an electronic transmission controller 78 through a hydraulic control circuit 84. These electronic controllers 76, 78 are adapted to receive output signals of various sensors such as: an engine speed sensor 58 for detecting a speed $N_E$ of the engine 10; an intake air quantity sensor 60 for detecting an intake air quantity Q of the engine 10; an intake air temperature sensor 62 for detecting a temperature $T_A$ of an intake air supplied to the engine 10; a throttle sensor 64 for detecting an opening angle $\theta_{TH}$ of the first throttle valve 52; a vehicle speed sensor 66 for detecting a running speed V of the vehicle on the basis of a rotating speed $N_{OUT}$ of the output speed 42 of the automatic transmission 14; a coolant temperature sensor 68 for detecting a temperature $T_W$ of a coolant water of the engine 10; a brake switch 70 for detecting an operated state BK of a brake pedal for brake application to the vehicle; and a shift lever position sensor for detecting a selected position $P_{SH}$ of a shift lever 72 for the automatic transmission 14. The transmission controller 78 also receives an output signal of an oil temperature sensor 75 indicative of a temperature $T_{OIL}$ of a working oil in the hydraulic control circuit 84.

Figure 4:
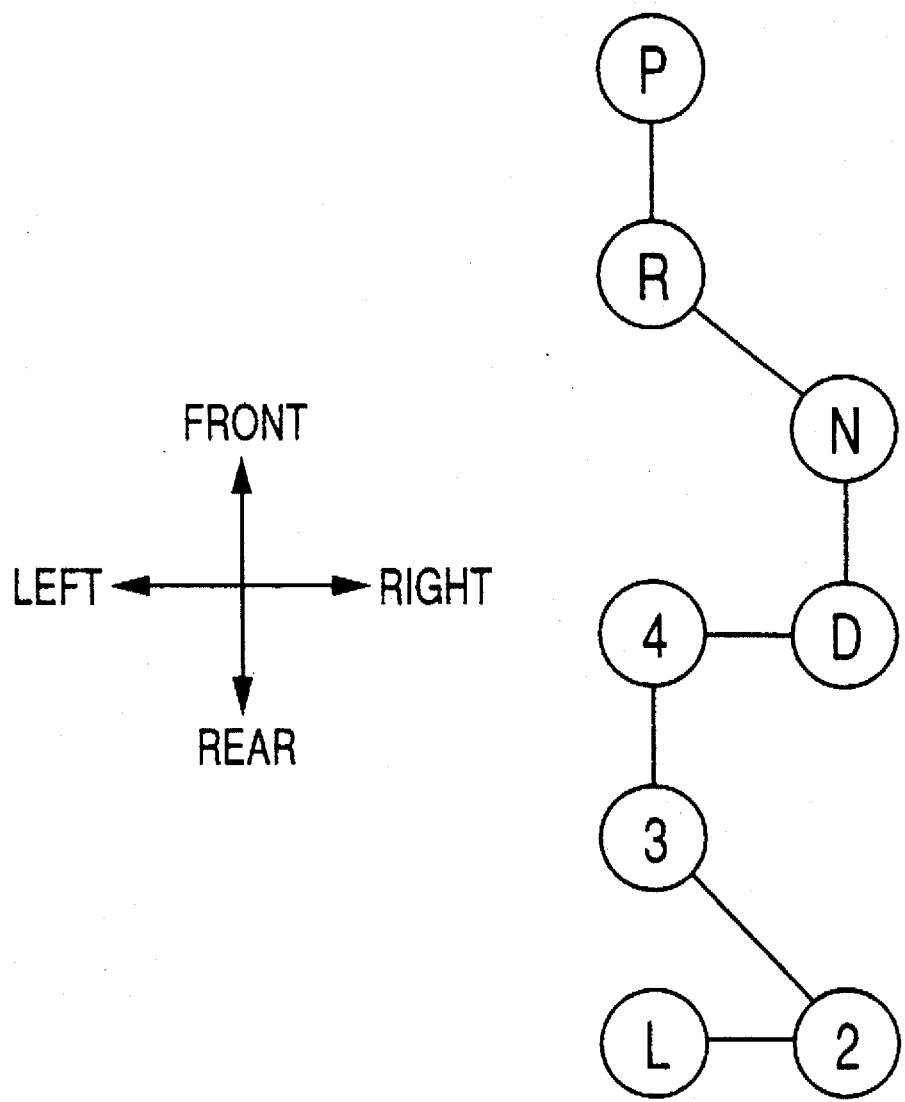
FIG. 4 is a view showing operating positions of a shift lever provided on the vehicle as shown in FIG. 3.

The shift lever 72 has a total of eight operating positions, namely, PARKING "P", REVERSE "R", NEUTRAL "N", DRIVE "D", FOURTH "4", THIRD "3", SECOND "2" and LOW "L". These positions are selected by operating the shift lever 72 in the longitudinal (front and rear) and transverse (right and left) directions of the vehicle, as indicated in FIG. 4. The shift lever 72 is supported by a suitable mechanism such that the positions "D" and "4" are alternately selected by moving the shift lever 72 in the right and left directions. Similarly, the positions "2" and "L" are alternately selected by moving the shift lever 72 in the right and left directions.

The electronic engine controller 76 is a so-called microcomputer incorporating a central processing unit (CPU), a random-access memory (RAM), a read-only memory (ROM), and an input and output interface. The CPU operates to process the input signals and produce output signals for controlling the engine 10, according to control programs stored in the ROM, while utilizing a temporary data storage function of the RAM. For instance, the engine controller 76 controls the fuel injector valve 80 for controlling a fuel supply to the engine 10, and controls the ignitor 82 for controlling the ignition timing of the engine 10. The engine controller 76 also controls a by-pass valve for controlling an idling speed of the engine 10, and controls the throttle actuator 54 for controlling the second throttle valve 56 to effect a traction control of the drive wheels. The engine controller 76 is also adapted to effect a fuel cut by closing the fuel injector valve 80 when the engine speed $N_E$ exceeds a predetermined upper limit. The engine controller 76 and the transmission controller 78 are connected to each other for interactive communication or data transfer, so that the input signals required by one of these two controllers 76, 78 may be received from the other controller.

Figure 11:
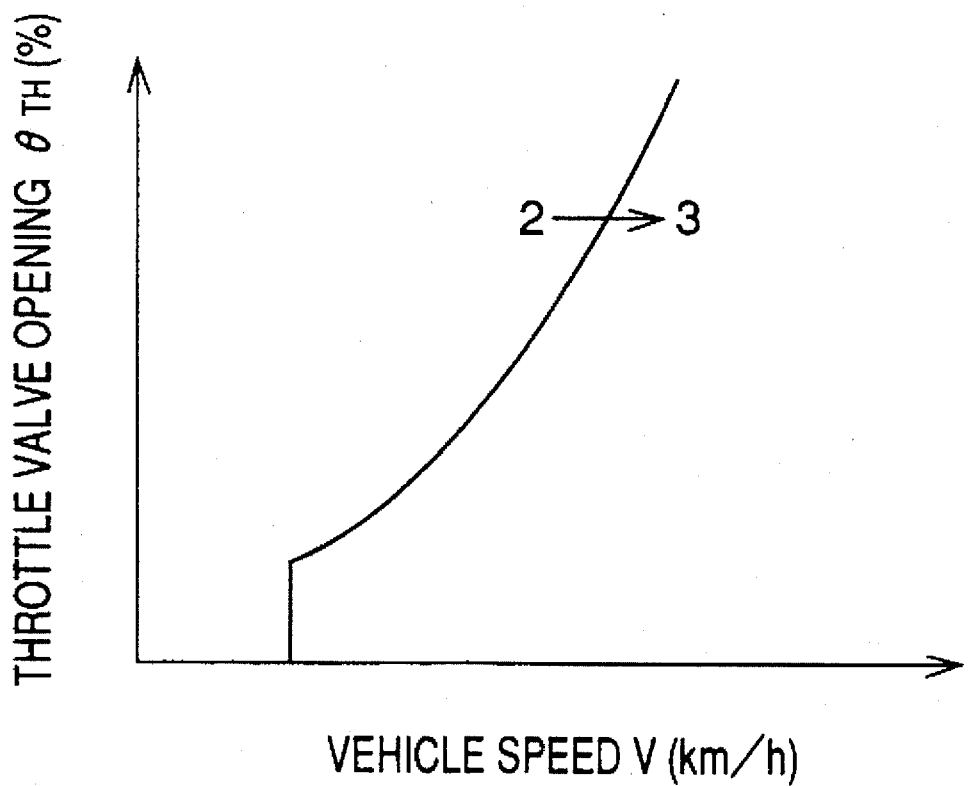
FIG. 11 is a graph indicating a shift boundary line used for effecting a clutch-to-clutch shift of the automatic transmission in the embodiment of FIG. 3.

Like the engine controller 76, the transmission controller 78 is a microcomputer whose CPU operates to process the input signals and produce output signals for controlling various solenoid-operated valves and linear solenoids of the hydraulic control circuit 84 to control the automatic transmission 14, according to control programs stored in a ROM, while utilizing a temporary data storage function of a RAM. The linear solenoid valves include: a linear solenoid valve SLT for generating a THROTTLE pressure $P_{TH}$ corresponding to the opening angle $\theta_{TH}$ of the first throttle valve 52; a linear solenoid valve SLN for controlling an accumulator back pressure; and a linear solenoid valve SLU for fully engaging or releasing the lock-up clutch 24 or partially engaging the lock-up clutch 24 in a slip control fashion, and for effecting the clutch-to-clutch shift of the transmission 14, for example, for shifting up the transmission 14 from the second-speed position "2nd" to the third-speed position "3rd". The solenoid-operated valves include valves S1–S4. The transmission controller 78 selects one of the operating positions of the automatic transmission 14 and selects the engaged or released state of the lock-up clutch 24, on the basis of the detected throttle opening angle $\theta_{TH}$ and vehicle speed V, and according to predetermined shift patterns stored in the ROM. The shift patterns are relationships between the throttle opening angle $\theta_{TH}$ and the vehicle speed V. The solenoid-operated valves S1, S2, S3 are controlled so as to shift the transmission 14 to the selected position, while the solenoid-operated valve S4 and to place the lock-up clutch 24 in the selected state. The solenoid-operated valve S4 is activated when the engine brake is applied to the vehicle. The shift patterns indicated above correspond to the respective positions of the transmission 14 which are to be established by a shifting action. FIG. 11 shows an example of the shift pattern used for determining whether the transmission 14 should be shifted up from the second-speed position "2nd" to the third-speed position "3rd", that is, whether the clutch-to-clutch shift of the transmission 14 should be effected.

Figure 5:
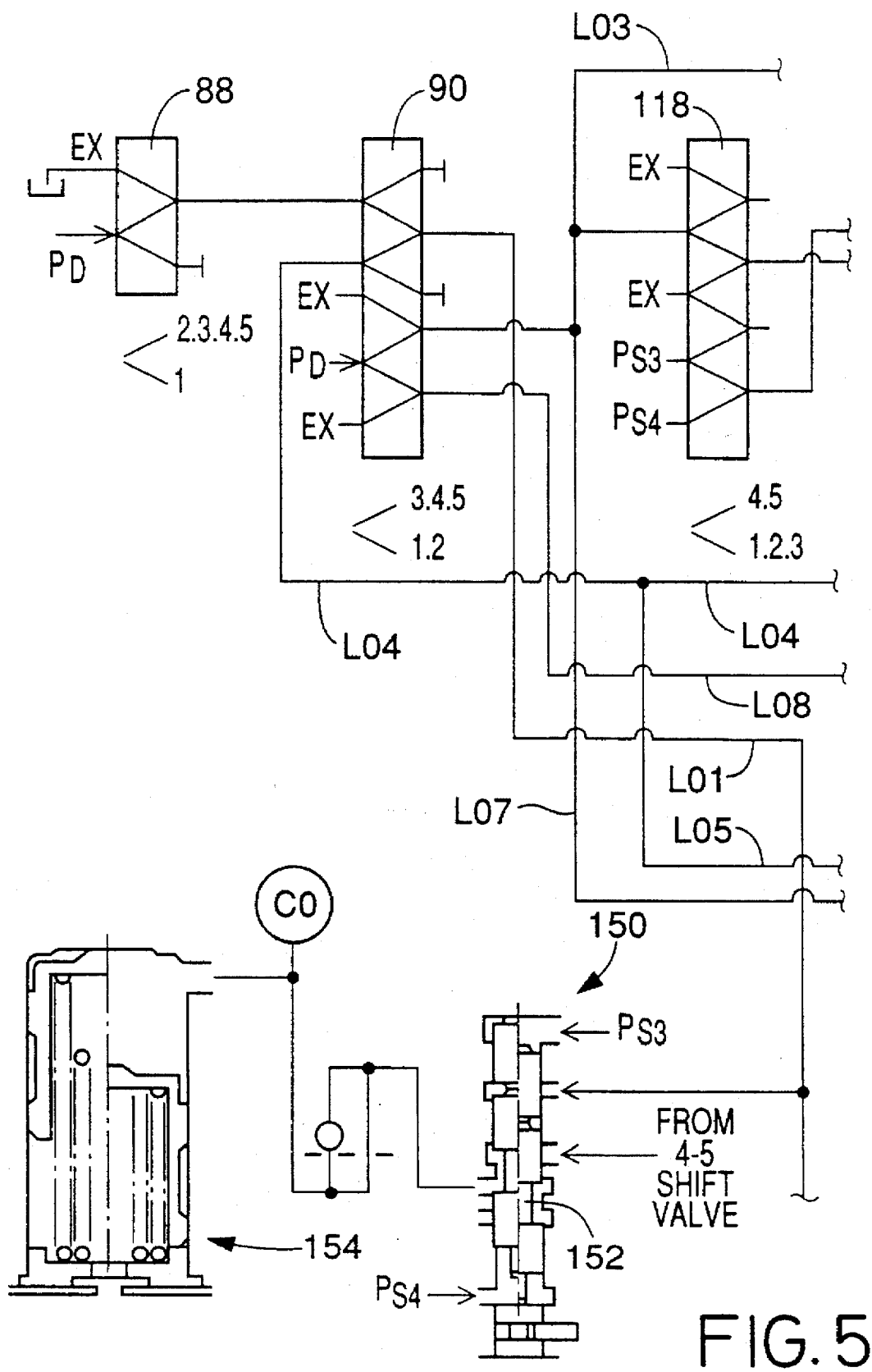
FIG. 5 is a fragmentary view illustrating a part of the hydraulic control system shown in FIG. 3.
Figure 6:
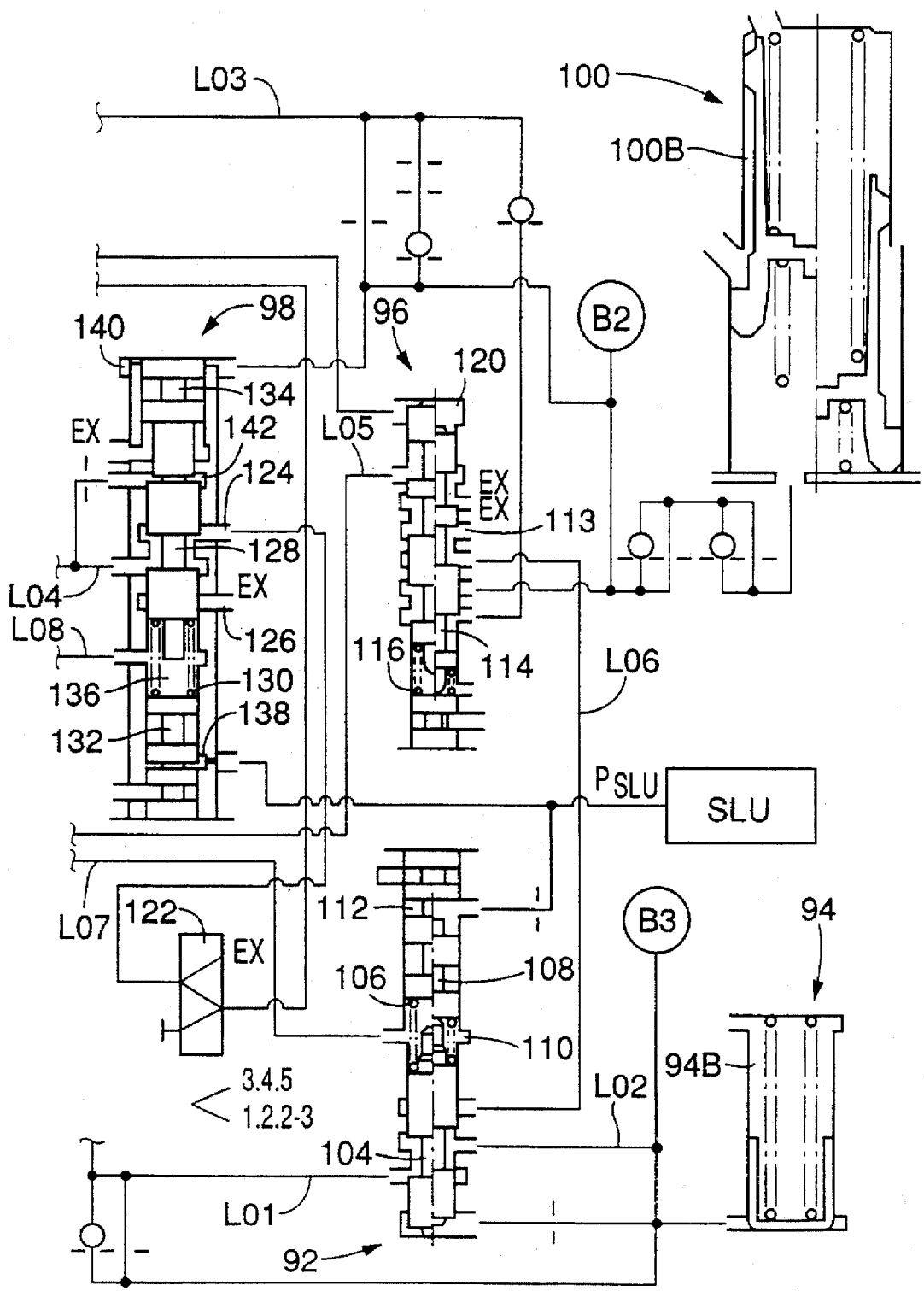
FIG. 6 is a fragmentary view illustrating another part of the hydraulic control system shown in FIG. 3.

Referring to FIGS. 5 and 6, there will be described the hydraulic control circuit 84, which includes a 1–2 shift valve 88 and a 2–3 shift valve 90 which are operated according to output pressures of the solenoid-operated valves S1 and S2, for shifting up the transmission 14 from the first-speed position to the second-speed position, and from the second-speed position to the third-speed position, respectively. In FIG. 5, numerals given below the shift valves 88 and 90 indicate the positions of the transmission 14 to be selected when the corresponding positions of the valves 88, 90 are selected. A FORWARD pressure $P_D$ is generated by a manual valve (not shown) when the shift lever 72 is placed in one of the forward drive positions "D", "4", "3", "2" and "L". The FORWARD pressure $P_D$ is controlled on the basis of a LINE pressure $P_L$ which is regulated by a pressure regulating valve (not shown) so as to be increased with an increase in the throttle opening angle $\theta_{TH}$.

When the transmission controller 78 generates a command for shifting the automatic transmission 14 from the first-speed position to the second-speed position, the FORWARD pressure $P_D$ is applied to the brake B3 and a B3 accumulator 94 through the 1–2 shift valve 88, 2–3 shift valve 90, a line L01, a B3 control valve 92 and a line L02. When the transmission controller 78 generates a command for shifting the automatic transmission 14 from the second-speed position to the third-speed position, the FORWARD pressure $P_D$ is applied to the brake B2 and a B2 accumulator 100 through the 2–3 shift valve 90 and a line L03, while at the same the working fluid in the brake B3 and B3 accumulator 94 is drained through the line L02, B3 controller valve 92, line L01, 2–3 shift valve 90, a return line L04 and a 2–3 timing valve 98, with the pressure of the fluid being suitably controlled, and the fluid is rapidly drained through a branch line L05 extending from the return line L04, and through a B2 orifice control valve 96 to which the branch line L05 is connected.

The B3 accumulator 94 and the B2 accumulator 100 have respective back pressure chambers 94B and 100B which receive an accumulator back pressure $P_{ACC}$ from accumulator back pressure control valves (not shown), which generate the pressure $P_{ACC}$ on the basis of an output pressure $P_{SLT}$ of the linear solenoid valve SLT and an output pressure $P_{SLN}$ of the linear solenoid valve SLN, respectively, when the transmission 14 is shifted from the first-speed position to the second-speed position or from the second-speed position to the third-speed position.

As shown in FIG. 6, the B3 control valve 92 has: a spool 104 for connection and disconnection between the lines L01 and L02; a spring 106 biasing the spool 104; a plunger 108 which is disposed concentrically with the spool 104 on one side of the spring 106 remote from the spool 104 and which has a larger diameter than the spool 104; a pressure chamber 110 in which the spring 106 is accommodated and which is adapted to receive the FORWARD pressure $P_D$ through a line L07 when the pressure $P_D$ is generated from the 2–3 shift valve 90 upon operation thereof to a position corresponding to the third-speed position of the transmission 14; and a pressure chamber 112 which is partially defined by the end face of the plunger 108 remote from the spring 106 and which is adapted to receive the output pressure $P_{SLU}$ of the linear solenoid valve SLU. To establish the second-speed position of the transmission 14, the spool 104 of the B3 control valve 92 is initially moved to an open position (fast fill position) indicated on the left side of its centerline as shown in FIG. 6, by the output pressure $P_{SLU}$ of the linear solenoid valve SLU. Then, an engaging pressure $P_{B3}$ in the brake B3 is regulated according to the following equation (1) on the basis of the output pressure $P_{SLU}$ by feeding the fluid from the line L01 to the line L02 or by discharging the fluid from the line L02 to a drain line L06.

$$P_{B3}=P_{SLU} \cdot S_1/S_2 \qquad (1)$$

where, $S_1$: cross sectional area of the plunger 108, $S_2$: cross sectional area of the spool 104

When the transmission 14 is placed in the third-speed position or any one of its positions whose speed reduction ratio is lower than that of the third-speed position, the spool 104 of the B3 control valve 92 is locked in the open position indicated above, by the FORWARD pressure $P_D$ applied from the 2–3 shift valve 92 to the pressure chamber 110. This arrangement prevents a change in the volume of the pressure chamber 112 of the B3 control valve 92 to thereby avoid an influence of that volume change on the pressure regulating operation of the 2–3 timing valve 98 during the shifting of the transmission 14 from the second-speed position to the third-speed position, even though the pressure chamber 112 of the B3 control valve 92 communicates with a pressure chamber 138 of the 2–3 timing valve 98.

The B2 orifice control valve 96 has: a spool 114 for connection and disconnection between the brake B2 and B2 accumulator 100 and the line L03 and between the drain line L06 and a drain port 113; a spring 116 for biasing the spool 114 toward a fast drain position thereof; and a pressure chamber 120 which is partially defined by the end face of the spool 114 remote from the spring 116 and which is adapted to receive an output pressure $P_{S3}$ of the third solenoid-operated valve S3 through a 3–4 shift valve 118. When the transmission 14 is shifted down from the third-speed position to the second-speed position, for example, the third solenoid-operated valve S3 is turned on and its output pressure $P_{S3}$ is not applied to the pressure chamber 120, so that the spool 114 is moved to the first drain position in which the brake B2 and B2 accumulator 100 are communicated with the line L03, whereby the brake B2 and B2 accumulator 100 are rapidly drained. When the transmission 14 is shifted up from the first-speed position to the second-speed position, the third solenoid-operated valve S3 is turned off to apply the output pressure $P_{S3}$ to the pressure chamber 120 of the B2 orifice control valve 96, and the drain port 113 is communicated with the drain line L06, whereby the B3 control valve 92 is permitted to regulate the pressure in the brake B3. Upon completion of the shifting of the transmission 14 from the first-speed position to the second-speed position, the third solenoid-operated valve S3 is turned on to disconnect the drain port 113 from the drain line L06, whereby the B3 control valve 92 is inhibited from operating to control the pressure in the brake B3.

The 2–3 timing valve 98 is operated upon shifting of the transmission 14 from the second-speed position to the third-speed position, and functions as a pressure regulating valve for regulating the releasing pressure in the brake B3 according to the output pressure $P_{SLU}$ of the linear solenoid valve SLU. Described more specifically, the 2–3 timing valve 98 has: an input port 124 to which is applied the FORWARD pressure $P_D$ through the 3–4 shift valve 118 and a solenoid relay valve 122 when the FORWARD pressure $P_D$ is generated by the 2–3 shift valve 90 when the transmission 14 is commanded to be shifted from the second-speed position to the third-speed position; a drain port 126; a spool 128 for connecting the line L04 selectively to the input port 124 or drain port 126 to regulate the pressure $P_{B3}$ in the brake B3 during releasing of the brake B3; a spring 130 for biasing the spool 128; a first plunger 132 which is disposed concentrically with the spool 128 on one side of the spring 130 remote from the spool 128 and which has the same diameter as the spool 128; a second plunger 134 which is disposed concentrically with the spool 128 and abuttable on one end of the spool 128 remote from the spring 130 and which has a larger diameter than the spool 128; a pressure chamber 136 which accommodates the spring 130 and receives the FORWARD pressure $P_D$ through a line L08 when the FORWARD pressure $P_D$ is generated by the 2–3 shift valve 90 upon operation thereof to a position corresponding to the second-speed position of the transmission 14; a pressure chamber 138 which is partially defined by an end face of the first plunger 132 and which receives the output pressure $P_{SLU}$ of the linear solenoid valve SLU; a pressure chamber 140 which is partially defined by an end face of the second plunger 134 and which receives the pressure $P_{B2}$ in the brake B2; and a pressure chamber 142 which receives a feedback pressure.

When the transmission 14 is commanded to be shifted from the second-speed position to the third-speed position, the pressure $P_{B3}$ in the brake B3 in the process of a releasing action is regulated by the 2–3 timing valve 98, such that the pressure $P_{B3}$ decreases with an increase in the engaging pressure $P_{B2}$ in the brake B2 and increases with an increase in the output pressure $P_{SLU}$ of the linear solenoid valve SLU, according to the following equation (2):

$$P_{B3}=P_{SLU} \cdot S_3/(S_3-S_4)-P_{B2} \cdot S_5/(S_3-S_4) \qquad (2)$$

where, $S_3$: cross sectional area of the spool 128 (first plunger 132)

$S_4$: cross sectional area of a land of the spool 128 on the side of the second plunger 134

$S_5$: cross sectional area of the second plunger 134

The spool 128 of the 2–3 timing valve 98 is locked when the pressure chamber 136 receives the FORWARD pressure $P_D$ generated from the 2–3 shift valve 90 upon operation thereof to its position corresponding to the second-speed position of the transmission 14. This arrangement prevents a change in the volume of the pressure chamber 138 of the 2–3 timing valve 98 to thereby avoid an influence of that volume change on the pressure regulating operation of the B3 control valve 92 during the shifting of the transmission 14 from the first-speed position to the second-speed position, even though the pressure chamber 138 of the 2–3 timing valve 98 communicates with the pressure chamber 112 of the B3 control valve 92.

The hydraulic control circuit 84 further includes a C0 exhaust valve 150 including a spool 152 which is moved to its closed position according to the output pressure $P_{S3}$ of the third solenoid-operated valve S3 and the pressure in the line L01. The spool 152 is moved to its open position according to the output pressure $P_{S4}$ of the fourth solenoid-operated valve S4. In the open position, the LINE pressure $P_L$ received from a 4–5 shift valve (not shown) is applied to the clutch C0 and a C0 accumulator 154 when the transmission 14 is placed in any position other than the second-speed or fifth-speed position.

Figure 7:
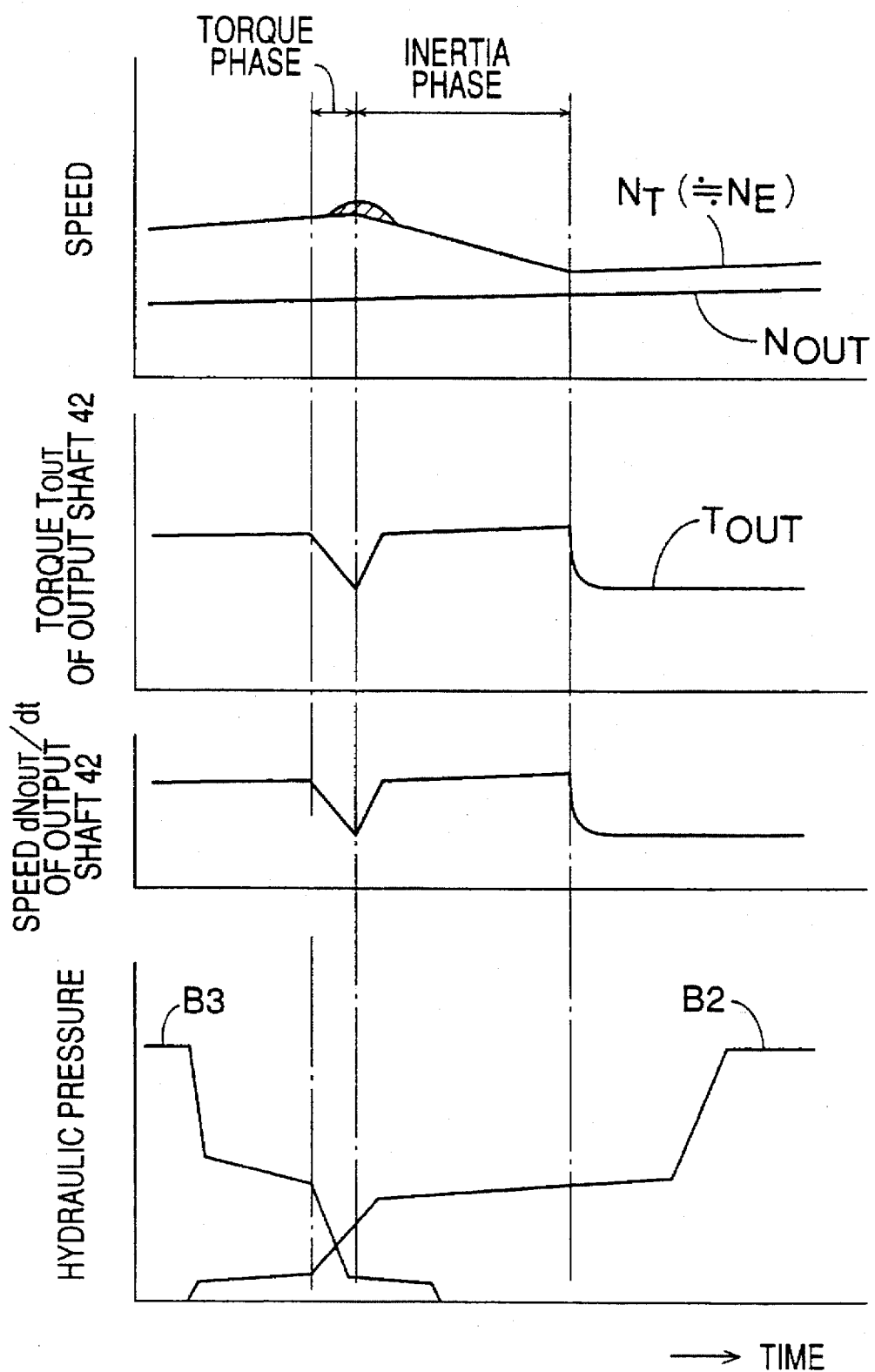
FIG. 7 is a time chart indicating changes in releasing and engaging hydraulic pressures in the two frictional coupling devices which are actuated by the hydraulic control system as shown in FIGS. 5 and 6 to effect a clutch-to- clutch shift of the transmission.

In the shift control apparatus constructed as described above, the automatic transmission 14 is commanded to be shifted from the second-speed position to the third-speed position when the transmission controller 78 determines that this shift-up action ("clutch-to-clutch shift") of the transmission 14 should be effected. In this case, the 2–3 shift valve 90 is operated from its position corresponding to the second-speed position of the transmission 14 to its position corresponding to the third-speed position. As a result, the FORWARD pressure $P_D$ is applied to the brake B2 through the 2–3 shift valve 90 and line L03. At the same time, the FORWARD pressure $P_D$ generated from the 2–3 shift valve 90 is applied to the pressure chamber 110 of the B3 control valve 92 to lock the spool 104 in its open position, while the lines L01 and L04 are connected to each other by the 2–3 shift valve 90, and the fluid in the pressure chamber 136 of the 2–3 timing valve 98 is discharged through the line L08 and the 2–3 shift vale 90. Thus, the brake B3 is released with its releasing pressure being regulated by the 2–3 timing valve 98 according to the pressure $P_{SLU}$. FIG. 7 shows an example of changes in the pressures $P_{B2}$ and $P_{B3}$ of the brakes B2 and B3 during the clutch-to-clutch shift of the automatic transmission 14 from the second-speed position "2nd" to the third-speed position "3rd".

Referring next to the block diagram of FIG. 8, there will be described various functional means of the electronic engine controller 76 and transmission controller 78 of the shift control apparatus constructed according to one embodiment of the present invention.

The engine controller 76 includes excessive engine speed preventing means 158 for inhibiting the fuel injection valve 80 from injecting a fuel into the intake pipe of the engine 10 to thereby cut a fuel supply to the engine 10, when the engine speed $N_E$ exceeds a predetermined threshold or upper limit $N_{EMAX}$. For example, the upper limit $N_{EMAX}$ is determined to be equal to a lower limit of an excessive engine speed range called a "red zone", or a level which is lower than that lower limit by a certain value. Usually, the fuel injector valve 80 is closed when the engine speed $N_E$ is in the red zone. The transmission controller 78 includes shift control means 160 for placing the automatic transmission 14 in a suitable one of its operating positions or gear positions and placing the lock-up clutch 24 in its engaged or released position, on the basis of the detected opening angle $\theta_{TH}$ of the first throttle valve 52 and the detected speed V of the vehicle, and according to predetermined shift patterns or shift boundary lines stored in the ROM of the transmission controller 78. The shift patterns correspond to the respective operating positions of the transmission 14, and one of the shift patterns which corresponds to the currently selected or established position of the transmission 14 is used to determine whether the transmission 14 is shifted from the current position to another position. Each shift pattern is a relationship between the throttle valve opening angle $\theta_{TH}$ and the vehicle speed V. The shift control means 160 controls the solenoid-operated valves S1, S2 and S3 to shift the transmission 14 to the determined new position and to place the lock-up clutch 24 in the engaged or released position as needed. When an engine brake should be applied to the vehicle, the shift control means 160 energizes the fourth solenoid-operated valve S4. Further, the shift control means 160 controls the transmission 14 depending upon the currently selected position of the shift lever 72, which has the five forward drive positions "D", "4", "3", "2" and "L". When the shift lever 72 is placed in the position "D", the shift control means 160 selectively places the transmission 14 in one of the five speed or gear positions "1st", "2nd", "3rd", "5th " and "5th " as indicated in FIG. 2, depending upon the detected throttle opening angle $\theta_{TH}$ and vehicle speed V. When the shift lever 72 is placed in the position "4", the shift control means selectively places the transmission 14 in one of the four speed positions "1st", "2nd", "3rd" and "4th". The positions "3", "2" and "L" of the shift lever 72 are referred to as engine braking positions. When the shift lever 72 is placed in engine braking position "3", the shift control means 160 selectively places the transmission 14 in one of the three speed positions "1st", "2nd" and "3rd". In this case, the third-speed position "3rd" is used as the engine braking position of the transmission 14. When the shift lever 72 is placed in the engine braking position "2", the shift control means 160 selectively places the transmission 14 in the first-speed or second speed position "1st" or "2nd", and the second-speed position "2nd" is used the engine braking position of the transmission 14. When the shift lever 72 is placed in the engine braking position "L", the shift control means 160 places the transmission 14 in the first-speed position, which is used as the engine braking position.

The transmission controller 78 further includes hydraulic control means 161 which is adapted to control the hydraulic pressure in one of the frictional coupling devices (brakes B2 and B3) associated with the clutch-to-clutch shift (e.g., a shift from the second-speed position "2nd" to the third-speed position "3rd") of the automatic transmission 14, by controlling the B3 control valve 92, for example, depending upon the input torque of the automatic transmission 14 and other suitable parameters, so that the engaging torque of the frictional coupling device under control is held at a value larger than a predetermined lower limit for a suitable length of time. The transmission controller 78 further includes overshoot control means 162 consists of one or both of learning overshoot control means 162a and real-time overshoot control means 162b. The learning overshoot control means 162a detects an amount of overshoot of the speed $N_E$ of the engine 10 in the process of the clutch-to-clutch shift of the transmission 14, and effects a learning compensation or adjustment of a hydraulic pressure controlled by the hydraulic control means 161, such that the amount of overshoot of the engine speed $N_E$ is held within a predetermined optimum or permissible range. For instance, the learning overshoot control means 162a adjusts the releasing pressure of the brake B3 which is regulated by the 2-3 timing valve 98 according to the output pressure $P_{SLU}$ of the linear solenoid valve SLU. Described more specifically, a learning compensation value for the hydraulic pressure of the frictional coupling device in question (e.g., releasing pressure of the brake b3) is determined on the basis of the detected amount of overshoot of the engine speed, when the speed $N_T$ of the input shaft 20 (almost equal to the engine speed $N_E$) enters an inertia phase as indicated in FIG. 7 during the present clutch-to-clutch shift of the transmission 14. The input shaft speed $N_T$ (engine speed $N_E$) is lowered in the inertia phase. The learning compensation value is determined so as to reduce or eliminate the engine speed overshoot. In the next or subsequent clutch-to-clutch shift, the hydraulic pressure in question is compensated according to the determined learning compensation value. The real-time overshoot control means 162b detects the amount of overshoot of the engine speed in each clutch-to-clutch shift of the transmission 14, and compensates the hydraulic pressure to be controlled by the hydraulic control means 161 such that the detected amount of engine speed overshoot is held within the optimum range. This compensation by the real-time overshoot control means 162b is effected for a period between the moment when a torque phase of the engine speed $N_E$ is detected and the moment when the inertia phase is detected. The amount of overshoot of the engine speed $N_E$ is an amount of change of the engine speed $N_E$ indicated by hatched area in FIG. 7. For instance, the amount of overshoot of the engine speed $N_E$ can be calculated as a difference between a product ($N_{OUT} \times i$) of the output speed $N_{OUT}$ of the output shaft 42 of the transmission 14 and the gear ratio "i" of the currently selected position of the transmission 14, and the speed $N_T$ of the turbine runner 22 of the torque converter 12, which is almost equal to the engine speed $N_E$.

The transmission controller 78 also includes tie-up control means 164 for controlling the hydraulic pressure of one of the frictional coupling devices associated with the clutch-to-clutch shift of the transmission 14, such that the frictional coupling devices tend to have a tie-up phenomenon. The tie-up control means 164 may be optionally adapted to detect the amount of tie-up of the frictional coupling devices during the present clutch-to-clutch shift of the transmission 14, and determines a learning compensation value for the hydraulic pressure in question on the basis of the detected amount of tie-up, so that the amount of tie-up is held within a predetermined optimum or permissible range if the hydraulic pressure is adjusted by the determined learning compensation value. In the next or subsequent clutch-to-clutch shift, the hydraulic pressure in question is adjusted according to the determined learning compensation value.

The transmission controller 78 further includes engine state detecting means 166 for detecting the operating state of the engine 10 as represented by the opening angle $\theta_{TH}$ of the first throttle valve 52 and the engine speed $N_E$. In the present embodiment, the throttle sensor 64 and the engine speed sensor 10 constitute the engine state detecting means 166. The controller 78 also includes first inhibiting means 170 for inhibiting an operation of controlling the hydraulic pressure (e.g., $P_{B3}$) in one of the two frictional coupling devices (brakes B2 and B3) associated with the clutch-to-clutch shift of the transmission 14 as explained above, if the detected operating state of the engine 10 is expected to cause activation of the excessive engine speed preventing means 158 to prevent an excessive rise of the engine speed $N_E$ during the clutch-to-clutch shift. For example, the first inhibiting means 170 determines whether the detected running condition of the vehicle indicates a possibility of the engine speed $N_E$ exceeding the predetermined upper limit $N_{EMAX}$, and inhibits the overshoot control means 162 from operating to effect the learning compensation of the hydraulic pressure in question, while commanding the tie-up control means 164 to control the hydraulic pressure. For instance, the tie-up control means 164 controls the hydraulic pressure to be controlled by the hydraulic control means 161, such that the two frictional coupling devices (B2 and B3) tend to have a tie-up phenomenon. According to this hydraulic pressure control by the tie-up control means 164, the engaging and releasing actions of the frictional coupling devices are controlled so as to have a suitable degree of tie-up tendency.

The controller 78 also includes automatic shift determining means 172 for determining whether a decision to effect the clutch-to-clutch shift of the transmission 14 from the second-speed position "2nd" to the third-speed position "3rd" has been made on the basis of the detected running condition of the vehicle (throttle opening angle $\theta_{TH}$ and vehicle speed V) and according to the appropriate shift pattern (corresponding to the second-speed position). This clutch-to-clutch shift determined to be effected based on the detected vehicle running condition will be referred to as "automatic clutch-to-clutch shift". If the decision to effect the automatic clutch-to-clutch shift has been made, the automatic shift determining means 172 enables the first inhibiting means 170 to operate to inhibit the operation of the overshoot control means 162. The first inhibiting means 170 is connected to resetting means 174 which is adapted to disable the first inhibiting means 170 to operate, and thereby permit the operation of the overshoot control means 162, when any operation to reduce the output of the engine 10 has been detected. For example, the reduction of the engine output can be represented by a decrease in the detected throttle opening angle $\theta_{TH}$ or in the amount of operation or depression of the accelerator pedal 50.

The transmission controller 78 further includes manual shift determining means 176 for determining whether a decision to effect the clutch-to-clutch shift of the transmission 14 from the second-speed position to the third-speed position has been made upon detection of an operation of the shift lever 72 by the vehicle operator from the engine braking position "2" to the engine braking position "3". Although this clutch-to-clutch shift upon operation of the shift lever 72 is also effected automatically, this shift will be referred to as "manual clutch-to-clutch shift". An output of the manual shift determining means 176 is applied to second inhibiting means 178. When the decision to effect the manual clutch-to-clutch shift has been made based on the manual operation of the shift lever 72, the manual shift determining means 176 enables the second inhibiting means 178 to operate to inhibit the operation of the overshoot control means 162 and commands the tie-up control means 164 to control the hydraulic pressure in question, if the engine speed $N_E$ prior to the initiation of the manual clutch-to-clutch shift is higher than the upper limit $N_{EMAX}$.

Figure 9:
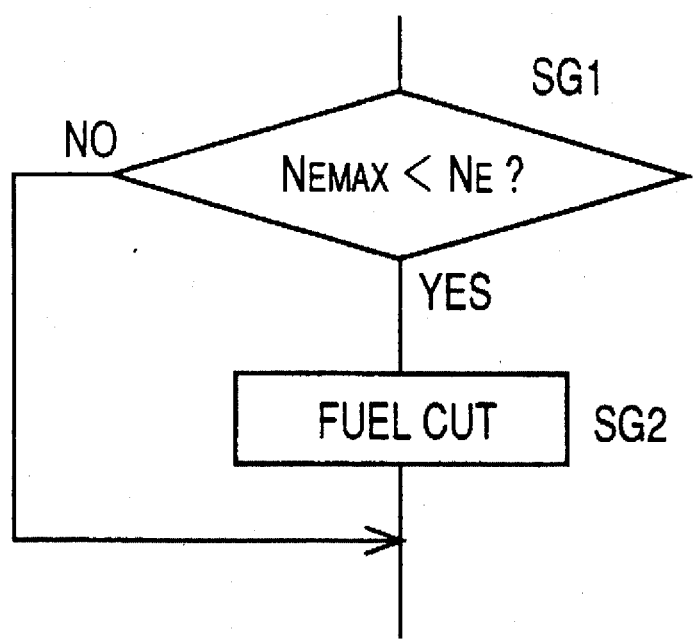
FIG. 9 is a flow chart illustrating a part of an operation of the engine controller shown in FIG. 3.

Referring to the flow chart of FIG. 9, there is illustrated a part of a control routine executed by the engine controller 76. This control routine is initiated with step SG1 to determine whether the engine speed $N_E$ exceeds the predetermined upper limit $N_{EMAX}$, which is equal to the lower limit of the excessive engine speed range, or close to that lower limit. If a negative decision (NO) is obtained in step SG1, the next step SG2 is skipped. If an affirmative decision (YES) is obtained in step SG1, the control flow goes to the next step SG2 in which the fuel injection valve 80 is closed to cut the fuel supply to the engine 10. That is, the fuel supply to the engine 10 is continued as long as the engine speed $N_E$ is lower than the upper limit $N_{EMAX}$, but is cut as soon as the engine speed $N_E$ has exceeded the upper limit $N_{EMAX}$. Thus, an excessive rise of the engine speed $N_E$ is prevented. It will be understood that a portion of the engine controller 76 assigned to implement steps SG1 and SG2 constitutes the excessive engine speed preventing means 158.

Figure 10:
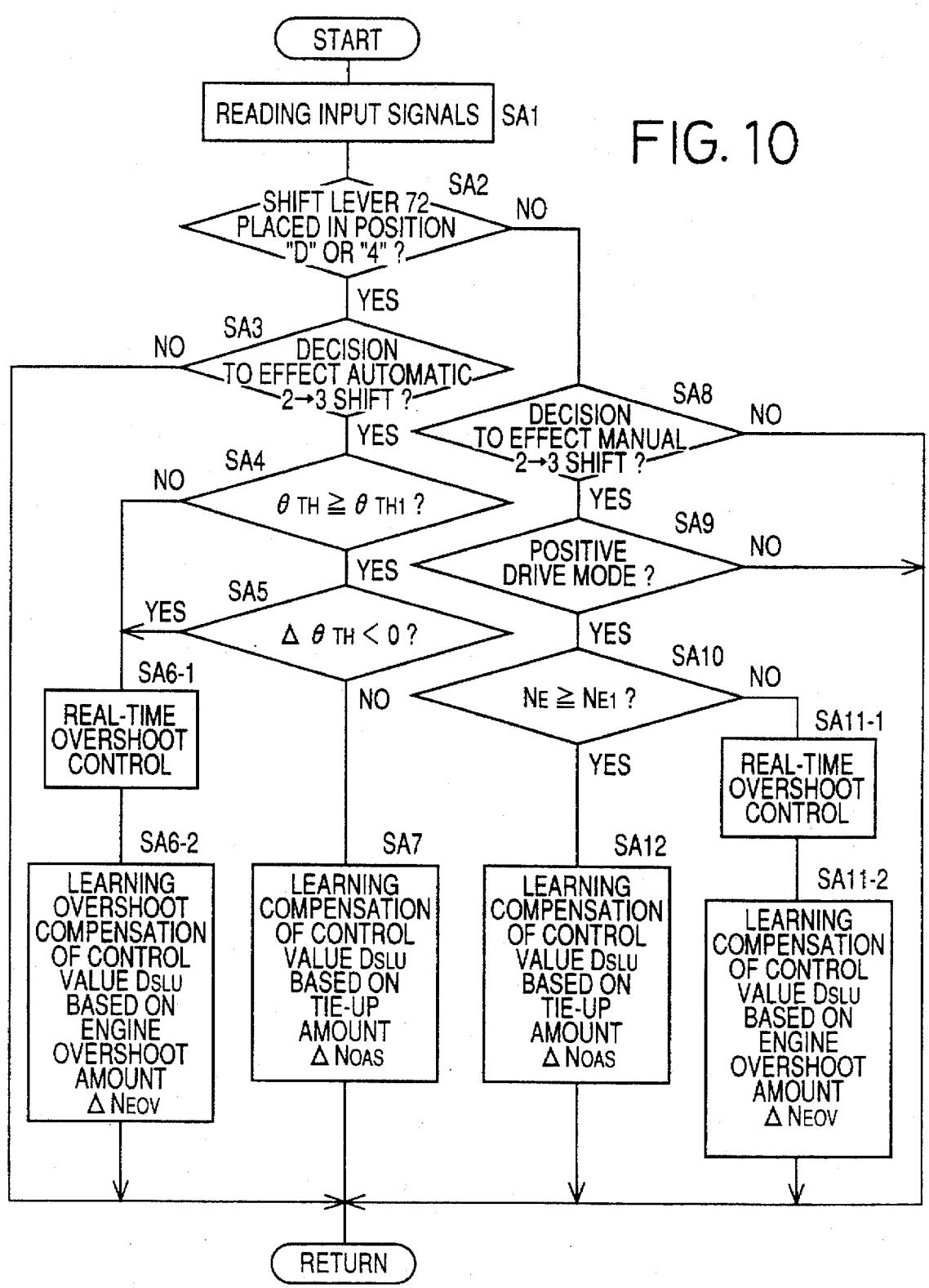
FIG. 10 is a flow chart illustrating a part of an operation of the transmission controller shown in FIG. 3.

Reference is now made to the flow chart of FIG. 10 illustrating a control routine executed by the transmission controller 78. The routine is initiated with step SA1 to read various input signals. Step SA1 is followed by step SA2 to determine whether the shift lever 72 is now placed in the position "D" or "4". If an affirmative decision (YES) is obtained in step SA2, it means that the decision or determination to effect the automatic clutch-to-clutch shift of the transmission 14 between the second-speed and third-speed positions "2nd" and "3rd" may be made depending upon the detected throttle opening angle $\theta_{TH}$ and vehicle speed V. In this instance, therefore, the control flow goes to step SA3 to determine whether the decision to effect the automatic clutch-to clutch shift (hereinafter referred to as "automatic $2\to3$ shift") of the transmission 14 has been made on the basis of the detected throttle opening angle $\theta_{TH}$ and vehicle speed V and according to the stored appropriate shift pattern as illustrated in the graph of FIG. 11 by way of example. A portion of the controller 78 assigned to implement step SA3 constitutes the automatic shift determining means 172 explained above.

If a negative decision (NO) is obtained in step SA3, one cycle of execution of the present control routine is terminated. If an affirmative decision (YES) is obtained in step SA3, the control flow goes to step SA4 to determine whether the detected throttle opening angle $\theta_{TH}$ is equal to or higher than a predetermined threshold $\theta_{TH1}$. This threshold $\theta_{TH1}$ is an upper limit of the throttle opening angle $\theta_{TH}$ above which the compensation of the releasing pressure of the brake B3 by the overshoot control means 162 cannot be suitably effected so as to maintain the overshoot amount of the engine speed $N_E$, leading to a possibility of the engine speed $N_E$ exceeding the upper limit $N_{EMAX}$, in the process of the automatic $2\to3$ shift of the transmission 14 during a running of the vehicle with a relatively high load. That is, when the vehicle speed V rises to a level to the right of the shift boundary line of FIG. 11 while the throttle opening angle $\theta_{TH}$ is relatively large, the decision to effect the automatic $2\to3$ clutch-to-clutch shift of the transmission 14 is made, and the affirmative decision (YES) is obtained in step SA3. In this case, the overshoot control means 162 is not capable of suitably compensating the releasing pressure $P_{B3}$ of the brake B3 during the $2\to3$ shift. In the present embodiment, the threshold $\theta_{TH}$ is set to be about 85% of the nominal 100% opening of the first throttle valve 52. It will be understood that the engine speed sensor 58 constitutes the engine state detecting means 166, while a portion of the controller 78 assigned to implement step SA4 constitutes the first inhibiting means 170 for inhibiting the operations of the learning overshoot control means 162a and the real-time overshoot control means 162b if it is determined that the engine speed $N_E$ may exceed the upper limit $N_{EMAX}$, causing the excessive engine speed preventing means 158 to operate for preventing an excessive rise of the engine speed $N_E$ above the upper limit $N_{EMAX}$.

If a negative decision (NO) is obtained in step SA4, it means that the vehicle running is not a high-load running which may cause the excessive engine speed preventing means 158 to be operated. In this case, therefore, the control flow goes to steps SA6-1 and SA6-2 in which the learning overshoot control means 162a and the real-time overshoot control means 162b are activated. In step SA6-2, the learning overshoot control means 162a detects an overshoot amount $\Delta N_{EOV}$ of the engine speed $N_E$ before the period of the inertia phase (FIG. 7) begins during the automatic $2\to3$ clutch-to-clutch shift of the transmission 14, and determines a learning compensation value $\Delta D_{SLU}$ for compensating a control value $D_{SLU}$ used to regulate the releasing pressure $P_{B3}$ of the brake B3 during the next or subsequent $2\to3$ clutch-to-clutch shift. The control value $D_{SLU}$ determines the output pressure $P_{SLU}$ of the linear solenoid valve SLU, which determines the pressure $P_{B3}$ of the brake B3 as described above with respect to the above equation (2). The learning compensation value $\Delta D_{SLU}$ is determined on the basis of the detected overshoot amount $\Delta N_{EOV}$ and according to a predetermined relationship between $\Delta D_{SLU}$ and $\Delta N_{EOV}$ so that the actual overshoot amount $\Delta N_{EOV}$ is held within a predetermined optimum or permissible range if the control value $D_{SLU}$ is changed by the determined learning compensation value $\Delta D_{SLU}$. The determined learning compensation value $\Delta D_{SLU}$ is stored in the ROM of the controller 78, and the stored learning compensation value $\Delta D_{SLU}$ is added to the control value $D_{SLU}$ used in the next or subsequent $2\to3$ shift. In other words, the stored learning compensation value $\Delta D_{SLU}$ determined in the last $2\to3$ clutch-to-clutch shift of the transmission 14 is added to the control value $D_{SLU}$ used in the present $2\to3$ shift in step SA6-2. Thus, the releasing pressure of the brake B3 during the $2\to3$ shift is suitably compensated according to the learning compensation value $\Delta D_{SLU}$ obtained on the basis of the engine overshoot amount $\Delta N_{EOV}$ in the last or previous $2\to3$ shift.

If an affirmative decision (YES) is obtained in step SA4, steps SA6-1 and SA6-2 are skipped, that is, the first inhibiting means 170 is activated to inhibit the operations of the overshot control means 162. In this case, the control flow goes to step SA5 corresponding to the resetting means 174 which detects a decrease in the engine output. In the present embodiment, step SA4 is formulated to determine whether an amount of change $\Delta\theta_{TH}$ of the throttle opening angle $\theta_{TH}$ per unit time (cycle time of the routine of FIG. 10) is a negative value. This amount of change $\Delta\theta_{TH}$ represents a rate of change $d\theta_{TH}/dt$ of the throttle opening angle $\theta_{TH}$. However, step SA4 may be formulated to determine whether an amount of change of the operating amount of the accelerator pedal 50 is a negative value. If an affirmative decision (YES) is obtained in step SA5, it means that the engine output is decreasing. In this case, the control flow goes to steps SA6-1 and SA6-2 to effect the compensation of the control value $D_{SLU}$ by the learning overshoot control means 162a and the real-time overshoot control means 162b. Thus, the inhibition of the operation of the overshoot control means 162 by the first inhibiting means 170 is released.

If a negative decision (NO) is obtained in step SA5, it means that the engine output is not decreasing, and steps SA6-1 and SA6-2 are skipped. Namely, the first inhibiting means 170 continues to inhibit the operations of the learning overshoot control means 162a and the real-time overshoot control means 162b. In this case, the control flow goes to step SA7 corresponding to the tie-up control means 164, in which the releasing pressure $P_{B3}$ of the brake B3 is regulated so that the two brakes B2 and B3 have a tie-up tendency, namely, the rate of reduction of the pressure $P_{B3}$ is lowered. More specifically, an amount of tie-up $\Delta N_{OAS}$ of the brakes B2, B3 before the input shaft speed $N_T$ enters the inertia phase is detected. Then, a learning compensation value $\Delta D_{SLU}$ is determined on the basis of the detected amount of tie-up $\Delta N_{OAS}$ and according to a predetermined relationship between $\Delta D_{SLU}$ and $\Delta N_{OAS}$, so that the actual amount of tie-up $\Delta N_{OAS}$ is held within a predetermined permissible or optimum range if the control value $D_{SLU}$ is changed by the determined compensation value $\Delta D_{SLU}$. The thus determined learning compensation value $\Delta D_{SLU}$ is stored in the ROM of the controller 78, so that the stored compensation value $\Delta D_{SLU}$ is added to the control value $D_{SLU}$ used in the next or subsequent 2→3 clutch-to-clutch shift of the transmission 14. In other words, the learning compensation value $\Delta D_{SLU}$ determined in the last 2→3 clutch-to-clutch shift is added to the control value $D_{SLU}$ used in the present 2→3 shift in step SA7. Thus, the releasing pressure of the brake B3 during the 2→3 shift is suitably compensated according to the learning compensation value $\Delta D_{SLU}$ obtained on the basis of the tie-up amount $\Delta N_{OAS}$ in the last or previous 2→3 shift. The tie-up amount $\Delta N_{OAS}$ may be obtained as a difference between the speed of the output shaft 42 of the transmission 14 upon initiation of the torque phase (FIG. 7) and the speed of the same upon initiation of the inertial phase. However, the tie-up amount $\Delta N_{OAS}$ may be determined by a time between the moment when the decision to effect the automatic 2→3 shift is made and the moment of initiation of the inertia phase, or by an amount of reduction of the torque of the output shaft 42 detected upon initiation of the inertia phase.

If a negative decision (NO) is obtained in step SA2, it means that the shift lever 72 is placed in one of the engine braking positions "1", "2" and "3". In this case, the control flow goes to step SA8 to determine whether the decision to effect the manual 2→3 clutch-to-clutch shift of the transmission 14 has been made. This decision may be made when the shift lever 72 is operated from the position "2" to the position "3", for example. If a negative decision (NO) is obtained in step SA8, one cycle of execution of the control routine of FIG. 10 is terminated. If an affirmative decision (YES) is obtained in step SA8, the control flow goes to step SA9 to determine whether the vehicle is running in a positive drive mode in which a drive force is transmitted from the engine 10 to the drive wheels of the vehicle. In this respect, it is noted that the compensation of the control value $D_{SLU}$ by the overshoot control means 162 and the tie-up control means 164 is not necessary when the vehicle is running in a negative drive or engine braking mode in which the drive force of the drive wheels is transmitted to the engine 10.

If a negative decision (NO) is obtained in step SA9, one cycle of execution of the present routine is terminated. If an affirmative decision (YES) is obtained in step SA9, step SA10 corresponding to the second inhibiting means 178 is implemented to determine whether the engine speed $N_E$ is equal to or higher than a predetermined threshold $N_{E1}$. This step SA10 is provided to determine whether the operating state of the engine 10 as represented by the detected engine speed $N_E$ may cause an excessive rise of the engine speed $N_E$ during the manual 2→3 clutch-to-clutch shift of the transmission 14 due to an insufficient effect of the learning overshoot control means 162a of compensating the control value $D_{SLU}$ (based on the previous engine overshoot amount $\Delta N_{EOV}$) in the process of the manual 2→3 shift during a high-load running of the vehicle with a relatively large throttle opening angle $\theta_{TH}$. The threshold $N_{E1}$ is determined to effect the above determination. If a negative decision (NO) is obtained in step SA10, the control flow goes to steps SA11-1 and SA11-2 corresponding to the overshoot control means 162, in which the learning overshoot control means 162a and the real-time overshoot control means 162b are operated. If an affirmative decision (YES) is obtained in step SA10, however, the control flow goes to step SA12 while skipping the steps SA11-1 and SA11-2. In step SA12, the tie-up control means 164 is operated to compensate the control value $D_{SLU}$ based on the previously obtained tie-up amount $\Delta N_{OAS}$ so that the brakes B2 and B3 have a tie-up tendency.

It will be understood from the above description of the present shift control apparatus that the first inhibiting means 170 is activated in step SA4 to inhibit the operation of the overshoot control means 162 in steps SA6-1 and SA6-2 when it is determined that the throttle opening angle $\theta_{TH}$ exceeds the threshold $\theta_{TH}$. This arrangement is effective to prevent an excessive amount of overshoot of the engine speed $N_E$ and a consequent excessive rise of the engine speed $N_E$, which may take place due to insufficient or inadequate functioning of the overshoot control means 162 during the automatic 2→3 clutch-to-clutch shift of the automatic transmission 14. Therefore, the present arrangement eliminates the conventionally experienced problem of deteriorated driving comfort of the vehicle caused by abrupt reduction of the engine output which would occur due to cutting of the fuel supply by activation of the excessive engine speed preventing means 150 during the 2→3 shift of the transmission 14.

The present embodiment is further adapted such that the hydraulic pressure $P_{B3}$ of the brake B3 is suitably controlled by learning compensation of the control value $D_{SLU}$ by the tie-up control means 164 based on the tie-up amount $\Delta N_{OAS}$ obtained in the last 2→3 shift, if the first inhibiting means 170 is operated to inhibit the operation of the overshoot control means 162. The tie-up control means 164 permits the hydraulic pressure $P_{B3}$ to be controlled during a high-load running of the vehicle so that the tie-up amount is held within the optimum range, namely, so that the frictional coupling devices in the form of the brakes B2 and B3 have a tie-up tendency. Consequently, the engine speed $N_E$ will not suffer from an excessive rise during the clutch-to-clutch shift of the transmission 14, assuring smooth running of the vehicle without an abrupt drop of the engine output.

In the present embodiment, the step SA5 or the resetting means 174 is provided to permit the operation of the learning overshoot control means 162a in step SA6-2 if a decrease in the engine output is detected, even after the affirmative decision (YES) is obtained in step SA4 corresponding to the first inhibiting means 170, that is, even where the operation in step SA6-2 (and step SA6-1) is once inhibited by the first inhibiting means 170. Further, the resetting means 174 resets or disables the first inhibiting means 170 if the engine output decrease is detected during inhibition of the operation of the learning overshoot control means 162a. This arrangement is effective to increase the frequency of implementation of step SA6-2 for learning compensation of the control value $D_{SLU}$ (pressure $P_{B3}$) by the learning overshoot control means 162 on the basis of the previously obtained engine overshoot amount. In this respect, it is noted that the learning compensation in step SA6-2 is relatively easy and accurate. Therefore, the present arrangement assures smooth engaging and releasing actions of the brakes B2, B3 in the 2→3 clutch-to-clutch shift of the transmission 14 without a shifting shock.

In the present embodiment, the determination in step SA4 by the first inhibiting means 170 as to whether the operation of the learning overshoot control means 162a should be inhibited is made depending upon the throttle opening angle $\theta_{TH}$, if the automatic 2→3 shift is found in step SA3 by the automatic shift determining means 172. On the other hand, the determination in step SA10 by the second inhibiting means 178 as to whether the operation of the learning overshoot control means 162a should be inhibited is made depending upon the engine speed $N_E$, if the manual 2→3 shift to be effected as a result of operation of the shift lever 72 is found in step SA8 by the manual shift determining means 176. Thus, the first and second inhibiting means 170, 178 operate to inhibit the learning overshoot control means 162a on the basis of different parameters suitable for the automatic and manual 2→3 shifts of the transmission 14 which are initiated under different conditions.

Other embodiments of the present invention will be described by reference to FIGS. 12–31, in which the same reference numerals as used in the first embodiment are used to identify the functionally corresponding elements. Redundant description of these elements will not be provided in the interest of brevity and simplification.

Figure 12:
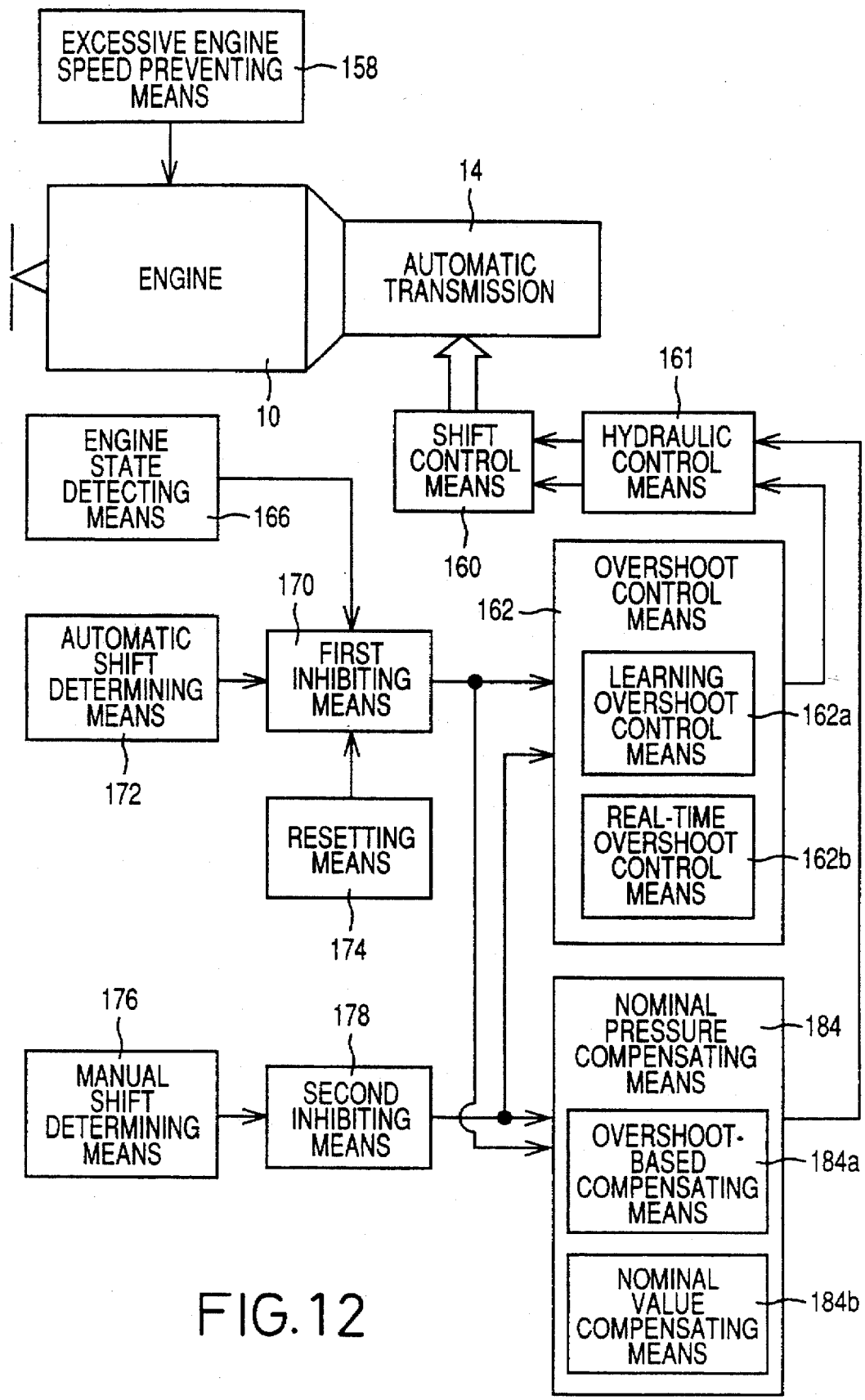
FIG. 12 is a block diagram indicating various functional means of electronic engine and transmission controllers used in another embodiment of this invention.

Referring to the block diagram of FIG. 12, there are indicated various functional means of the electronic transmission controller 78 arranged according to a second embodiment of this invention. In this second embodiment, the transmission controller 78 is adapted to execute a control routine illustrated in the flow chart of FIG. 13.

Figure 8:
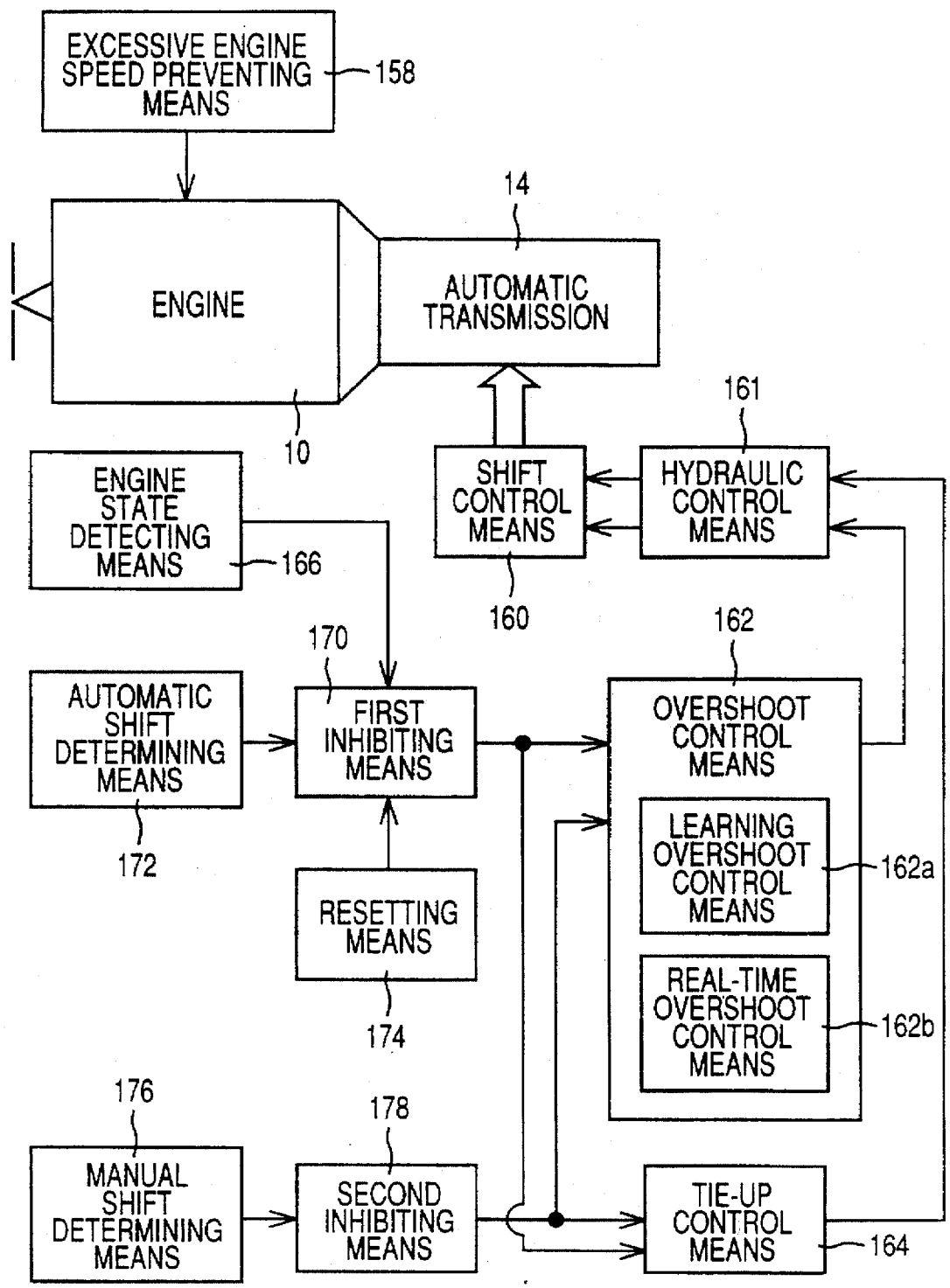
FIG. 8 is a block diagram indicating various functional means of an electronic engine controller and an electronic transmission controller of the electric control system of FIG. 3.

The transmission controller 78 in the second embodiment of FIG. 12 is different from that in the first embodiment of FIG. 8, primarily in the provision of nominal pressure compensating means 184. This nominal pressure compensating means 184 consists of overshoot-based compensating means 184a and nominal value compensating means 184b. The overshoot-based compensating means 184a is adapted to determine a final compensation value $(\Delta D_{SLU} + \alpha)$ by adding a compensation value $\alpha$ to the learning compensation value $\Delta D_{SLU}$ which is determined by the learning overshoot control means 162a when the negative decision (NO) is obtained in step SB4 or SB12, namely, during running of the vehicle without a relatively high degree of acceleration or without a relatively high load. The compensation value $\alpha$ is an amount of compensation of the control value $D_{SLU}$, which causes a suitable increase in the regulated releasing pressure $P_{B3}$ of the brake B3 so as to reduce the amount of overshoot of the engine speed $N_E$ or increase the amount of tie-up of the brakes B2, B3. The linear solenoid SLU is activated to regulate the releasing pressure $P_{B3}$ according to the final compensation value $(\Delta D_{SLU} + \alpha)$ determined by the overshoot-based compensating means 184a. The nominal value compensating means 184b is adapted to determine a final compensation value $(A + \Delta D_{SLU} + \alpha)$ by adding an initial value A to the final compensation value $(\Delta D_{SLU} + \alpha)$ determined by the overshoot-based compensating means 184a. The initial value A corresponds to a nominal level of the releasing pressure $P_{B3}$ of the brake B3 which does not cause an overshoot tendency of the engine speed $N_E$ or a tie-up tendency of the brakes B2, B3. The linear solenoid valve SLU is activated to regulate the releasing pressure $P_{B3}$ according to the final compensation value $(A + \Delta D_{SLU} + \alpha)$ determined by the nominal value compensating means 184b.

If the first inhibiting means 170 determines that the engine speed $N_E$ may possibly rise above the upper limit $N_{EMAX}$ leading to the activation of the excessive engine speed preventing means 158 during the automatic 2→3 clutch-to-clutch shift of the transmission 14, the operation of the overshoot control means 162 is inhibited, and the nominal pressure compensating means 184 is enabled to operate as described above. Further, if the second inhibiting means 178 makes a similar determination relating to the manual 2→3 clutch-to-clutch shift detected by the manual shift determining means 176, the operation of the overshoot control means 162 is inhibited, and the nominal pressure compensating means 184 is enabled to operate.

Figure 13:
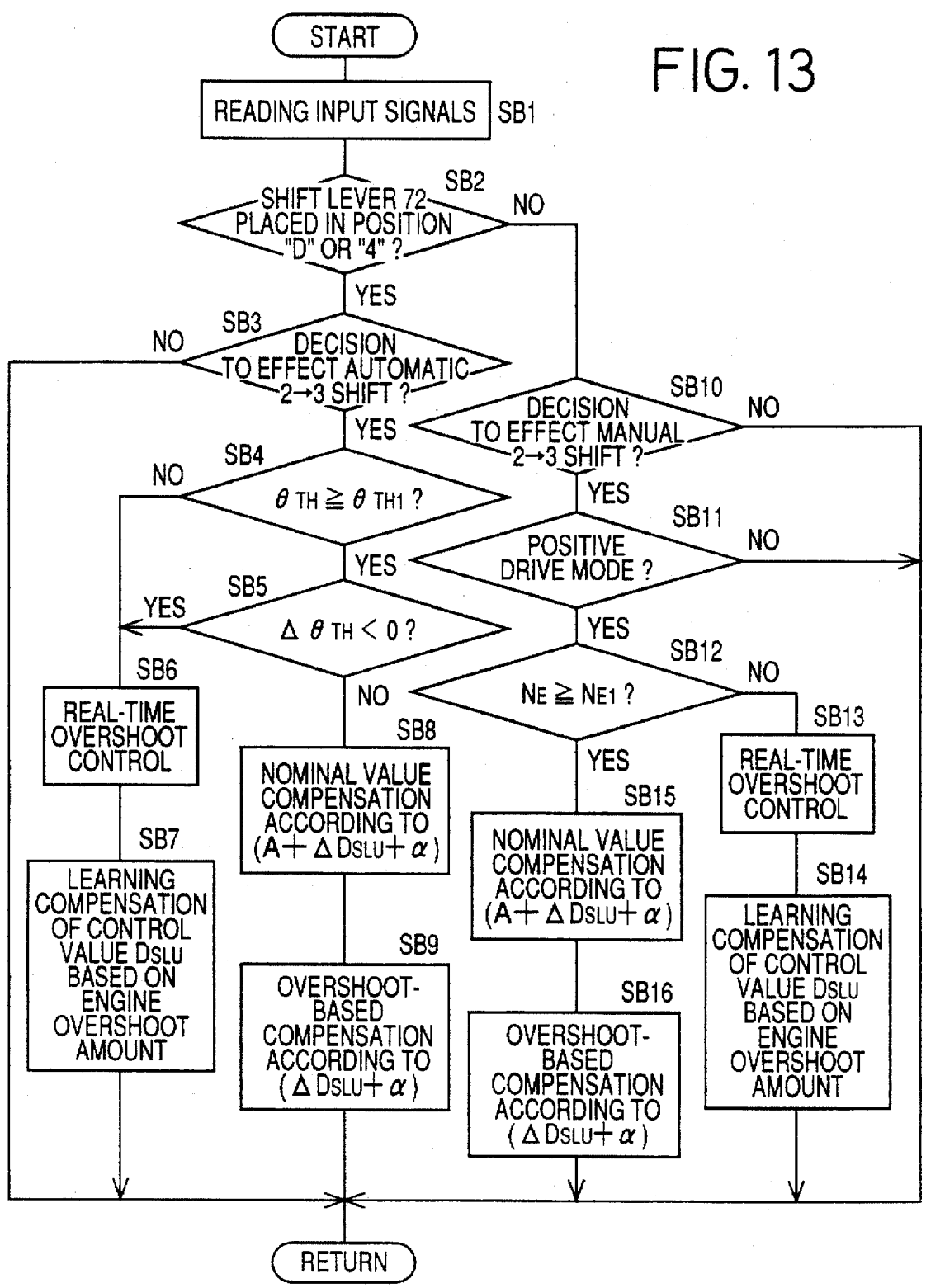
FIG. 13 is a flow chart illustrating a part of an operation of the transmission controller in the embodiment of FIG. 12.

Steps SB1 through SB5 in the control routine of FIG. 13 are identical with steps SA1 through SA5 in the control routine of FIG. 10, respectively. Further, steps SB10–SB12 in the control routine of FIG. 13 are identical with steps SA8–SA10 in the control routine of FIG. 10. Therefore, there will be described steps SB6–SB9 and SB13–SB16 of the control routine of FIG. 13 of the second embodiment.

If the negative decision (NO) is obtained in step SB4 corresponding to the first inhibiting means 170, if the affirmative decision (YES) is obtained in step SB5 corresponding to the resetting means 174, or if the negative decision (NO) is obtained in step SB12 corresponding to the second inhibiting means 178, it means that there is not a possibility of activation of the excessive engine speed preventing means 158 (possibility of an excessive rise of the engine speed $N_E$ above the upper limit $N_{EMAX}$) even if the releasing pressure $P_{B3}$ of the brake 3 cannot be adequately compensated by the learning and real-time overshoot control means 162a, 162b. In these cases, therefore, steps SB6 and SB7, or steps SB13 and SB14 are implemented by the overshoot control means 162. In steps SB6 and SB13, the real-time overshoot control means 162b is activated to detect the amount of overshoot of the engine speed $N_E$ during the clutch-to-clutch shift of the automatic transmission 14, and regulates or compensates the hydraulic pressure of one of the two frictional coupling devices associated with the clutch-to-clutch shift, in a real-time fashion so that the detected amount of engine overshoot is held within a predetermined permissible or optimum range, until the speed $N_T$ of the input shaft 20 of the transmission 14 enters the inertia phase (FIG. 7) in which the speed $N_T$ is lowered due to the shifting action of the transmission 14. More specifically, the real-time overshoot control means 162b regulates the releasing pressure $P_{B3}$ of the brake B3 by controlling the control value $D_{SLU}$ for controlling the output pressure $P_{SLU}$ of the linear solenoid valve SLU to be applied to the 2–3 timing valve 98. In steps SB7 and SB14, the learning overshoot control means 162a is activated to determine the learning compensation value $\Delta D_{SLU}$ so as to reduce the amount of overshoot of the engine speed $N_E$ upon initiation of the inertia phase of the input shaft speed $N_T$, and store the determined learning compensation value $\Delta D_{SLU}$ for use in a subsequent 2→3 clutch-to-clutch shift for compensating the releasing pressure $P_{B3}$ according to the final compensation value $(D_{SLU}+\Delta D_{SLU})$. The thus determined learning compensation value $\Delta D_{SLU}$ is stored in relation to the specific running condition of the vehicle as represented by the throttle opening angle $\theta_{TH}$ and vehicle speed V, as indicated in FIG. 14. Thus, a data map as indicated in FIG. 14 is prepared during running of the vehicle for a long time. In the present 2→3 shift, the already stored learning compensation value $\Delta D_{SLU}$ corresponding to the present vehicle running condition is used effect the compensation of the releasing pressure $P_{B3}$.

If a negative decision (NO) is obtained in step SB5 or if an affirmative decision (YES) is obtained in step SB12, it means that there is a possibility of the engine speed $N_E$ exceeding the upper limit $N_{EMAX}$ due to insufficient or inadequate functioning of the learning overshoot control means 162a and the real-time overshoot control means 162b during the 2→3 clutch-to-clutch shift of the transmission 14. In these case, steps SB8 and SB9, or steps SB15 and SB16 are implemented by the nominal pressure compensating means 184. In steps SB8 and SB15, the nominal value compensating means 184b is activated to determine the initial value A explained above, on the basis of the detected throttle opening angle $\theta_{TH}$ and vehicle speed V and according to a stored predetermined relationship between these parameters $\theta_{TH}$ and V and the initial value A, as indicated in FIG. 15. Then, the nominal value compensating means 184b obtains the final compensating value $(A+\Delta D_{SLU}+\alpha)$ by adding to the initial value A the learning compensating value $\Delta D_{SLU}$ determined in step SB9 or SB16, and the compensating value $\alpha$ which causes the brakes B2, B3 to have a tie-up tendency. The compensating value $\alpha$ is obtained on the basis of the detected throttle opening angle $\theta_{TH}$ and according to a stored predetermined relationship between $\theta_{TH}$ and $\alpha$ as indicated in FIG. 16. The linear solenoid valve SLU is activated to regulate the releasing pressure $P_{B3}$ of the brake B3 according to the final compensation value $(A+\Delta D_{SLU}+\alpha)$ obtained by the nominal value compensating means 184b. In steps SB9 and SB16, the overshoot-based compensating means 184a is activated to read the learning compensation value $\Delta D_{SLU}$ which has been stored in the data map of FIG. 14 in step SB7 or SB14 and which corresponds to the present vehicle running condition in which the present 2→3 shift takes place. The learning compensation values $\Delta D_{SLU}$ stored in the data map of FIG. 14 were obtained in the past runnings of the vehicle without a relatively high degree or acceleration or a relatively high load, that is, when the negative decision (NO) was obtained in step SB4 or SB12. The overshoot-based compensating means 184a then add the compensating value $\alpha$ explained above to the learning compensating value $\Delta D_{SLU}$ which has been read. The linear solenoid valve SLU is activated to regulate the releasing pressure $P_{B3}$ according to the final compensation value $(\Delta D_{SLU}+\alpha)$ obtained by the overshoot-based compensating means 184a.

Figure 17:
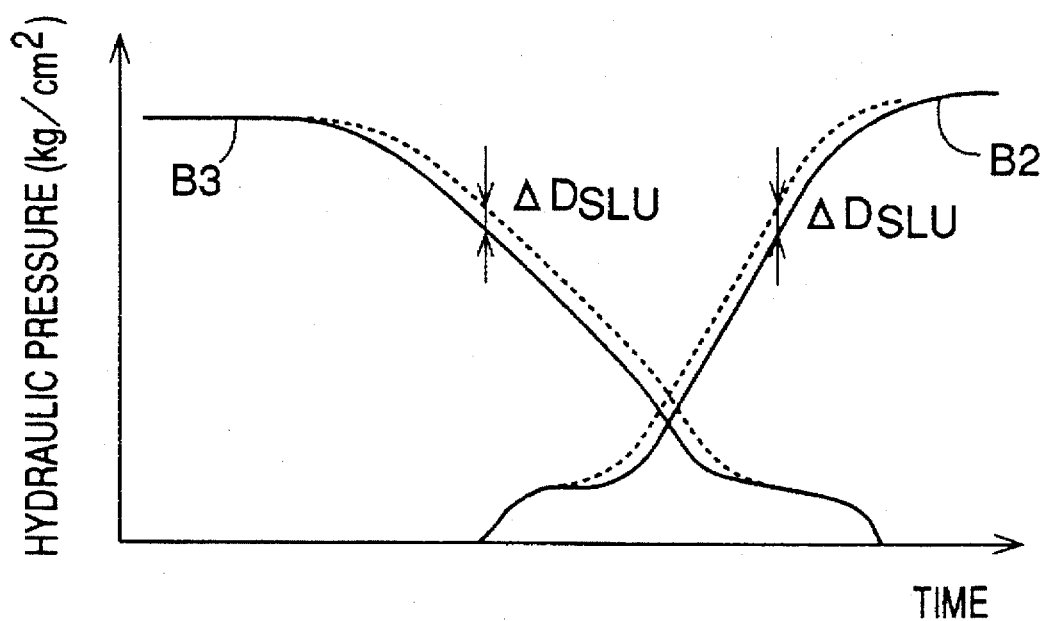
FIG. 17 is a view showing changes in hydraulic pressures in brakes B3 and B2 during the clutch-to-clutch shift of the transmission.

In the graph of FIG. 17, "B3" represents the releasing pressure $P_{B3}$ of the brake B3 regulated during a 2→3 clutch-to-clutch shift of the transmission 14. Solid line indicates a change of the releasing pressure $P_{B3}$ as regulated according to the initial value A which causes neither an overshoot tendency of the engine speed $N_E$ nor a tie-up tendency of the brakes B2, B3, while broken line indicates a change of the releasing pressure $P_{B3}$ as regulated according to the initial value A plus the learning compensation value $\Delta D_{SLU}$, which value $\Delta D_{SLU}$ causes an increase of the releasing pressure $P_{B3}$ and a consequent amount of tie-up of the brakes B2, B3.

In the present second embodiment, the first inhibiting means 170 is activated to inhibit the operations of the real-time overshoot control means 162b and the learning overshoot control means 162a if it is determined that there is a possibility of activation of the excessive engine speed preventing means 158 due to an excessive rise of the engine speed $N_E$ above the upper limit $N_{EMAX}$. If it is determined that there is no such possibility, the releasing pressure $P_{B3}$ of the brake B3 is compensated according to the learning compensation value $\Delta D_{SLU}$ determined by the learning overshoot compensating means 162a of the overshoot control means 162, so that the actual engine overshoot amount is held within the predetermined optimum range. Therefore, the present arrangement prevents an excessive rise of the engine speed $N_E$ due to an excessive amount of engine overshoot which would occur if the overshoot control means 162 was operated in the process of a 2→3 shift of the transmission 14 during a high-load running of the vehicle. Thus, the present embodiment is effective to avoid abrupt reduction of the engine output due to a fuel cut, for example, by the excessive engine speed preventing means 158 during the 2→3 clutch-to-clutch shift. Accordingly, the present embodiment assures improved driving comfort of the vehicle.

The present second embodiment provides the same advantages as the first embodiment, owing to the provision of the resetting means 174, automatic shift determining means 172, manual shift determining means 176 and second inhibiting means 178.

Figure 18:
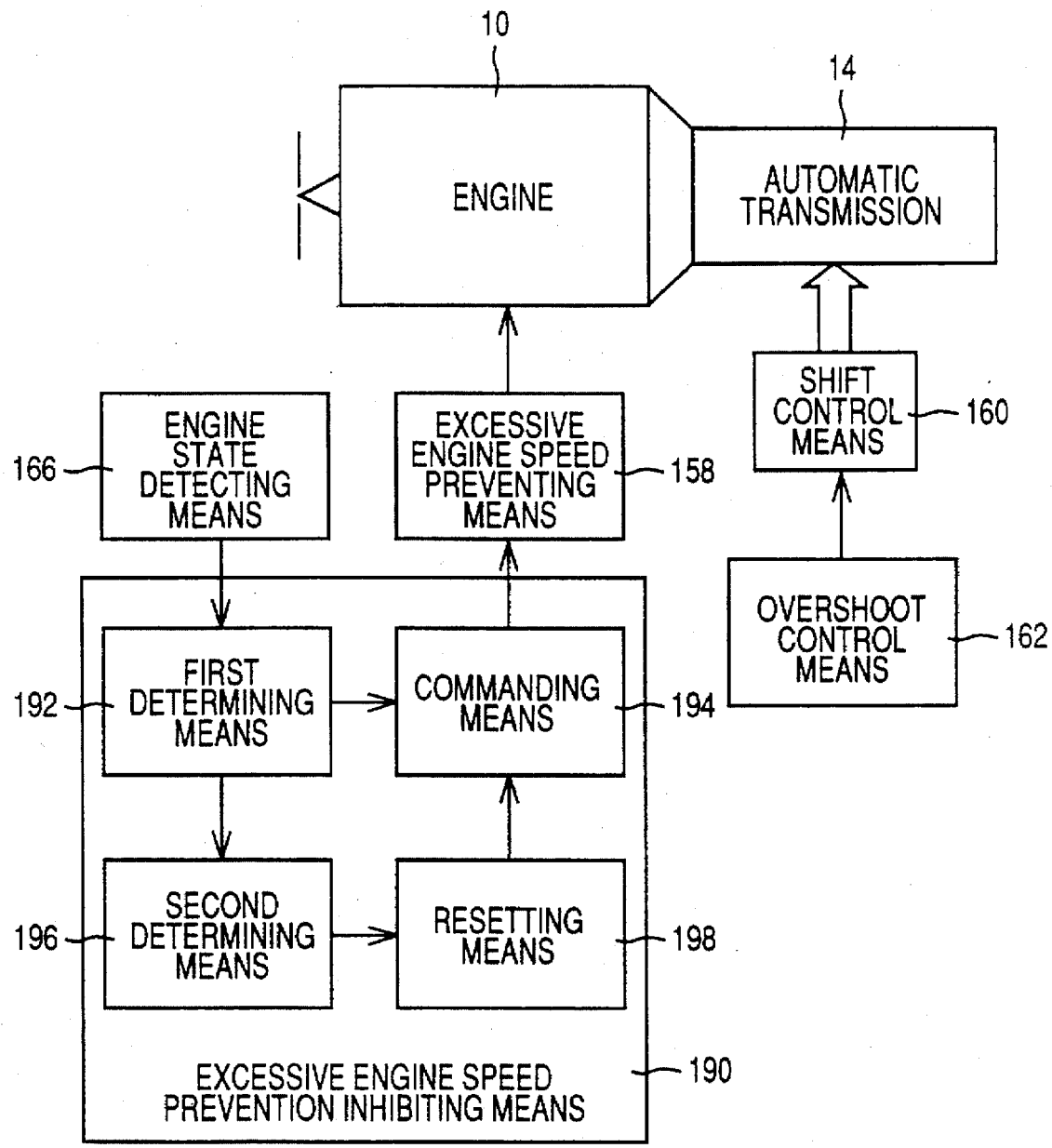
FIG. 18 is a block diagram indicating various functional means of electronic engine and transmission controllers used in a further embodiment of this invention.

Referring to FIG. 18, there are shown functional means of the electronic engine controller 76, as well as the shift control means 160 and overshoot control means 162 of the electronic transmission controller 78 which have been described. The engine controller 76 is adapted to execute a control routine illustrated in the flow chart of FIG. 19, which will be better understood by reference to a time chart of FIG. 20.

The excessive engine speed preventing means 158 of the engine controller 76 is adapted to fully close the fuel injector valve 80 to cut a fuel supply to the engine 10 if the detected engine speed $N_E$ exceeds a predetermined first threshold $N_{FC1}$, so that the engine speed $N_E$ will not rise into an excessive speed zone. The first threshold $N_{FC1}$ is set to be smaller than the lower limit of of that excessive speed zone by a suitable value. The engine controller 76 further includes excessive engine speed prevention inhibiting means 190 which is adapted to inhibit the operation of the excessive engine speed preventing means 158 if the state of the engine 10 as detected by the engine state detecting means 166 indicates that the engine speed $N_E$ is expected to rise into the excessive speed range and cause activation of the excessive engine speed preventing means 158, due to an overshoot due to inadequate functioning of the overshoot control means 162 during the 2→3 clutch-to-clutch shift.

The excessive engine speed preventing inhibiting means 190 includes first determining means 192, commanding means 194, second determining means 196, and resetting means 198. The first determining means 192 is adapted to determine whether the engine speed $N_E$ has exceeded the first threshold $N_{FC1}$ and is in the process of increasing. The commanding means 194 inhibits the operation of the excessive engine speed preventing means 158 if the first determining means determines that the engine speed $N_E$ has exceeded the first threshold $N_{FC1}$ and is in the process of increasing. The second determining means 196 is adapted to determine whether the engine speed $N_E$ has exceeded a sum of the first threshold $N_{FC1}$ and a second threshold $N_{FC2}$. The resetting means 198 is adapted to disable the commanding means 194 to inhibit the operation of the excessive engine speed preventing means 158, if the second determining means 196 has obtained an affirmative decision. As described above, the first threshold $N_{FC1}$ which is also used to effect the fuel cut by the excessive engine speed preventing means 158 is slightly lower than the lower limit of the excessive speed range. Accordingly, if the first determining means 192 determines that the engine speed $N_E$ is higher than the first threshold $N_{FC1}$ and is in the process of increasing due to an overshoot, it means that the engine speed $N_E$ is expected to rise into the excessive speed range within which the excessive engine speed preventing means 158 would be otherwise activated.

Figure 19:
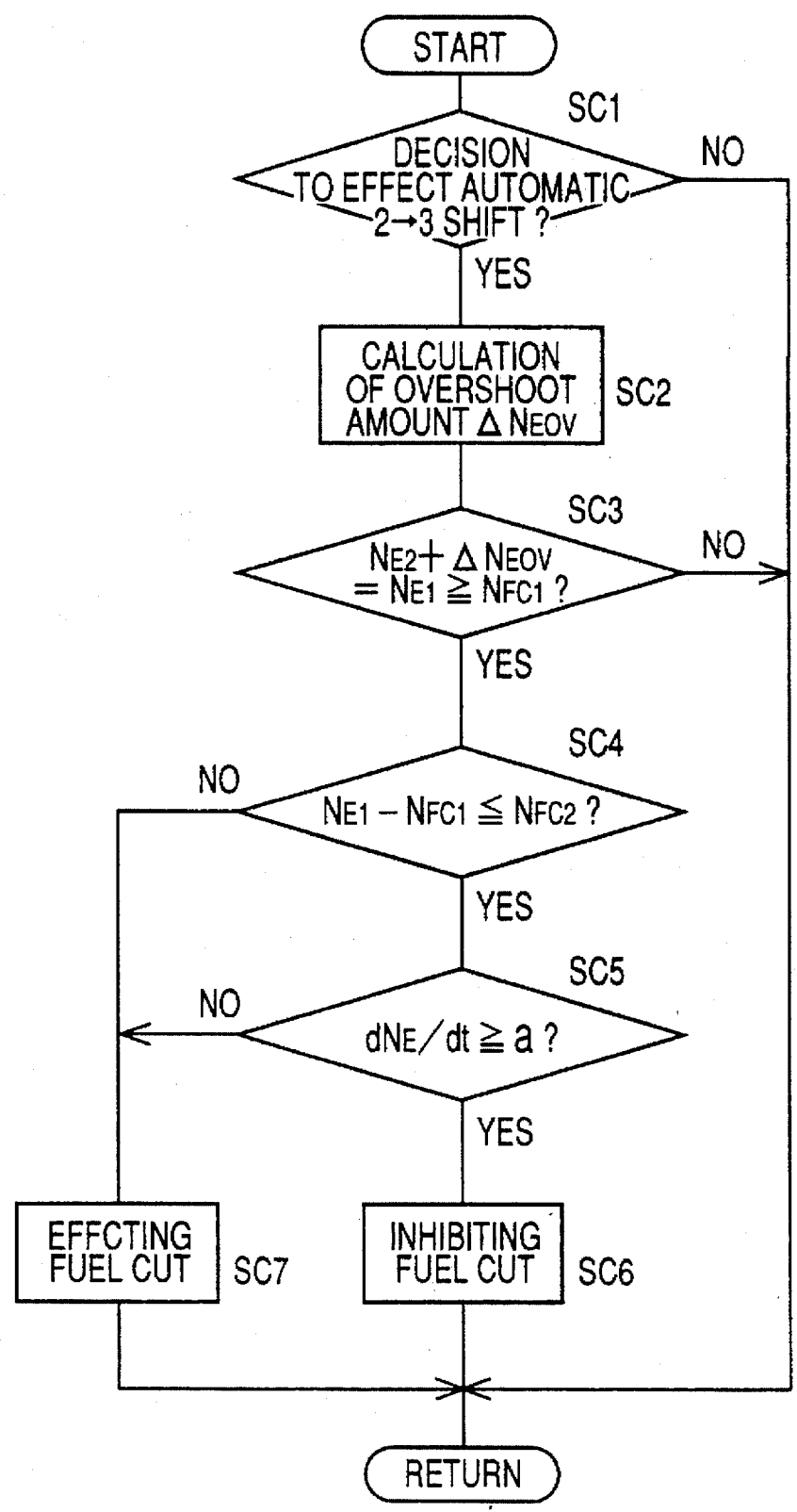
FIG. 19 is a flow chart illustrating a part of an operation of the electronic transmission controller in the embodiment of FIG. 18.
Figure 20:
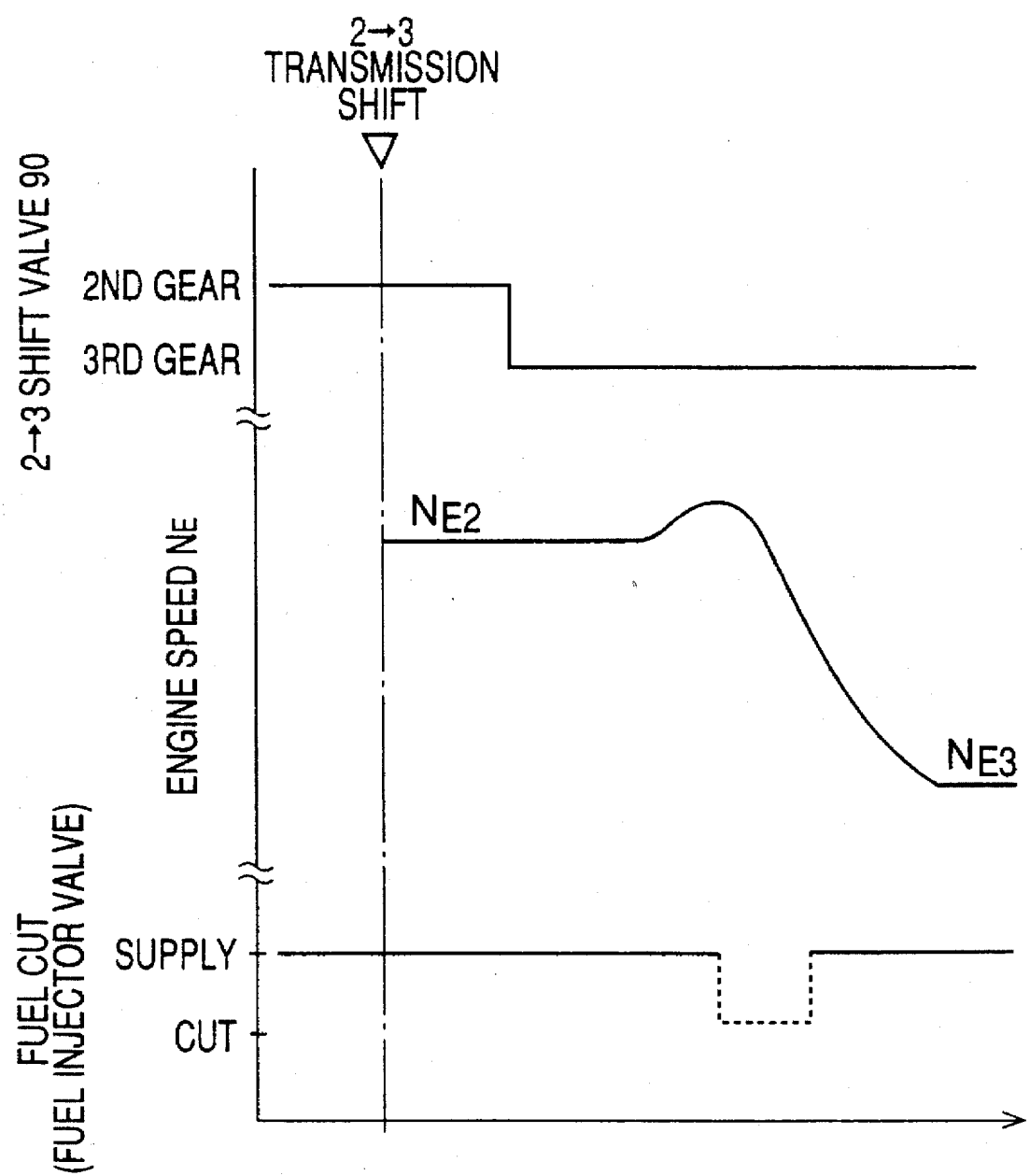
FIG. 20 is a time chart for explaining the operation of the embodiment of FIG. 18.

The control routine of FIG. 19 is initiated with step SC1 to determine whether the shift control means 160 has made a decision to effect the automatic 2→3 clutch-to-clutch shift of the automatic transmission 14. If a negative decision (NO) is obtained in step SC1, one cycle of execution of the routine of FIG. 19 is terminated. If an affirmative decision (YES) is obtained in step SC1, the control flow goes to step SC2 to calculate the amount of overshoot $\Delta N_{EOV}$ of the engine speed $N_E$. This overshoot amount $\Delta N_{EOV}$ is obtained by subtracting the engine speed $N_{E2}$ immediately before the 2→3 shift, from the present engine speed $N_E$, as indicated in FIGS. 21 and 22.

Then, the control flow goes to step SC3 to determine whether an engine speed value $N_{E1}$ which is a sum of the previous engine speed $N_{E2}$ indicated above and the calculated amount of overshoot $\Delta N_{EOV}$ is equal to or larger than the first threshold $N_{FC1}$. It is noted that the actual engine speed $N_E$ is equal to the previous engine speed $N_{E2}$ plus the actual amount of overshoot. If a negative decision (NO) is obtained in step SC3, one cycle of execution of the control routine of FIG. 19 is terminated. If an affirmative decision (YES) is obtained in step SC3, the control flow goes to step SC4 corresponding to the second determining means 196, to determine whether a difference $(N_{E1}-N_{FC1})$ between the engine speed value $N_{E1}$ identified above and the first threshold $N_{FC1}$ is equal to or smaller than a second threshold $N_{FC2}$, in other words, whether the actual engine speed $N_E$ is equal to or smaller than the sum $(N_{FC1}+N_{FC2})$ of the first and second thresholds $N_{FC1}$ and $N_{FC2}$. As indicated in FIGS. 21 and 22, the second threshold $N_{FC2}$ is an amount of increase of the engine speed $N_E$ above the first threshold level $N_{FC1}$. FIGS. 21 and 22 show two different cases in which the affirmative decision (YES) is obtained in step SC3.

Figure 22:
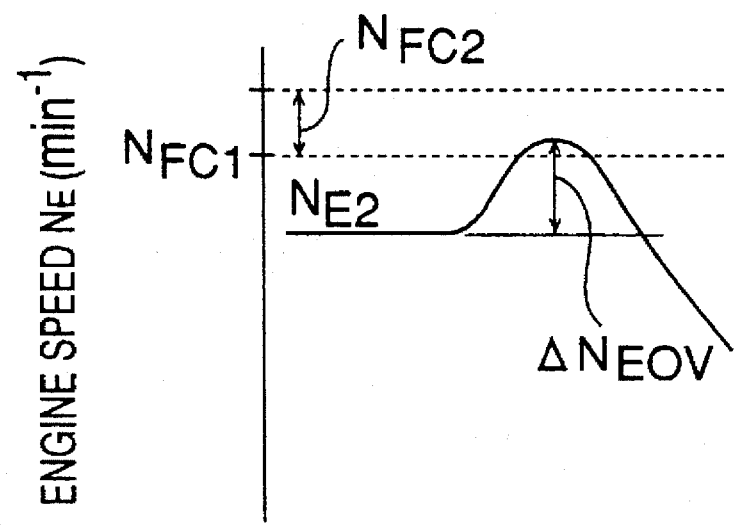
FIG. 22 is a view indicating the overshoot of the engine speed $N_E$ in the embodiment of FIG. 18, for explaining a change in the engine speed when an affirmative decision is obtained in the step SC4 in the routine of FIG. 19.

An affirmative decision (YES) is obtained in step SC4 if the engine speed value $N_{E1}$ is smaller than the sum $(N_{FC1}+N_{FC2})$ of the first and second thresholds, as in the case of FIG. 22. In this case, the control flow goes to step SC5 corresponding to the first determining means 192 to determine whether a derivative of $dN_E/dt$ of the engine speed $N_E$, namely, a rate of increase of the engine speed $N_E$ is equal to or higher than a predetermined reference value "a". This reference value "a" is a positive value for determining whether the engine speed $N_E$ is in the process of increasing. If an affirmative decision (YES) is obtained in step SC5, the control flow goes to step SC6 corresponding to the commanding means 194, to inhibit the operation of the excessive engine speed preventing means 158, in order to avoid an influence of the preventing means 158 on the engine speed $N_E$ during the 2→3 clutch-to-clutch shift of the transmission 14. It is noted that when the 2→3 shift is not effected (when the negative decision is obtained in step SC1), the excessive engine speed preventing means 158 is activated if the engine speed $N_E$ is higher than the first threshold valve $N_{FC1}$.

Figure 21:
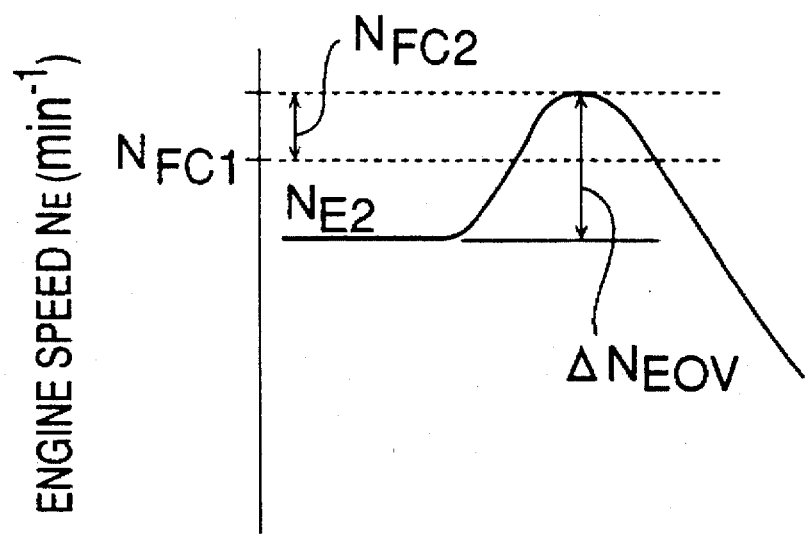
FIG. 21 is a view indicating an overshoot of an engine speed $N_E$ in the embodiment of FIG. 18, for explaining a change in the engine speed when a negative decision is obtained in step SC4 in the routine of FIG. 19.

However, where the engine speed value $N_{E1}$ has reached the sum $(N_{FC1}$ and $N_{FC2})$ as in the case of FIG. 21, a negative decision (NO) is obtained in step SC4. In this case where the actual engine speed $N_E$ is extremely high, the control flow goes to step SC7 corresponding to the resetting means 198, to disable the commanding means 194 to operate, that is, to permit the operation of the excessive engine speed preventing means 158 to effect the fuel cut of the engine 10. If a negative decision (NO) is obtained in step SC5, it means that the engine speed $N_E$ is equal to or higher than the first threshold value $N_{FC1}$ while the rate of increase of the engine speed $N_E$ is not so high or is a negative value (i.e., the engine speed $N_E$ is in the process of decreasing). In this case, too, step SC7 is implemented to permit the operation of the excessive engine speed preventing means 158 to effect the fuel cut of the engine 10, as in the normal operation of the preventing means 158 which is performed when the 2→3 shift is not effected. Broken line in FIG. 20 indicates the fuel cut effected where the negative decision (NO) is obtained in step SC5.

In the present third embodiment, the excessive engine speed prevention inhibiting means 190 is activated to inhibit the operation of the excessive engine speed preventing means 158 if the state of the engine 10 as represented by the engine speed $N_E$ indicates that the engine speed $N_E$ during the 2→3 clutch-to-clutch shift of the transmission 14 may possibly rise into the excessive speed range and otherwise cause activation of the preventing means 158. This arrangement prevents an excessive rise of the engine speed $N_E$ due to an excessive overshoot due to insufficient or inadequate functioning of the overshoot control means 162 which would be caused by activation of the excessive engine speed preventing means 158 during the 2→3 shift. Further, the inhibition of the operation of the excessive engine speed preventing means 158 by the inhibiting means 190 prevents abrupt reduction of the engine speed $N_E$ by the fuel cut by the excessive engine speed preventing means 158 during the 2→3 clutch-to-clutch shift of the transmission 14, whereby the driving comfort of the vehicle would not be deteriorated during the 2→3 shift.

In the present third embodiment, the fuel cut is inhibited when the increase rate or derivative $dN_E/dt$ of the engine speed $N_E$ is equal to or higher than the predetermined positive reference value "a". In other words, the fuel cut is effected when the increase rate of the engine speed $N_E$ is lower than the reference value "a", that is, when the engine speed $N_E$ is increasing at a relatively low rate or is in the process of decreasing, even though the engine speed $N_E$ is equal to our higher than the first threshold value $N_{FC1}$.

The third embodiment is further adapted such that the fuel cut is permitted when the engine speed $N_E$ has exceeded the sum $(N_{FC1}+N_{FC2})$ of the first and second threshold values, that is, if the negative decision (NO) is obtained in step SC4 corresponding to the second determining means 196. Thus, the fuel cut is continued if the engine speed $N_E$ becomes extremely high, even when the increase rate $dN_E/dt$ of the engine speed $N_E$ is higher than the reference value "a".

Figure 23:
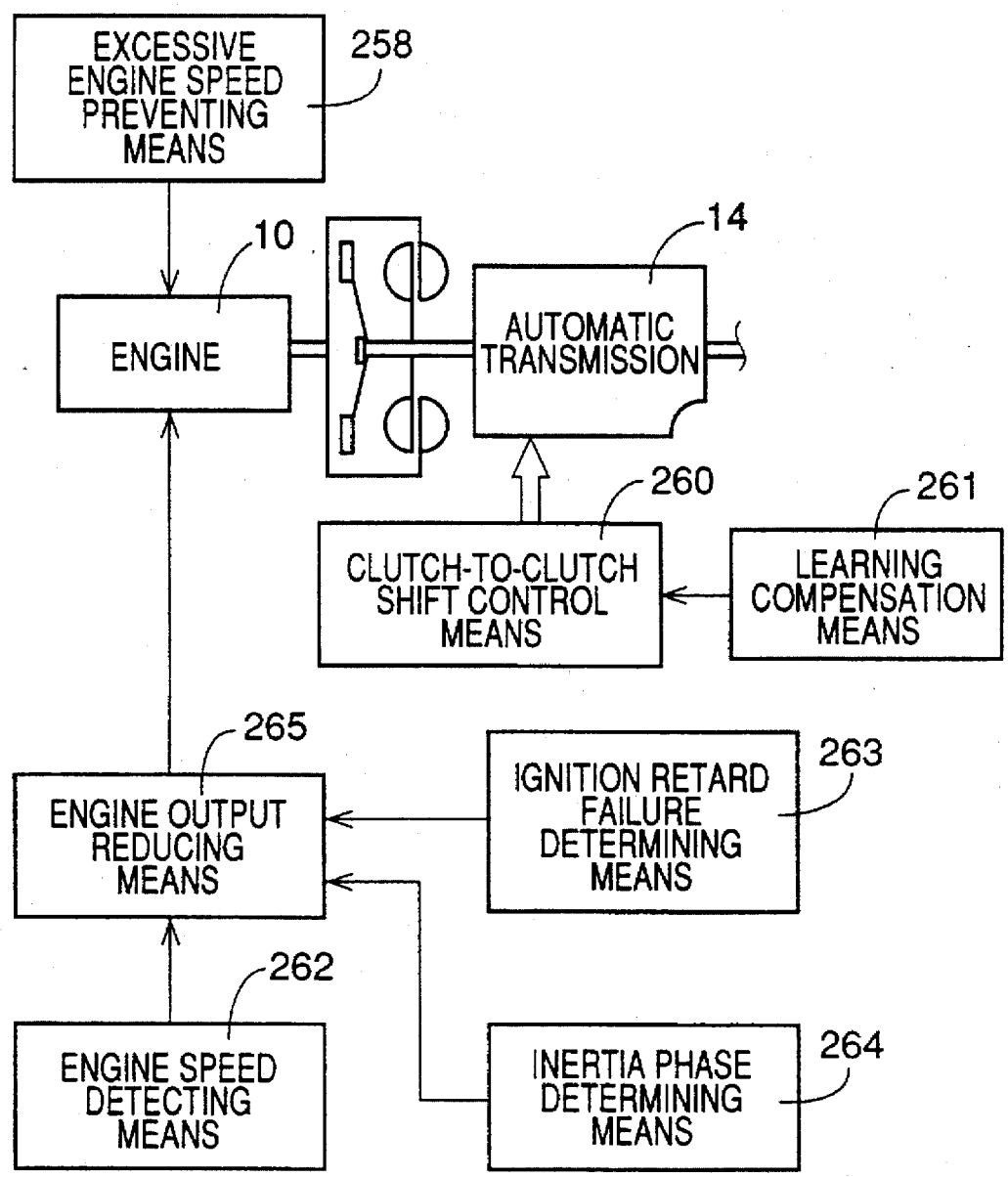
FIG. 23 is a block diagram indicating various functional means of electronic engine and transmission controllers used in a still further embodiment of this invention.

Referring next to FIG. 23, there are shown functional means of the engine controller 76 and functional means of the transmission controller 78, in a fourth embodiment of this invention. The engine controller 76 includes excessive engine speed preventing means 258, which, like the preventing means 158 described above, is adapted to cut a fuel supply from the fuel injector valve 80 into the intake pipe of the engine 10 when the engine speed $N_E$ has exceeded the upper limit $N_{EMAX}$ as described above with respect to the first embodiment.

The transmission controller 78 includes clutch-to-clutch shift control means 260 adapted to operate such that when a decision to effect the automatic 2→3 shift of the transmission 14 is made depending upon the detected throttle opening angle $\theta_{TH}$ and vehicle speed V and according to the appropriate shift pattern, the pressure $P_{B3}$ of the brake B3 and the pressure $P_{B2}$ in the brake B2 are regulated such that both of the brake B3 in the process of being released and the brake B2 in the process of being engaged have suitably controlled engaging torques. Described in detail, the shift control means 260 turns off the first solenoid-operated valve S1 which has been held on, to operate the 2–3 shift valve 90 from a position corresponding to the second-speed position "2nd" of the transmission 14 to a position corresponding to the third-speed position "3rd", so that the fluid is discharged from the drain port 126 of the 2–3 timing valve 98 while the FORWARD pressure $P_D$ is applied to the brake B2, and the linear solenoid valve SLU is controlled to regulate its output pressure $P_{SLU}$ so as to regulate the hydraulic pressures $P_{B2}$ and $P_{B3}$ in the brakes B2, B3 as indicated above.

The transmission controller 78 further includes learning compensation means 261 for compensating or adjusting the normally regulated pressures $P_{B2}$, $P_{B3}$ so that the amount of overshoot $\Delta N_E$ of the engine speed $N_E$ is held within a predetermined range. For instance, the learning compensation means 261 is adapted to effect the learning compensation on the basis of the learning compensation value $\Delta D_{SLU}$ as described above with respect to the learning overshoot control means 162a, so that the releasing pressure $P_{B3}$ of the brake 3 is regulated by controlling the linear solenoid valve SLU according to the basic control value $D_{SLU}$ as adjusted by the learning compensation value $\Delta D_{SLU}$.

The engine controller 76 includes engine speed detecting means 262 for detecting the speed $N_E$ of the engine 10. This engine speed detecting means 262 is constituted by the engine speed sensor 58. The engine controller 76 further includes ignition retard failure determining means 263 for determining whether ignition retard control of the engine 10 for reducing the engine output is impossible. For example, the determining means 263 determines that the ignition retard control is impossible, if the temperature of a catalyst provided in the exhaust pipe of the engine 10 is higher than an upper limit, if the possible amount of ignition retard of the igniter 82 is not sufficient to assure the intended amount of ignition retard for reducing the engine output, or if there exists some abnormality of the engine controller 76 associated with the ignition retard control.

As indicated in FIG. 7, the speed $N_T$ of the input shaft 20 of the transmission 14 enters the inertia phase following the torque phase, during the 2→3 clutch-to-clutch shift of the transmission 14. The torque phase is a period during which the rotating speeds of the brakes B2, B3 are still held constant, while the inertia phase is a period during which the rotating speeds of the brakes B2, B3 are changing to change the speed reduction ratio of the transmission 14 eventually to the ratio of the third-speed position "3rd". The engine controller 76 further includes inertia phase determining means 264 for determining the initiation or start point of the inertia phase during the 2→3 shift. For example, this determination may be made by detecting the point of time at which the engine speed $N_E$ (almost equal to the speed $N_T$ of the input shaft 42) begins to drop during the 2→3 shift.

The engine controller 76 further includes engine output reducing means 265 for reducing the output torque of the engine 10 when the engine speed $N_E$ has reached or exceeded a threshold $N_{EOV}$ which is set to be lower than the upper limit $N_{EMAX}$ above which the excessive engine speed preventing means 258 is operated to effect the fuel cut. Even when the engine speed $N_E$ is lower than the threshold $N_{EOV}$, the engine output reducing means 265 is activated to reduce the engine output torque if a time lapse $T_{EL}$ after the generation of the command to effect the 2→3 clutch-to-clutch shift of the transmission 14 has reached or exceeded a predetermined threshold $T_A$.

The engine output reducing means 265 is adapted to reduce the output torque of the engine 10 by retarding the ignition timing of the ignitor 82, if the ignition retard control is possible, or by activating the throttle actuator 54 to reduce the opening angle of the second throttle valve 56 which is normally placed in its fully open position, if the ignition retard control is impossible.

For the engine output reducing means 265 to achieve selective operation to either retard the ignition timing of the ignitor 82 or activate the throttle actuator 54, the engine output reducing means 265 is connected to the ignition retard failure determining means 263.

The engine output reducing means 265 is also connected to the inertia phase determining means 264, so that the engine output reducing means 265 terminates its operation to reduce the engine output torque when the inertia phase has been started, or at a moment a predetermined time after the start of the inertia phase.

Figure 24:
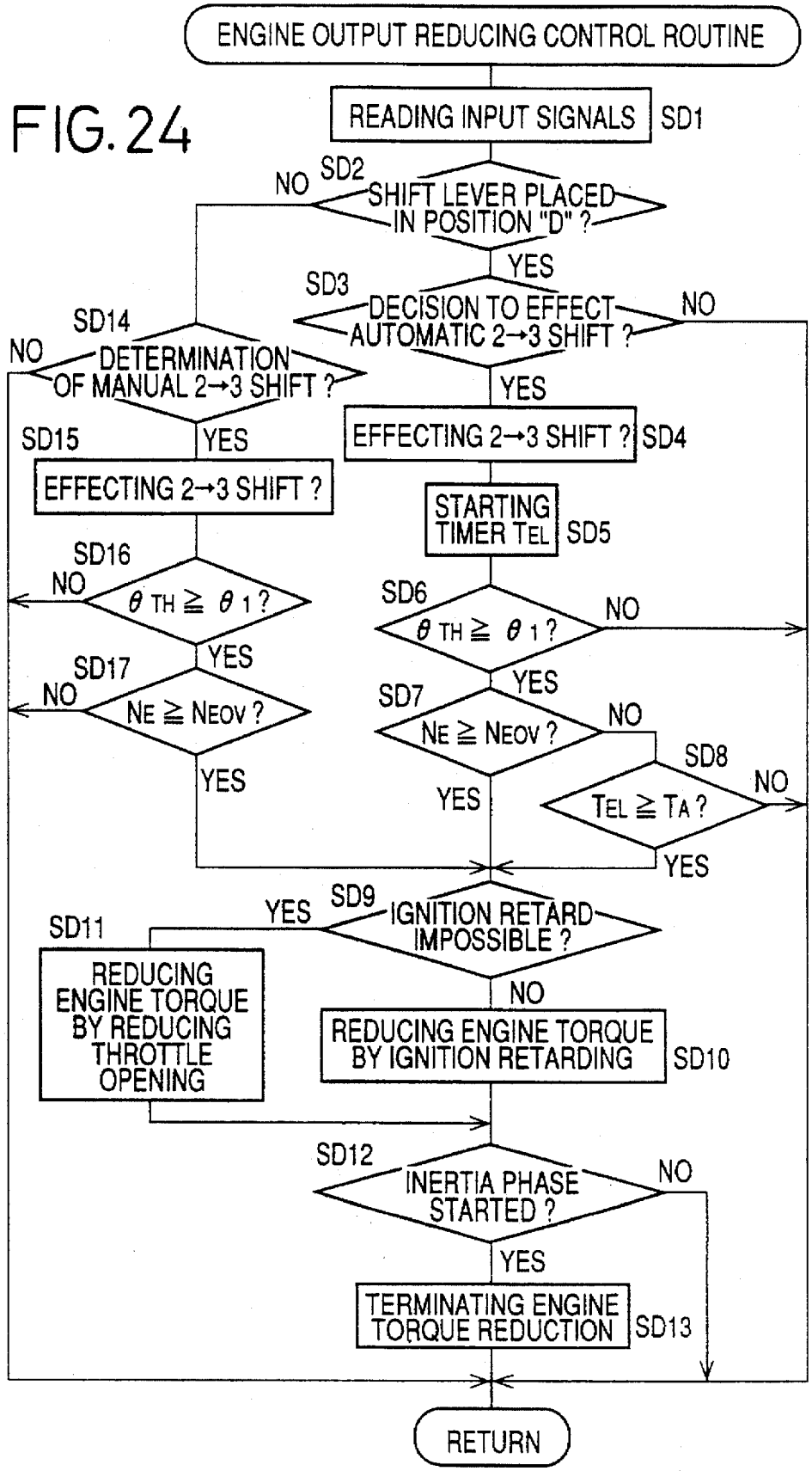
FIG. 24 is a flow chart illustrating an engine output reducing control routine executed by the electronic transmission controller in the embodiment of FIG. 23.

The transmission controller 78, which receives various signals from the engine controller 76, is adapted to execute an engine output reducing control routine as illustrated in the flow chart of FIG. 24. This control routine is executed for preventing a shifting shock of the transmission 14 during the 2→3 clutch-to-clutch shift, which may arise from an excessive rise of the engine speed $N_E$.

The engine output reducing control routine is initiated with step SD1 to read and process various input signals. Step SD1 is followed by step SD2 to determine whether the shift lever 72 is placed in the position "D". If an affirmative decision (YES) is obtained in step SD2, the control flow goes to step SD3 to determine whether a decision to effect the automatic 2→3 clutch-to-clutch shift of the transmission 14 has been made depending upon the detected throttle opening angle $\theta_{TH}$ and vehicle speed V and according to the stored predetermined shift pattern, as described above.

If a negative decision (NO) is obtained in step SD3, one cycle of execution of the routine of FIG. 24 is terminated. If an affirmative decision (YES) is obtained in step SD3, step SD4 is implemented to initiate the 2→3 clutch-to-clutch shift of the transmission 14. That is, the linear solenoid valve SLU is controlled to produce the output pressure $P_{SLU}$ for regulating the pressures in the brakes B2, B3, as described above. Step SD4 is followed by step SD5 to start a timer for measuring the time lapse $T_{EL}$ after the initiation of the 2→3 shift.

Step SD5 is followed by step SD6 determine whether the vehicle is in a high-load running, namely, to determine whether the detected throttle opening angle $\theta_{TH}$ is equal to or larger than a predetermined threshold $\theta 1$. This threshold $\theta 1$ corresponds to a comparatively high degree of acceleration of the vehicle or a comparatively high load acting on the running vehicle. For example, the threshold θ1 is about 75%. If a negative decision (NO) is obtained in step SD6, one cycle of execution of the engine output reducing control routine is terminated. If an affirmative decision (YES) is obtained in step SD6, the control flow goes to step SD7 to determine whether the engine speed $N_E$ is equal to or higher than the threshold $N_{EOV}$, which is lower than the upper limit $N_{EMAX}$ by a certain value that is determined by taking into account a time delay between the moment at which step SD10 or SD11 is implemented to reduce the engine output and the moment at which the reduction of the engine output torque begins to provide an effect of preventing a rise of the engine speed $N_E$.

If a negative decision (NO) is obtained in step SD7, the control flow goes to step SD8 to determine whether the time lapse $T_{EL}$ is equal to or larger than the threshold $T_A$. This threshold time $T_A$ is a time length during which the engine speed $N_E$ is highly expected to exceed the upper limit $N_{EMAX}$ in the 2→3 shift of the transmission 14 during a high-load running of the vehicle with the throttle opening angle $θ_{TH}$ not smaller than the threshold θ1 indicated above.

If a negative decision (NO) is obtained in step SD8, it means that the engine speed $N_E$ is lower than the threshold $N_{EOV}$ and the time lapse $T_{EL}$ is smaller than the threshold $T_A$. In this case, one cycle of execution of the routine is terminated. If an affirmative decision (YES) is obtained in step SD7 or SD8, that is, if the engine speed $N_E$ is equal to or higher than the threshold $N_{EOV}$ or if the time lapse $T_{EL}$ is equal to or larger than the threshold $T_A$, the control flow goes to step SD9 and subsequent steps for reducing the output torque of the engine 10 as described below.

That is, step SD7 or SD8 is followed by step SD9 corresponding to the ignition retard failure determining means 263, to determine whether the ignition retard control of the engine 10 is impossible, by determining whether any of the predetermined conditions indicated above with respect to the means 263 is satisfied. If a negative decision (NO) is obtained in step SD9, the control flow goes to step SD10 to reduce the output torque of the engine 10 by retarding the ignition timing of the ignitor 82. The torque reduction of the engine 10 has a comparatively high response to a change in the ignition timing of the engine. If an affirmative decision (YES) is obtained in step SD9, the control flow goes to step SD11 to reduce the engine output torque by reducing the opening angle of the second throttle valve 56. In this fourth embodiment of the invention, steps SD10, SD11 and SD13 correspond to the engine output reducing means 265 described above.

Steps SD10 and SD11 are followed by step SD12 corresponding to the inertia phase determining means 264, to determine whether the inertia phase has been started, by determining, for example, whether the engine speed $N_E$ has begun to drop. If a negative decision (NO) is obtained in step SD12, one cycle execution of the routine is terminated, and steps SD1 through SD12 are repeatedly implemented until an affirmative decision (YES) is obtained in step SD12, whereby the output torque of the engine 10 is reduced until the engine speed $N_E$ or speed $N_T$ of the input shaft 20 has entered the inertia phase. Step SD13 is implemented to turn off the engine output reducing means 265 to terminate the reduction of the engine output torque when the affirmative decision (YES) is obtained in step SD12.

If a negative decision (NO) is obtained in step SD2, the control flow goes to step SD14 to determine whether a decision to effect the manual 2→3 shift of the transmission 14 has been made after an operation of the shift lever 72. If a negative decision (NO) is obtained in step SD14, one cycle of execution of the present routine is terminated. If an affirmative descision (YES) is obtained in step SD14, step SD15 similar to step SD4 is implemented to initiate the 2→3 shift of the transmission 14. Then, the control flow goes to steps SD16 and SD17 similar to steps SD6 and SD7.

In the present fourth embodiment of the present invention, the engine output reducing means 265 is activated to reduce the output torque of the engine 10 in step SD10 or SD11 if the engine speed $N_E$ detected by the engine speed detecting means 262 has been raised to the threshold $N_{EOV}$ lower than the upper limit $N_{EMAX}$. This arrangement to reduce the engine torque in the 2→3 shift of the transmission 14 during a high-load running of the vehicle is effective to prevent or restrict the activation of the excessive engine speed preventing means 258 to effect the fuel cut (steps SG1 and SG2 in the routine of FIG. 9) in the 2→3 shift, which would cause a considerable amount of reduction of the engine output and deterioration of the driving comfort of the vehicle.

The engine output reducing means 265 of the present fourth embodiment is further adapted such that the output torque of the engine 10 is reduced in step SD10 or SD11 if the time lapse $T_{EL}$ after the initiation of the 2→3 shift has reached or excessed the predetermined time $T_A$, even when the engine speed $N_E$ is lower than the threshold $N_{EOV}$. This arrangement makes it possible to reduce the engine torque even if the engine speed detecting means 262 fails to normally function.

Further, when the ignition retard control of the ignitor 82 is determined to be possible in step SD9 corresponding to the ignition retard failure determining means 263, the engine output torque is reduced in step SD10 corresponding to the engine output reducing means 265, by retarding the ignition timing of the ignitor 82. In this respect, it is noted that the reduction of the engine torque has a higher response to the retarding of the ignition timing than to the reduction of the opening angle of the second throttle valve 56 by the throttle actuator 54.

It is also appreciated that the engine torque is reduced in step SD11 corresponding to the engine output reducing means 265, by activating the throttle actuator 54 to reduce the opening angle of the second throttle valve 56, if the ignition retard control is determined to be impossible in step SD9. This arrangement assures improved driving comfort of the vehicle even if the ignition retard control is not available for some reason or other.

It is also appreciated that the reduction of the engine output torque is terminated in step SD13 when the start of the inertia phase has been detected in step SD12 by the inertia phase determining means 264 during the 2→3 shift. In this respect, it is noted that the engine output torque is usually reduced when the inertia phase has been initiated. This engine torque reduction which is initiated at the start of the inertia phase is intended to reduce a shifting shock of the transmission 14, irrespective of whether the shifting is the 2→3 clutch-to-clutch shift or not. Since the engine torque reduction by the engine output reducing means 265 in step SD10 or SD11 is continued until the inertia phase has started, that is, until the engine torque reduction for reducing the shifting shock in general has been started, the engine torque reduction is continuously effected during the period of shifting (2→3 shift) of the transmission 14, without an interruption which would deteriorate the driving comfort of the vehicle.

Figure 25:
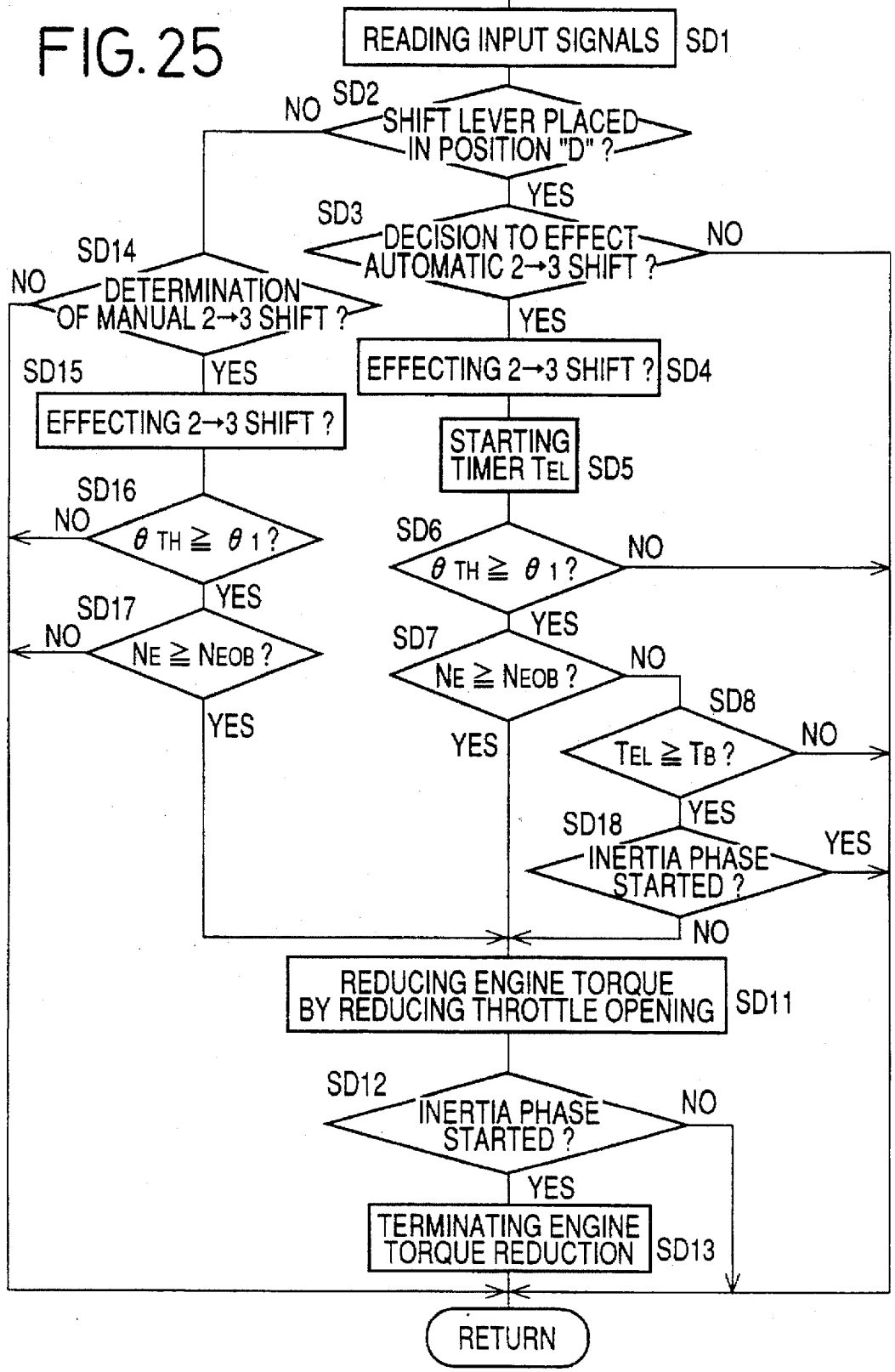
FIG. 25 is a view corresponding to that of FIG. 23, showing a modified engine output reducing control routine used in a yet further embodiment of the invention.

Referring to FIG. 25, there is illustrated an engine output reducing control routine used in a fifth embodiment of the invention, in which the output torque of the engine 10 is reduced exclusively by the second throttle valve 56. The routine of FIG. 25 is different from the routine of FIG. 24, in that a threshold $N_{EOB}$ lower than the threshold $N_{EOV}$ used in steps SD7 and SD17 in the routine of FIG. 24 is used in the corresponding steps in the present routine of FIG. 25, that a threshold $T_B$ smaller or shorter than the threshold $T_A$ used in steps SD8 in the routine of FIG. 24 is used in the corresponding step in the present routine of FIG. 25, that step SD18 is implemented if the affirmative decision (YES) is obtained in step SD8 in the present routine of FIG. 25, and that steps SD9 and SD10 are eliminated in the routine of FIG. 25.

Step SD18 is provided to determine whether the inertia phase has started. In the present embodiment, the output torque of the engine 10 is reduced in step SD11 by reducing the opening angle of the second throttle valve 56 by a suitable amount if the engine speed $N_E$ is equal to or higher than the threshold $N_{EOB}$ or if the time lapse $T_{EL}$ is equal to or larger than the threshold $T_B$ and if the inertia phase has not started yet. The present arrangement has the same advantage as the preceding fourth embodiment of FIG. 24.

In the present embodiment, the provision of step SD18 inhibits the reduction of the engine torque in step SD11 after the inertia phase has started, even after the time $T_B$ has passed. Therefore, the reduction of the engine torque by the engine output reducing means 265 in step SD11 will not take place concurrently with the reduction of the engine torque which is usually initiated at the start of the inertia phase for the purpose of reducing the shift shock of the transmission 14 in general.

In the present fifth embodiment, the thresholds $N_{EOB}$ and $T_B$ are made lower or smaller than the corresponding thresholds $N_{EOV}$ and $T_A$ used in the preceding embodiment of FIG. 24, in view of the fact that the reduction of the engine torque is less responsive to the reduction of the opening angle of the second throttle valve 56 than to the retarding of the ignition timing of the ignitor 82.

Figure 26:
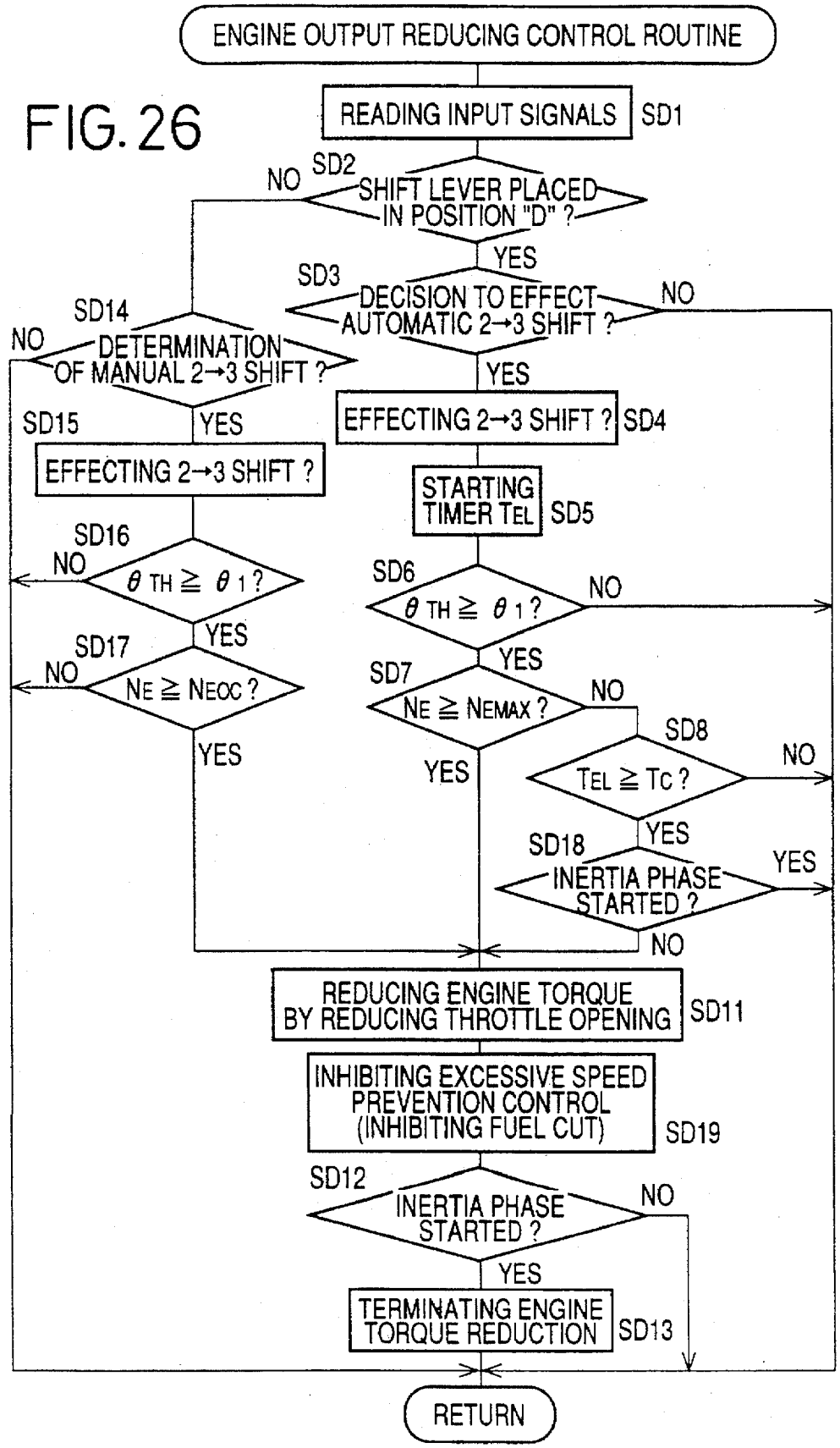
FIG. 26 is a view corresponding to that of FIG. 23, showing another modified engine output reducing control routine used in another embodiment of the invention.

Referring to FIG. 26, there is illustrated an engine output reducing control routine used in a sixth embodiment of the invention, in which the output torque of the engine 10 is reduced exclusively by the second throttle valve 56, as in the fifth embodiment of FIG. 25. The routine of FIG. 26 is different from the routine of FIG. 25, in that the upper limit $N_{EMAX}$ used for the excessive engine speed preventing means 258 is used in steps SD7 and SD17 in the present routine of FIG. 26, that a threshold $T_C$ larger or longer than the threshold $T_B$ used in steps SD8 in the routine of FIG. 25 is used in the corresponding step in the present routine of FIG. 26, and that step SD11 is followed by step SD19 in the present routine of FIG. 26 to inhibit the operation of the excessive engine speed preventing means 258.

In the present sixth embodiment, the output torque of the engine 10 is reduced in step SD11 by reducing the opening angle of the second throttle valve 56 if the engine speed $N_E$ is equal to or higher than the threshold $N_{EMAX}$ or if the time lapse $T_{EL}$ is equal to or larger than the threshold $T_C$ and if the inertia phase has not started yet. At the same time, the operation of the excessive engine speed preventing means 258 to effect the fuel cut is inhibited in step SD19 following step SD11. The present arrangement has the same advantage as the preceding fourth and fifth embodiments of FIGS. 24 and 25.

Figure 27:
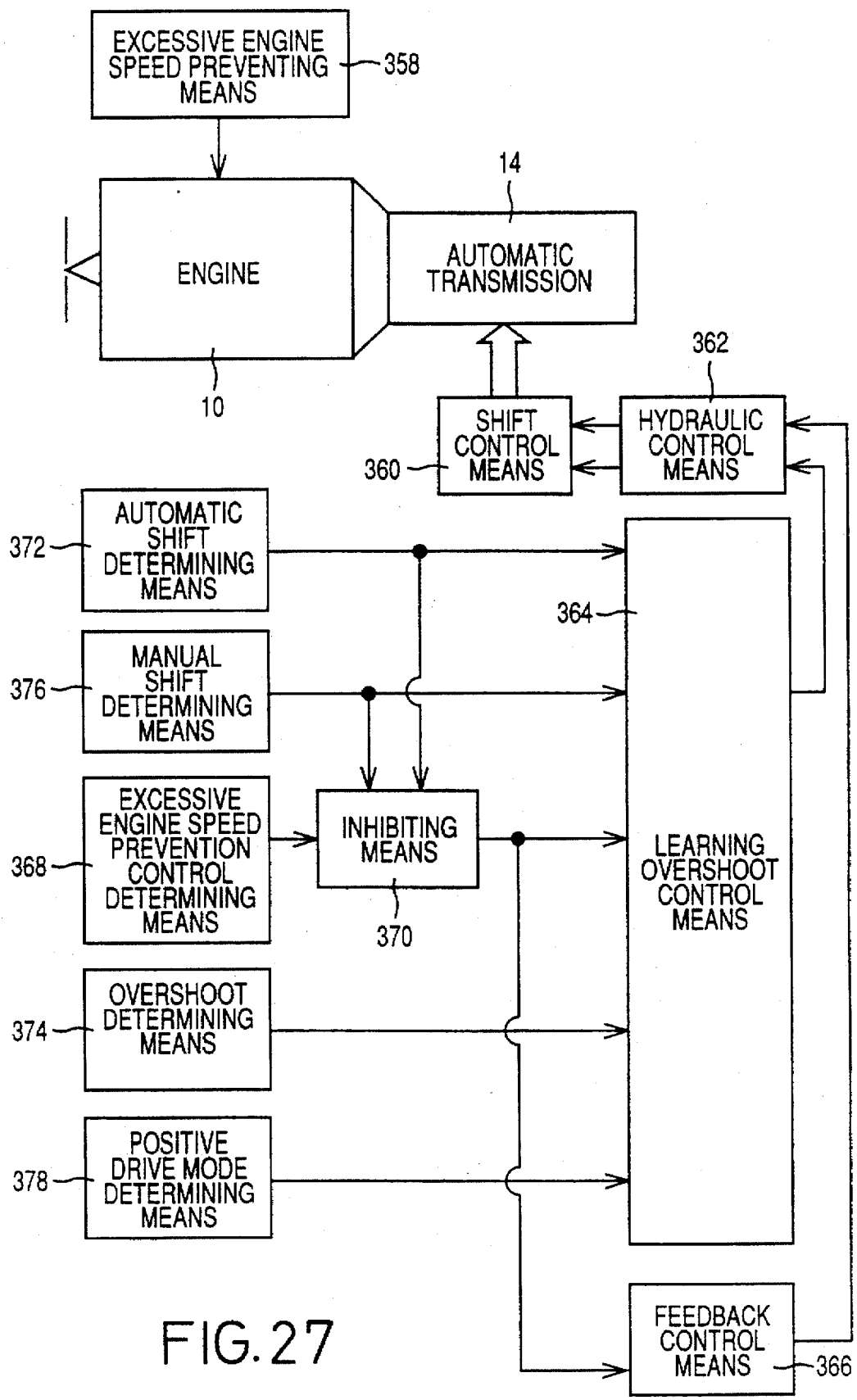
FIG. 27 is a block diagram indicating various functional means of electronic engine and transmission controllers used in a further embodiment of the invention.

Referring next to the block diagram of FIG. 27, there are shown various functional means of the electronic engine and transmission controllers 76, 78 used in a seventh embodiment of this invention. The engine controller 76 includes excessive engine speed preventing means 358 similar to the excessive engine speed preventing means 158, for effecting the fuel cut when the engine speed $N_E$ has exceeded the upper limit $N_{EMAX}$ as illustrated in the flow chart of FIG. 9.

The transmission controller 78 includes shift control means 360 similar to the shift control means 160 of FIGS. 8, 12 and 18, for controlling the shifting actions of the automatic transmission 14 and controlling the lock-up clutch 24, depending upon the detected throttle opening angle $\theta_{TH}$ and vehicle speed V and according to the shift patterns, and depending upon the currently selected position of the shift lever 72.

Figure 28:
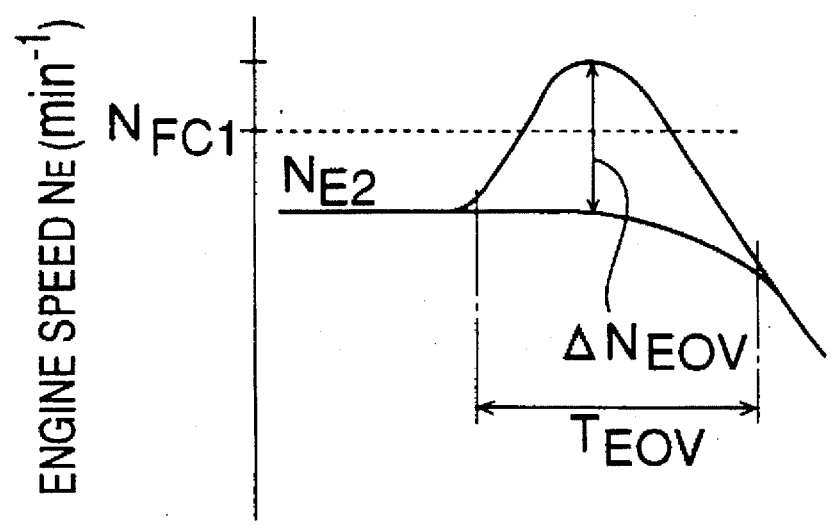
FIG. 28 is a view for explaining an engine overshoot $\Delta N_{EOV}$ and an engine overshoot time $T_{EOV}$ during a clutch-to-clutch shift of the transmission in the embodiment of FIG. 27.

The transmission controller 78 further includes hydraulic control means 362 similar to the hydraulic control means 161 of FIGS. 8 and 12, and learning overshoot control means 364 for effecting learning compensation of the releasing pressure $P_{B3}$ of the brake B3 to be regulated by the hydraulic control means 362, according to the output pressure $P_{SLU}$ of the linear solenoid valve SLU, such that the detected amount of engine speed overshoot $\Delta N_{EOV}$ and overshoot time $T_{EOV}$ (FIG. 28) are held with predetermined respective optimum or permissible ranges. The engine overshoot amount $\Delta N_{EOV}$ is calculated as $N_T - N_{OUT} \times i$, where $N_T$ and $N_{OUT}$ are respectively the speed of the input shaft 42 (turbine runner 22) which is almost equal to the engine speed $N_E$, and the speed of the output shaft 42, when the engine speed $N_E$ is the highest during the 2→3 clutch-to-clutch shift of the transmission 14, while "i" is the speed reduction ratio of the currently selected or established gear position of the transmission 14. The overshoot time $T_{EOV}$ is a time period during which the engine overshoot amount $\Delta N_{EOV}$ is larger than a predetermined relatively small threshold, for example, about 50 r.p.m. The overshoot amount and time $\Delta N_{EOV}$ and $T_{EOV}$ are indicated in the graph of FIG. 28.

The transmission controller 78 further includes feedback control means 366 for regulating the pressure in the accumulator 100 to thereby control the engaging pressure $P_{B2}$ of the brake B2 during the 2→3 shift of the transmission 14, such that the rate of change (rate of decrease) of the engine speed $N_E$ in the inertia phase coincides with a predetermined target value, namely, to regulate the rate of decrease of the engine speed $N_E$ during the 2→3 shift.

The transmission controller 78 further includes excessive engine speed prevention control determining means 368 and inhibiting means 370. The determining means 368 is adapted to determine whether the excessive engine speed preventing means 358 is in operation during the 2→3 clutch-to-clutch shift of the transmission 14. The inhibiting means 370 is adapted to inhibit the operations of the learning overshoot control means 364 and feedback control means 366 if the determining means 368 determines that the excessive engine speed preventing means 358 is in operation.

The transmission controller 78 further includes automatic shift determining means 372 similar to the automatic shift determining means 172 of FIGS. 8 and 12, and overshoot determining means 374 for determining whether the amount of overshoot $\Delta N_{EOV}$ of the engine speed $N_E$ during the 2→3 shift has exceeded a predetermined threshold $\alpha$ while the overshoot time $T_{EOV}$ has exceeded a predetermined threshold $T_{EOV1}$, and determining whether the amount of overshoot $\Delta N_{EOV}$ of the engine speed $N_E$ during the 2→3 shift has exceeded a predetermined threshold $\beta$ while the overshoot time $T_{EOV}$ has exceeded a predetermined threshold $T_{EOV2}$. The former determination of the overshoot determining means 374 is made during the automatic 2→3 shift of the transmission 14, and the latter determination is made during the manual 2→3 shift. The transmission controller 78 further includes manual shift determining means 376 similar to the manual shift determining means 176 of FIGS. 8 and 12, and positive drive mode determining means 378 for determining whether the vehicle is running in a positive drive mode in which the drive force is transmitted from the engine 10 toward the drive wheels of the vehicle.

During the automatic 2→3 clutch-to-clutch shift of the transmission 14, the learning overshoot control means 364 determines the learning compensation value $\Delta D_{SLU}$ of the control value $D_{SLU}$ on the basis of the detected engine overshoot amount $\Delta N_{EOV}$ and the overshoot time $T_{EOV}$ and according to a stored predetermined relationship between these parameters $\Delta N_{EOV}$, $T_{EOV}$ and the learning compensation value $\Delta D_{SLU}$, as shown in FIG. 30. During the manual 2→3 clutch-to-clutch shift following an operation of the shift lever 72, the learning overshoot control means 364 determines the learning compensation value $\Delta D_{SLU}$ of the control value $D_{SLU}$ on the basis of the detected engine overshoot amount $\Delta N_{EOV}$ and the overshoot time $T_{EOV}$ and a selected one of a plurality of stored predetermined relationships between these parameters $\Delta N_{EOV}$, $T_{EOV}$ and the learning compensation value $\Delta D_{SLU}$, as shown in FIG. 31. The stored relationships correspond to respective ranges of the vehicle speed V, and one of the relationships corresponding to the range in which the detected vehicle speed V falls is selected for determining the learning compensation value $\Delta D_{SLU}$.

The inhibiting means 370 is preferably adapted to inhibit only the learning compensation by the learning overshoot control means 364 on the basis of the overshoot time $T_{EOV}$, during the automatic 2→3 clutch-to-clutch shift of the transmission 14, and both the learning compensation on the basis of the overshoot amount $\Delta N_{EOV}$ and the learning compensation on the basis of the overshoot time $T_{EOV}$, during the manual 2→3 shift.

Figure 29:
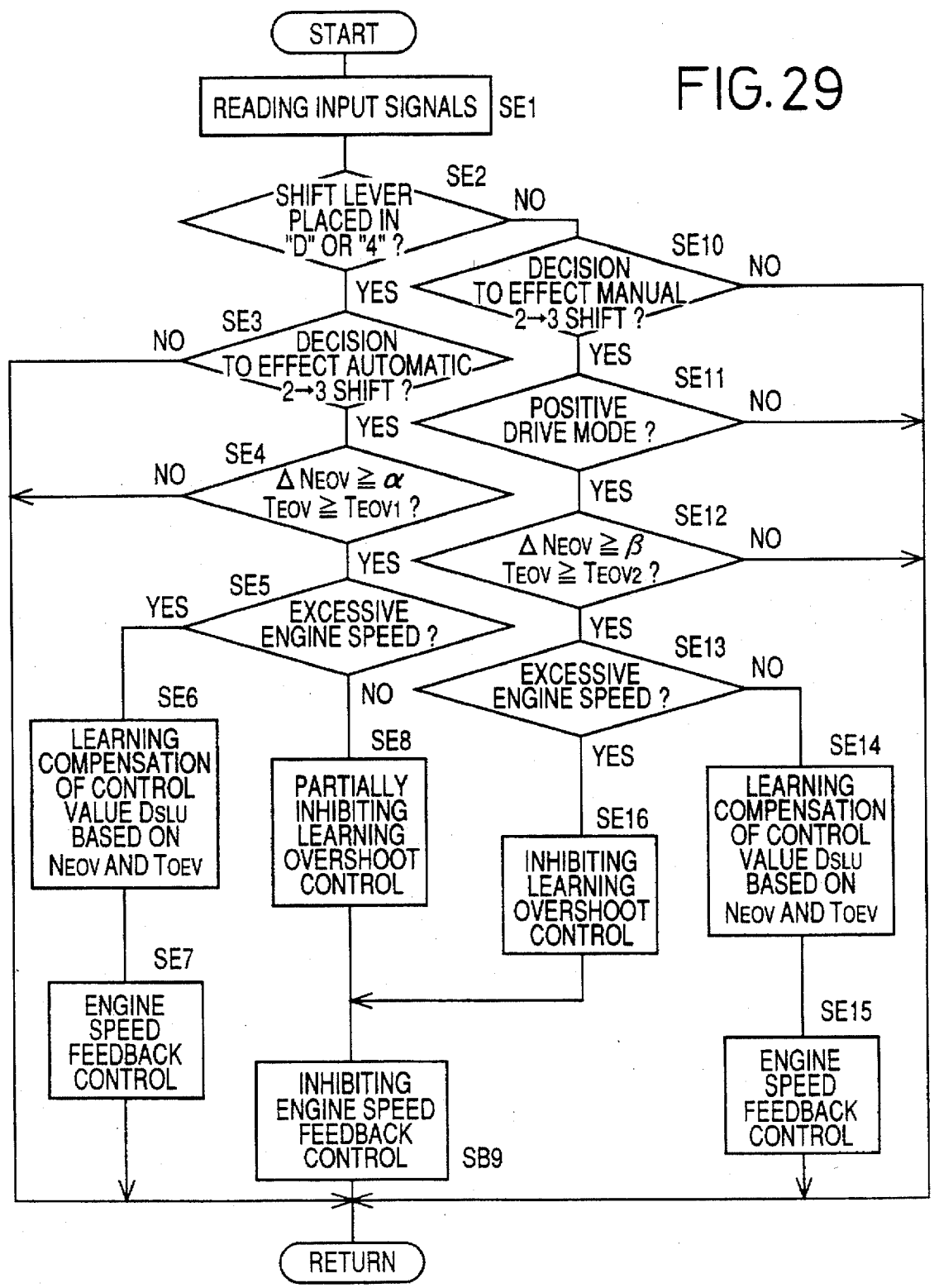
FIG. 29 is a flow chart illustrating a part of an operation of the electronic transmission controller in the embodiment of FIG. 27.

Referring to the flow chart of FIG. 29, there is illustrated a control routine executed by the transmission controller 78 in the seventh embodiment of the invention. The control routine is initiated with step SE1 to read and process various input signals. Step SE1 is followed by step SE2 to determine whether the shift lever 72 is placed in the position "D" or "4". If an affirmative decision (YES) is obtained in step SE2, it means that a decision to effect the automatic 2→3 clutch-to-clutch shift of the transmission 14 may be made depending upon the detected throttle opening angle $\theta_{TH}$ and vehicle speed V and according to the predetermined shift pattern as indicated in FIG. 11. In this case, the control flow goes to step SE3 corresponding the automatic shift determining means 372, to determine whether the decision to effect the automatic 2→3 has been made.

If a negative decision (NO) is obtained in step SE3, one cycle of execution of the control routine of FIG. 29 is terminated. If an affirmative decision (YES) is obtained in step SE3, the control flow then goes to step SE4 corresponding to the overshoot determining means 374, to determine whether the overshoot amount $\Delta N_{EOV}$ of the engine speed $N_E$ has reached or exceeded the threshold $\alpha$ (r.p.m.) while the overshoot time $T_{EOV}$ has reached or exceeded the threshold $T_{EOV1}$ (msec). These thresholds $\alpha$ and $T_{EOV1}$ are experimentally determined to initiate the learning compensation of the control value $D_{SLU}$ in step SE6 and the feedback control in step SE7 at a suitable opportunity.

If a negative decision (NO) is obtained in step SE4, it means that the engine overshoot amount $\Delta N_{EOV}$ is still small. In this case, one cycle of execution of the routine is terminated. If an affirmative decision (YES) is obtained in step SE4, the control flow goes to step SE5 corresponding to the excessive engine speed prevention control determining means 368, to determine whether the fuel cut in step SG2 of the routine of FIG. 9 is currently effected. If a negative decision (NO) is obtained in step SE5, it means that the engine speed $N_E$ is lower than the upper limit $N_{EMAX}$, and the control flow goes to step SE6 corresponding to the learning overshoot control means 364 explained above, in which the learning compensation value $\Delta D_{SLU}$ of the control value $D_{SLU}$ for controlling the linear solenoid valve SLU for regulating the releasing pressure $P_{B3}$ of the brake B3 is determined on the basis of the detected engine overshoot amount $\Delta N_{EOV}$ and overshoot time $T_{EOV}$ and according to the stored relationship as indicated in FIG. 30. The control value $D_{SLU}$ may represent a duty cycle ratio of the linear solenoid valve SLU. The thus determined learning compensation value $\Delta D_{SLU}$ is stored in memory and used during the next or subsequent automatic 2→3 shift of the transmission 14. More specifically, the learning compensation value $\Delta D_{SLU}$ is added to the control value $D_{SLU}$ normally determined in the next or subsequent 2→3 shift. If the previously determined learning compensation value $\Delta D_{SLU}$ is stored in the present 2→3 shift, it is added to the normally determined control value $D_{SLU}$ for thereby controlling the releasing pressure $P_{B3}$ in the present shift. Since the output pressure $P_{SLU}$ of the linear solenoid valve SLU increases with an increase in the control value $D_{SLU}$, the addition of the learning control value $\Delta D_{SLU}$ will cause an increase in the releasing pressure $P_{B3}$ of the brake B3 that is eventually fully released to establish the third-speed position "3rd", whereby the engaging and releasing pressures $P_{B2}$, $P_{B3}$ of the brakes B2 and B3 change in a direction to increase a tie-up tendency and reduce an overshoot tendency. Thus, the learning compensation in step SE4 contributes to reducing the overshoot amount of the engine speed.

The data map of FIG. 30 showing the relationship used for determining the learning compensation value $\Delta D_{SLU}$ is formulated such that the learning compensation value $\Delta D_{SLU}$ increases with an increase in the overshoot time $T_{EOV}$, in order to ensure the reduction of the overshoot amount $\Delta N_{EOV}$. That is, $\Delta D_{SLU11} < \Delta D_{SLU21} < \Delta D_{SLU31}$,
$\Delta D_{SLU12} < \Delta D_{SLU22} < \Delta D_{SLU32}$,
$\Delta D_{SLU13} < \Delta D_{SLU23} < \Delta D_{SLU33}$,
$\Delta D_{SLU11} < \Delta D_{SLU12} < \Delta D_{SLU13}$ When the engine overshoot amount $\Delta N_{EOV}$ during the automatic 2→3 shift is larger than 150 r.p.m., the learning compensation value $\Delta D_{SLU}$ is set to be $\Delta D_{SLUS}$ which is larger than $\Delta D_{SLU13}$.

Step SE6 is followed by step SE7 corresponding to the feedback control means 366, wherein the pressure in the accumulator 100 is regulated to control the engaging pressure $P_{B2}$ of the brake B2, for example, such that the rate of change (more precisely, rate of decrease) of the engine speed $N_E$ coincides with a predetermined target or desired value.

If an affirmative decision (YES) is obtained in step SE5, it means that the engine speed $N_E$ is higher than the upper limit $N_{EMAX}$ (steps SG1 and SG2 of FIG. 9). In this case, the control flow goes to step SE8 to inhibit or stop the learning compensation of the control value $D_{SLU}$ on the basis of the overshoot time $T_{EOV}$, which learning compensation has been initiated in step SE6. That is, the learning compensation of the control value $D_{SLU}$ is partially inhibited and partially continued in step SE8 according to the learning compensation value $\Delta D_{SLUS}$ which is constant or does not change with the overshoot time $T_{EOV}$ and which is larger than the value $\Delta D_{SLU13}$ as indicated above. Step SE8 is followed by step SE9 to inhibit or stop the feedback control by the feedback control means 366 which has been initiated in step SE7. It will be understood that steps SE8 and SE9 constitute the inhibiting means 370.

When the shift lever 72 is placed in any one of the positions "1", "2" and "3", a negative decision (NO) is obtained in step SE2, and the control flow goes to step SE10 corresponding to the manual shift determining means 376, to determine whether the decision to effect the manual 2→3 clutch-to-clutch shift of the transmission 14 has been made as a result of operation of the shift lever 72. If a negative decision (NO) is obtained in step SE10, one cycle of execution of the routine of FIG. 29 is terminated. If an affirmative decision (YES) is obtained in step SE11, step SE12 is implemented to determine whether the vehicle is running in the positive drive mode with the drive force being transmitted from the engine 10 toward the drive wheels of the vehicle.

If a negative decision (NO) is obtained in step SE11, one cycle of execution of the routine is terminated. If an affirmative decision (YES) is obtained in step SE11, the control flow goes to step SE12 to determine whether the overshoot amount $\Delta N_{EOV}$ of the engine speed $N_E$ has reached or exceeded the threshold β (r.p.m.) while the overshoot time $T_{EOV}$ has reached or exceeded the threshold $T_{EOV2}$ (msec). These thresholds β and $T_{EOV2}$ are experimentally determined to initiate the learning compensation of the control value $D_{SLU}$ in step SE14 and the feedback control in step SE15 at a suitable opportunity. Since the manual 2→3 shift of the transmission 14 is effected at different vehicle speed values V, the thresholds β and $T_{EOV2}$ are determined independently of the thresholds α and $T_{EOV}$ used in the automatic 2→3 shift. However, the thresholds β and $T_{EOV2}$ may be the same as the thresholds α and $T_{EOV1}$.

If a negative decision (NO) is obtained in step SE12, one cycle of execution of the routine is terminated. If an affirmative decision (YES) is obtained in step SE12, the control flow goes to step SE13 corresponding to the excessive engine speed prevention control determining means 368, to determine whether the fuel cut in step SG2 of the routine of FIG. 9 is currently effected. If a negative decision (NO) is obtained in step SE13, it means that the engine speed $N_E$ is lower than the upper limit $N_{EMAX}$, and the control flow goes to step SE14 corresponding to the learning overshoot control means 364 explained above, in which the learning compensation value $\Delta D_{SLU}$ of the control value $D_{SLU}$ is determined in a manner similar to that in step SE6. As explained above, however, one of the relationships as indicated in FIG. 31 which corresponds to the range in which the detected vehicle speed V falls is selected for determining the learning compensation value $\Delta D_{SLU}$. The relationship of FIG. 31 corresponds to a given one of the vehicle speed ranges. Like the data map of FIG. 30, the data map of FIG. 31 is formulated such that the learning compensation value $\Delta D_{SLU}$ increases with an increase in the overshoot time $T_{EOV}$ and with an increase in the engine overshoot amount $\Delta N_{EOV}$. Step SE14 is followed by step SE15 corresponding to the feedback control means 366, wherein the pressure in the accumulator 100 is regulated so as to reduce the engine speed $N_E$ at a desired rate, as in step SE7.

If an affirmative decision (YES) is obtained in step SE13, it means that the engine speed $N_E$ is higher than the upper limit $N_{EMAX}$, and the control flow goes to step SE16 corresponding to the inhibiting means 370, to completely inhibit or stop the learning compensation of the control value $D_{SLU}$, namely, not only the learning compensation on the basis of the overshoot time $T_{OEV}$, but also the learning compensation on the basis of the overshoot amount $\Delta N_{EOV}$.

In the present seventh embodiment of this invention, the operation of the learning overshoot control means 364 which has been initiated in step SE6 or SE14 is partially or completely inhibited or stopped in step SE8 or SE16 by the inhibiting means 370, if the excessive engine speed prevention control determining means 368 determines in step SE5 or SE13 that the excessive engine speed preventing means 358 is in operation. Thus, the learning compensation by the learning overshoot control means 364 of the control value $D_{SLU}$ for controlling the pressure $P_{B3}$ associated with the 2→3 clutch-to-clutch shift of the transmission 14 is inhibited when the engine speed $N_E$ is influenced by the operation of the excessive engine speed preventing means 358. Accordingly, the erroneous learning compensation of the control value $D_{SLU}$ is avoided in the present embodiment. Therefore, the present embodiment is effective to prevent deterioration of the driving comfort of the vehicle due to a shifting shock of the transmission 14 during a 2→3 shift, which would arise from the erroneous compensation of the control value $D_{SLU}$.

The present embodiment is further adapted such that the operation of the feedback control means 366 which has been initiated in step SE7 or SE15 is also inhibited by the inhibiting means 370 in step SE9, if the excessive engine speed prevention control determining means 368 determines in step SE5 or SE13 that the excessive engine speed preventing means 358 is in operation. Thus, the feedback control to regulate the rate of decrease of the engine speed $N_E$ is inhibited when the engine speed $N_E$ is influenced by the operation of the excessive engine speed preventing means 358, whereby inadequate operation of the feedback control means 366 during the 2→3 shift is avoided.

Further, when the decision to effect the automatic 2→3 clutch-to-clutch shift of the transmission 14 is detected in step SE3 by the automatic shift determining means 372, only the learning compensation by the learning overshoot control means 364 on the basis of the overshoot time $T_{EOV}$ is inhibited in step SE8 by the inhibiting means 370, but the learning compensation on the basis of the predetermined overshoot amount $\Delta D_{SLUS}$ is continuously effected, when the excessive engine speed preventing means 358 is in operation. Thus, the releasing pressure $P_{B3}$ of the brake B3 is continuously regulated so as to reduce the engine overshoot even while the excessive engine speed preventing means 358 is in operation.

When the decision to effect the manual 2→3 shift is detected in step SE10 by the manual shift determining means 372, the operation of the learning overshoot control means 364 during operation of the excessive engine speed preventing means 358 is completely inhibited or stopped, since the engine speed $N_E$ during the manual 2→3 shift is considerably fluctuating.

While the present invention has been described in detail in its presently preferred embodiments by reference to the accompanying drawings, it is to be understood that the invention may be otherwise embodied.

In the first and second embodiments of FIGS. 10 and 13, the determination as to whether the throttle opening angle $\theta_{TH}$ of the first throttle valve 52 is equal to or larger than the predetermined threshold $\theta_{TH1}$ is made in step SA4 (FIG. 10) or SB4 (FIG. 13) to determine whether the vehicle is running with a relatively high load which may cause an excessive rise of the engine speed $N_E$ above the upper limit $N_{EMAX}$ due to insufficient or inadequate functioning of the overshoot control means 162 for regulating the releasing pressure $P_{B3}$ of the brake B3 during the 2→3 clutch-to-clutch shift of the transmission 14 so as to reduce the engine speed overshoot to within a predetermined optimum range. However, the above determination may be replaced by a determination as to whether the engine speed $N_E$ prior to the 2→3 shift of the transmission 14 is equal to or higher than a predetermined threshold $N_{E1}$. This threshold $N_{E1}$ may be experimentally or empirically determined so as to determine whether there is a possibility that the engine speed $N_E$ rises above the upper limit $N_{EMAX}$ in the 2→3 shift during running of the vehicle with the engine speed $N_E$ being comparatively high, due to the above-indicated insufficient or inadequate functioning of the overshoot control means 162.

While the illustrated embodiments are adapted to regulate the releasing pressure $P_{B3}$ of the brake B3 during the 2→3 clutch-to-clutch shift of the transmission 14 so as to control the amount of engine speed overshoot or the amount of tie-up of the two brakes B2 and B3, the engaging pressure $P_{B2}$ of the brake B2 to be engaged to establish the third-speed position of the transmission may be regulated according to the principle of the invention. In this case, the compensating value e used in steps SB8 and SB9 in the embodiment of FIG. 13 is used so as to increase the engaging pressure $P_{B2}$ of the brake B2 so that the brakes B2 and B3 have a tie-up tendency. In the graph of FIG. 17, "B2"represents the engaging pressure $P_{B2}$ of the brake B2 when the releasing pressure $P_{B2}$ is regulated during the 2→3 shift. Solid line indicates the engaging pressure $P_{B2}$ according to the initial value A which does not cause an engine overshoot tendency or a tie-up tendency of the brakes B2, B3, while broken line indicates the engaging pressure $P_{B2}$ compensated according to the initial value A plus the learning compensation value $\Delta D_{SLU}$, which value $\Delta D_{SLU}$ increases the pressure $P_{B2}$ so as to cause some amount of tie-up of the brakes B2, B3. Further, both the releasing pressure $P_{B3}$ of the brake B3 and the engaging pressure $P_{B2}$ of the brake B2 may be regulated according to the present invention.

In the first and second embodiments of FIGS. 10 and 13, the real-time overshoot control means 162b is operated in steps SA6-1 and SA11-1 or SB6 and SB13 for compensating the control value $D_{SLU}$ in the real-time fashion to reduce the engine overshoot amount to within the predetermined optimum range. However, the real-time overshoot control means 162b may be eliminated. Conversely, the learning overshoot control means 162a operated in steps SA6-2 and SA11-2 or steps SB7 and SB14 may be eliminated provided the real-time overshoot control means 162b is provided. That is, the overshoot control means 162 of FIGS. 8 and 12 may consists of at least one of the learning overshoot control means 162a and the real-time overshoot control means 162b.

In the third embodiments of FIGS. 18 and 19, the engine overshoot amount $\Delta N_{EOV}$ is calculated in step SC2 by subtracting the engine speed $N_{E2}$ prior to the 2→3 shift (when the transmission 14 is placed in the second-speed position "2nd") from the present engine speed $N_E$. However, the engine overshoot amount $\Delta N_{EOV}$ may be determined on the basis of the rate of change $dN_E/dt$ of the actual engine speed $N_E$ at the time of start of the overshoot, and according to a predetermined relationship between the overshoot amount $\Delta N_{EOV}$ and the rate of change $dN_E/dt$, In the first embodiment of FIG. 10, the tie-up control means 164 is operated to effect the learning compensation of the control value $D_{SLU}$ on the basis of the tie-up amount $\Delta N_{OAS}$, if the operation of the overshoot control means 162 is inhibited by the first inhibiting means 170. However, the tie-up control means 164 may be replaced by engine output reducing means for reducing the output torque of the engine 10 by retarding the ignition timing of the ignitor 82, for example, as in the embodiments of FIGS. 23–26 wherein the engine output reducing means 265 is provided.

The excessive engine speed prevention inhibiting means 190 provided in the third embodiment of FIGS. 18 and 19 may be modified to inhibit the fuel cut only when the shift lever 72 is placed in the position "D", that is, only when the decision to effect the automatic 2→3 clutch-to-clutch shift of the transmission 14 has been made.

The routines illustrated in the flow charts of FIGS. 10, 13 and 19 may be modified as needed, by addition of other steps or by changing the operations in some of the existing steps, provided the modified arrangements are capable of performing functions similar to those of FIGS. 10, 13 and 19 which have been described.

While the threshold value $T_A$ or $T_B$ used in step SD8 used in the fourth and fifth embodiments of FIGS. 23–25 is a constant value, it may be changed as a function of the throttle opening angle $\theta_{TH}$ or as a function of the throttle opening angle $\theta_{TH}$ and the vehicle speed V. This modified arrangement permits the engine output torque to be reduced at a more adequate timing, since the time or rate of rise of the engine speed $N_E$ to the upper limit $N_{EMAX}$ after the initiation of the 2→3 shift of the transmission 13 varies with the throttle opening angle $\theta_{TH}$ or with the throttle opening angle $\theta_{TH}$ and the vehicle speed V.

In the fourth embodiment of FIG. 24, the output torque of the engine 10 is reduced by reducing the opening angle of the second throttle valve 56 in step SD11 if the ignition retard control is impossible. This fourth embodiment may be modified such that the threshold $T_B$ as used in the fifth embodiment of FIG. 25 may be used in place of the threshold $T_A$ used in step SD8, when step SD11 is implemented.

In the same fourth embodiment of FIG. 24 wherein the reduction of the engine output torque is terminated in step SD13 when the start of the inertia phase of the speed $N_T$ has been detected, step SD13 may be modified such that the reduction of the engine output torque is terminated a predetermined time after the start of the inertia phase.

While the fourth, fifth and sixth embodiments of FIGS. 24–26 are also adapted to regulate the releasing pressure $P_{B3}$ of the brake B3 during the 2→3 clutch-to-clutch shift of the transmission 14, these embodiments may be modified to regulate the engaging pressure $P_{B2}$ of the brake B2, or both of the releasing pressure $P_{B3}$ and engaging pressure $P_{B2}$, during the 2→3 shift.

In the embodiments of FIGS. 24–26, the engine 10 are provided with the first and second throttle valves 52, 56, and the output torque of the engine 10 can be reduced by reducing the opening angle of the second throttle valve 56. However, the engine 10 may be provided with a single throttle valve controlled by a throttle actuator, and the reduction of the engine output torque may be effected by electrically controlling the throttle actuator so as to reduce the opening angle of this single throttle valve.

The control routines of FIGS. 24–26 may also be modified as needed, by addition of other steps or by changing the operations in some of the existing steps, provided the modified arrangements are capable of performing functions similar to those of FIGS. 24–26 which have been described.

In the seventh embodiment of FIGS. 27–31, the operation of the learning overshoot control means 364 is partially inhibited in step SE8, that is, the learning compensation of the control value $D_{SLU}$ on the basis of the overshoot time $T_{EOV}$ is inhibited in step SE8. However, the operation of the learning overshoot control means 364 may be completely inhibited. That is, the learning compensation on the basis of the engine overshoot amount $\Delta N_{EOV}$ as well as the learning compensation on the basis of the overshoot time $T_{EOV}$ may be inhibited.

The seventh embodiment adapted to regulate the releasing pressure $P_{B3}$ of the brake B3 may also be modified to regulate the engaging pressure $P_{B2}$ of the brake B2, or both the releasing pressure $P_{B3}$ and the engaging pressure $P_{B2}$.

Although the seventh embodiment is adapted to effect the learning compensation in steps SE6 and SE14 of the control value $D_{SLU}$ during both the automatic 2→3 shift and the manual 2→3 shift of the transmission 14, the learning compensation may be effected during one of the automatic and manual 2→3 shifts. Further, steps SE7 and SE15 to effect the feedback control to control the rate of decrease of the engine speed $N_E$ may be eliminated.

The control routine of FIG. 29 may also be modified as needed.

While the illustrated embodiments employ the mutually independent engine and transmission controllers 76, 78 which are connected for interactive data communication, the shift control apparatus according to the present invention may employ a single controller for controlling the engine 10 and the transmission 14.

In the illustrated embodiments, the principle of the present invention is applied to the 2→3 clutch-to-clutch shift of the transmission 14 from the second-speed position to the third-speed position, which is achieved by releasing the brake B3 and engaging the brake B2. However, the automatic transmission 14 may be adapted to effect other clutch-to-clutch shifts, for example, a clutch-to-clutch shift from the third-speed position to the fourth-speed position by using other frictional coupling devices.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift of said transmission from one of said operating positions to another of said operating positions, said shift control apparatus comprising (a) excessive engine speed preventing means for preventing a rise of a speed of said engine above an upper limit, (b) hydraulic control means for regulating hydraulic pressures of said two frictional coupling devices such that an amount of overshoot of said speed of the engine is held within a predetermined range during a period of said clutch-to-clutch shift, and (c) overshoot control means for compensating at least one of said hydraulic pressures as regulated by said hydraulic control means, when said amount of overshoot of the speed of said engine is outside said predetermined range, said shift control apparatus further comprising:

engine state detecting means for detecting an operating state of said engine during said clutch-to-clutch shift of said transmission; and inhibiting means for inhibiting an operation of said overshoot control means, if said operating state of said engine detected by said engine state detecting means is expected to cause activation of said excessive engine speed preventing means during said clutch-to-clutch shift of said transmission.

2. A shift control apparatus according to claim 1, wherein said overshoot control means includes at least one of learning overshoot control means and real-time overshoot control means.

3. A shift control apparatus according to claim 2, wherein said learning overshoot control means detects said amount of overshoot of the speed of said engine during said period of said clutch-to-clutch shift of said transmission, determines a learning compensation value for adjusting said at least one of said hydraulic pressures of said two frictional coupling devices as regulated by said hydraulic control means, such that the detected amount of overshoot of the speed of said engine is held within said predetermined range, and applies said learning compensation value to said hydraulic control means.

4. A shift control apparatus according to claim 2, wherein said real-time overshoot control means intermittently detects said amount of overshoot of the speed of said engine during said period of said clutch-to-clutch shift of said transmission, and intermittently adjusts said at least one of said hydraulic pressures of said two frictional coupling devices as regulated by said hydraulic control means, during a period between moments of detection of a torque phase and an inertia phase of the speed of said engine during said period of said clutch-to-clutch shift, such that the detected amount of overshoot of the speed of said engine is held within said predetermined range.

5. A shift control apparatus according to claim 1, further comprising tie-up control means for controlling at least one of said hydraulic pressures of said two frictional coupling devices during said period of said clutch-clutch shift of said transmission, such that said two frictional coupling devices have a tie-up tendency, when said inhibiting means inhibits the operation of said overshoot control means.

6. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift of said transmission from one of said operating positions to another of said operating positions, said shift control apparatus comprising (a) excessive engine speed preventing means for preventing a rise of a speed of said engine above an upper limit, (b) hydraulic control means for regulating hydraulic pressures of said two frictional coupling devices such that an amount of overshoot of said speed of the engine is held within a predetermined range during a period of said clutch-to-clutch shift, and (c) learning overshoot control means for effecting learning compensation of at least one of said hydraulic pressures as regulated by said hydraulic control means, when said amount of overshoot of the speed of said engine is outside said predetermined range, said shift control apparatus further comprising:

engine state detecting means for detecting an operating state of said engine during said clutch-to-clutch shift of said transmission; and inhibiting means for inhibiting an operation of said learning overshoot control means, if said operating state of said engine detected by said engine state detecting means is expected to cause activation of said excessive engine speed preventing means during said clutch-to-clutch shift of said transmission.

7. A shift control apparatus according to claim 6, further comprising tie-up control means for controlling at least one of said hydraulic pressures of said two frictional coupling devices during said period of said clutch-to-clutch shift of said transmission, such that said two frictional coupling devices have a tie-up tendency, when said inhibiting means inhibits the operation of said learning overshoot control means.

8. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift of said transmission from one of said operating positions to another of said operating positions, said shift control apparatus comprising (a) excessive engine speed preventing means for preventing a rise of a speed of said engine above an upper limit, and (b) learning overshoot control means for effecting learning compensation of at least one of hydraulic pressures of said two frictional coupling devices such that an amount of overshoot of said speed of the engine is held within a predetermined range during a period of said clutch-to-clutch shift, said shift control apparatus further comprising:

engine state detecting means for detecting an operating state of said engine during said clutch-to-clutch shift of said transmission; and hydraulic controlling and inhibiting means for inhibiting an operation of said learning overshoot control means, if said operating state of said engine detected by said engine state detecting means is expected to cause activation of said excessive engine speed preventing means, said hydraulic controlling and inhibiting means regulating said at least one of said hydraulic pressures of said two frictional coupling devices on the basis of a learning compensation value obtained by said learning overshoot control means, when said amount of overshoot of the speed of said engine is outside said predetermined range, if said operating state of said engine detected by said engine state detecting means is not expected to cause the activation of said excessive engine speed preventing means.

9. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift of said transmission from one of said operating positions to another of said operating positions, said shift control apparatus comprising (a) excessive engine speed preventing means for preventing a rise of a speed of said engine above an upper limit, and (b) overshoot control means for compensating at least one of hydraulic pressures of said two frictional coupling devices such that an amount of overshoot of said speed of the engine is held within a predetermined range during a period of said clutch-to-clutch shift, said shift control apparatus further comprising:

engine state detecting means for detecting an operating state of said engine during said clutch-to-clutch shift of said transmission; and inhibiting means for inhibiting an operation of said excessive engine speed preventing means, if said operating state of said engine detected by said engine state detecting means is expected to cause activation of said excessive engine speed preventing means.

10. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift of said transmission from one of said operating positions to another of said operating positions, said shift control apparatus comprising (a) excessive engine speed preventing means for preventing a rise of a speed of said engine above an upper limit, (b) clutch-to-clutch shift control means for regulating hydraulic pressures of said two frictional coupling devices during a period of said clutch-to-clutch shift of said transmission, and (c) learning compensation means for effecting learning compensation of at least one of said hydraulic pressures as regulated by said clutch-to-clutch shift control means so as to reduce an amount of overshoot of the speed of said engine during said period of said clutch-to-clutch shift, said shift control apparatus further comprising:

engine speed detecting means for detecting said speed of said engine during said clutch-to-clutch shift of said transmission; and engine output reducing means for reducing an output torque of said engine if the speed of said engine detected by said engine speed detecting means has exceeded a predetermined threshold which is not higher than said upper limit above which said excessive engine speed preventing means is activated.

11. A shift control apparatus according to claim 10, wherein said engine output reducing means reduces said output torque of said engine if a time lapse after initiation of said clutch-to-clutch shift of said transmission has exceeded a predetermined threshold time, even though the speed of said engine has not exceeded said predetermined threshold.

12. A shift control apparatus according to claim 10, wherein said engine output reducing means comprises means for retarding an ignition timing of said engine to thereby reduce said output torque.

13. A shift control apparatus according to claim 10, wherein said engine is provided with a throttle valve and a throttle actuator for operating said throttle valve, said engine output reducing means comprising means for controlling said throttle actuator to reduce an opening angle of said throttle valve for thereby reducing said output torque of said engine.

14. A shift control apparatus according to claim 10, wherein said engine is provided with a throttle valve and a throttle actuator for operating said throttle valve, said engine output reducing means comprising first output reducing means for retarding an ignition timing of said engine to thereby reduce said output torque, and second output reducing means for controlling said throttle actuator to reduce an opening angle of said throttle valve for thereby reducing said output torque, said shift control apparatus further comprising determining means for determining whether it is impossible to retard said ignition timing of said engine, said engine output reducing means activating said first output reducing means if said determining means determines that it is not impossible to retard said ignition timing, and activating said second output reducing means if said determining means determines that it is impossible to retard said ignition timing.

15. A shift control apparatus according to claim 10, further comprising inertia phase determining means for determining whether the speed of said engine has entered an inertia phase during said period of said clutch-to-clutch shift of said transmission, and wherein said engine output reducing means is turned off when or a predetermined time after said inertia phase determining means has determined that the speed of said engine has entered said inertia phase.

16. A shift control apparatus according to claim 10, further comprising means for inhibiting an operation of said excessive engine speed preventing means as soon as said engine output reducing means has been activated.

17. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift of said transmission from one of said operating positions to another of said operating positions, said shift control apparatus comprising (a) excessive engine speed preventing means for preventing a rise of a speed of said engine above an upper limit, (b) hydraulic control means for regulating hydraulic pressures of said two frictional coupling devices such that an amount of overshoot of said speed of the engine is held within a predetermined range during a period of said clutch-to-clutch shift, and (c) learning overshoot control means for effecting learning compensation of at least one of said hydraulic pressures as regulated by said hydraulic control means, when said amount of overshoot of the speed of said engine is outside said predetermined range, said shift control apparatus further comprising:

determining means for determining whether said excessive engine speed preventing means is in operation; and inhibiting means for inhibiting an operation of said learning overshoot control means, if said determining means determines that said excessive engine speed preventing means is in operation.

18. A shift control apparatus according to claim 17, further comprising feedback control means for regulating said hydraulic pressure of said other frictional coupling device such that a rate of change of the speed of said engine during said period of said clutch-to-clutch shift of said transmission coincides with a predetermined target value, and wherein said inhibiting means inhibits an operation of said feedback control means as well as the operation of said learning overshoot control means, if said determining means determines that said excessive engine speed preventing means is in operation.

* * * * *